US006559903B2

(12) United States Patent
Faris et al.

(10) Patent No.: US 6,559,903 B2
(45) Date of Patent: *May 6, 2003

(54) NON-ABSORPTIVE ELECTRO-OPTICAL GLAZING STRUCTURE EMPLOYING COMPOSITE INFRARED REFLECTIVE POLARIZING FILTER

(75) Inventors: Sadeg M. Faris, Pleasantville, NY (US); Le Li, Yorktown Heights, NY (US); Jian-Feng Li, Yorktown Heights, NY (US)

(73) Assignee: Reveo, Inc., Elmsford, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 09/032,302

(22) Filed: Feb. 27, 1998

(65) Prior Publication Data

US 2002/0085151 A1 Jul. 4, 2002

Related U.S. Application Data

(63) Continuation-in-part of application No. 08/805,603, filed on Feb. 26, 1997, now Pat. No. 5,940,150, and a continuation-in-part of application No. 08/739,467, filed on Oct. 29, 1996, now Pat. No. 6,034,753, which is a continuation-in-part of application No. 08/550,022, filed on Oct. 30, 1995, now Pat. No. 5,691,789, application No. 09/032,302, which is a continuation-in-part of application No. 08/787,282, filed on Jan. 24, 1997, now Pat. No. 6,338,807, which is a continuation of application No. 08/265,949, filed on Jun. 2, 1994, now Pat. No. 5,599,412, which is a division of application No. 07/798,881, filed on Nov. 27, 1991, now Pat. No. 5,364,552, application No. 09/032,302, which is a continuation-in-part of application No. 08/743,293, filed on Nov. 4, 1996, now Pat. No. 6,133,980, and a continuation-in-part of application No. 08/715,314, filed on Sep. 16, 1996, now Pat. No. 6,188,460.

(51) Int. Cl.[7] .................. G02F 1/1335; C09K 19/02
(52) U.S. Cl. ................. 349/16; 349/115; 349/176
(58) Field of Search .................. 349/16, 115, 176

(56) References Cited

U.S. PATENT DOCUMENTS 3,679,290 A 7/1972 Adams et al.

(List continued on next page.)

OTHER PUBLICATIONS

Video–compatible subtractive color projection with cholesteric liquid–crystal ba by Jurg Funfschilling, et al., Journal of the SID, 1996, p. 41–45.

(List continued on next page.)

Primary Examiner—William L. Sikes
Assistant Examiner—Tarifur R. Chowdhury
(74) Attorney, Agent, or Firm—Thomas J. Perkowski, Esq., P.C.; Ralph J. Crispino

(57) ABSTRACT

An electro-optical glazing structure having reflection and transparent modes of operation for selectively reflecting and transmitting electromagnetic radiation without absorption, respectively. The electro-optical glazing structure comprising: an electro-optical panel having first and second optical states of operation; a composite broad-band infrared (IR) reflective polarizing filter structure of electrically-passive construction, mounted to the electro-optical panel; and an optical state switching mechanism for switching the electro-optical panel to the first optical state of operation in order to induce the electro-optical glazing structure into the reflection mode of operation, and for switching the electro-optical panel to the second optical state of operation in order to induce the electro-optical glazing structure into the transparent mode of operation. When the electro-optical panel is switched to the first optical state of operation, electromagnetic radiation within a first prespecified bandwidth falling incident upon the electro-optical panel is reflected from the electro-optical panel without absorption. When the electro-optical panel is switched to the second optical state of operation, electromagnetic radiation within a second prespecified bandwidth falling incident upon the electro-optical panel is transmitted through the electro-optical panel without absorption. By virtue of the present invention, the glazing structure is capable of providing both thermal insulation as well as privacy functions.

12 Claims, 32 Drawing Sheets

U.S. PATENT DOCUMENTS

| | | | |
|---|---|---|---|
| 3,711,181 A | | 1/1973 | Adams, Jr. et al. |
| 3,986,022 A | * | 10/1976 | Hyatt .......................... 349/16 |
| 4,073,571 A | | 2/1978 | Grinberg et al. |
| 4,097,130 A | | 6/1978 | Cole |
| 4,475,031 A | | 10/1984 | Mockovciak, Jr. |
| 4,566,758 A | | 1/1986 | Bos |
| 4,579,422 A | | 4/1986 | Simoni et al. |
| 4,641,922 A | | 2/1987 | Jacob |
| 4,663,083 A | | 5/1987 | Marks |
| 4,719,507 A | | 1/1988 | Bos |
| 4,728,547 A | * | 3/1988 | Vaz et al. ...................... 349/16 |
| 4,749,261 A | | 6/1988 | McLaughlin et al. |
| 4,750,814 A | | 6/1988 | Suzuki |
| 4,890,902 A | | 1/1990 | Doane et al. |
| 4,902,112 A | | 2/1990 | Lowe |
| 4,964,251 A | | 10/1990 | Baughman et al. |
| 5,015,086 A | | 5/1991 | Okaue |
| 5,113,270 A | * | 5/1992 | Fergason ...................... 349/16 |
| 5,152,111 A | * | 10/1992 | Baughman et al. ........... 349/16 |
| 5,193,015 A | | 3/1993 | Shanks |
| 5,197,242 A | | 3/1993 | Baughman et al. |
| 5,221,982 A | | 6/1993 | Faris |
| 5,325,218 A | | 6/1994 | Willet et al. |
| 5,327,285 A | | 7/1994 | Faris |
| 5,399,390 A | | 3/1995 | Akins |
| 5,408,187 A | | 4/1995 | Mackie |
| 5,418,631 A | | 5/1995 | Tedesco |
| 5,437,811 A | | 8/1995 | Doane et al. |
| 5,570,216 A | | 10/1996 | Lu et al. |
| 5,650,865 A | | 7/1997 | Smith et al. |
| 5,667,897 A | | 9/1997 | Hamid et al. |
| 5,686,979 A | | 11/1997 | Weber et al. |
| 5,691,795 A | | 11/1997 | Doane et al. |
| 5,699,133 A | | 12/1997 | Furuta |
| 5,796,454 A | | 8/1998 | Ma |
| 5,940,150 A | * | 8/1999 | Faris et al. .................... 349/16 |
| 6,072,549 A | | 6/2000 | Faris |
| 2002/0041424 A1 | * | 4/2002 | Lynam ........................ 359/275 |

OTHER PUBLICATIONS

Chromogenic Switchable Glazing: Towards the Development of the Smart Window by Carl M. Lampert, Window Innovation Conference, Toronto, Canada, 1995.

Cholesteric Reflectors with a Color Pattern by Jurg Funfschilling, et al., Journal of the SID, 4/1, 1996, 1994, p. 399–402.

Holographic Color Filters For LCDs by J. Biles, SID 94 Digest, 1994, p. 403–406.

Design Issues in Using Thin–Film Optical Interference Filters as Color Filters F by S–F. Chen, et al., SID 94 Digest, 1994, p. 411–416.

A Systems Approach to Color Filters for Flat–Panel Displays by J. Hunninghake, et al., SID 94 Digest, 1994, p. 407–410.

Optical Switching Technology For Glazings by Carl M. Lampert, SID Thin Solid Films, 236, 1993, p. 6–13.

Polarizing Color Filters Made From Cholesteric LC Silicones by Robert Maurer, et al., SID 90 Digest, vol. 0, No. 0, 1990, p. 110–113.

\* cited by examiner

TOTALLY REFLECTING STATE

TRANSMISSION STATE

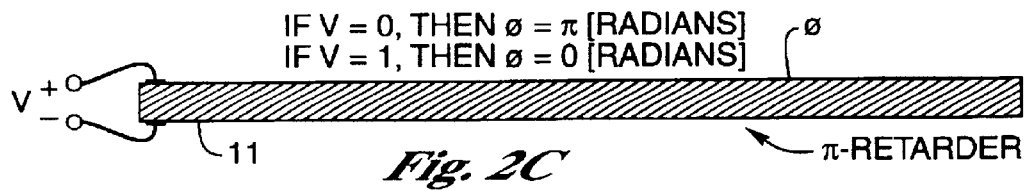
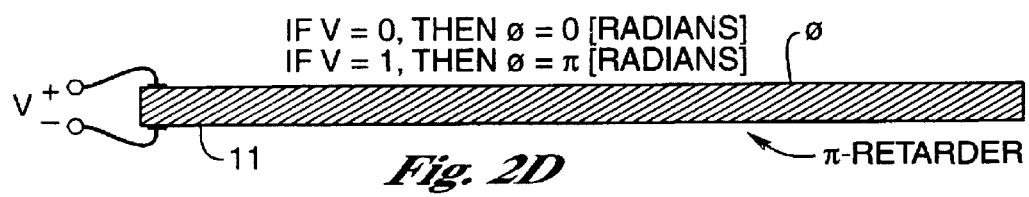
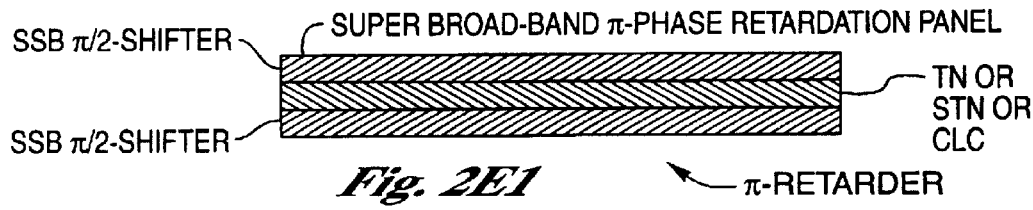
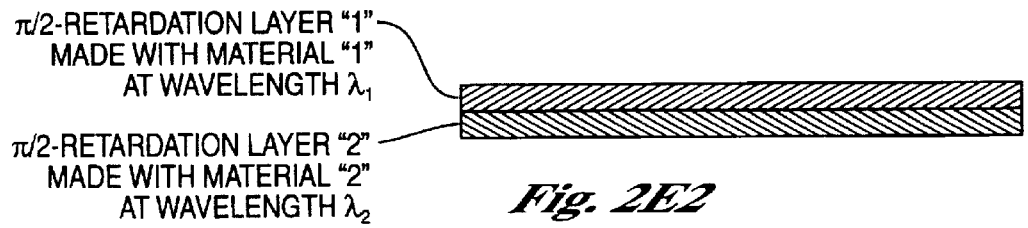
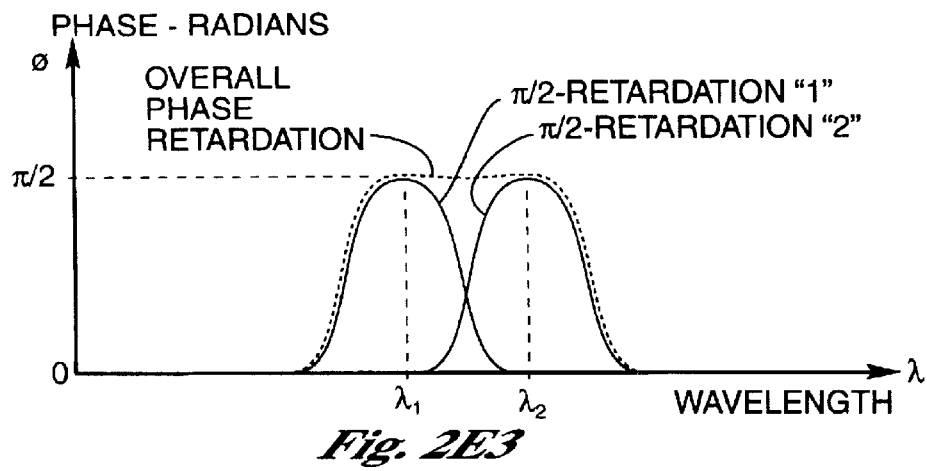

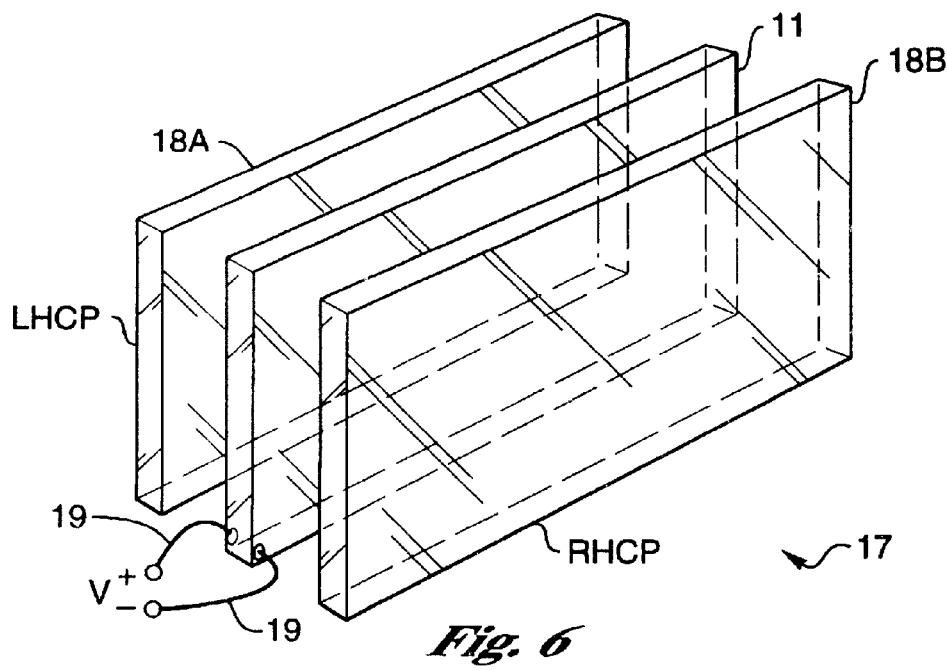
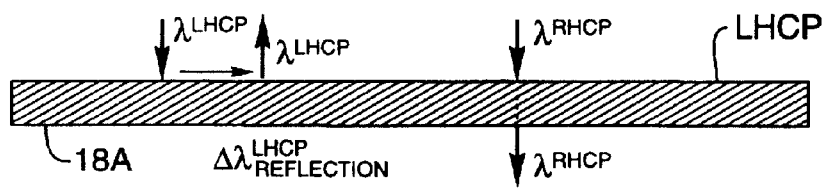
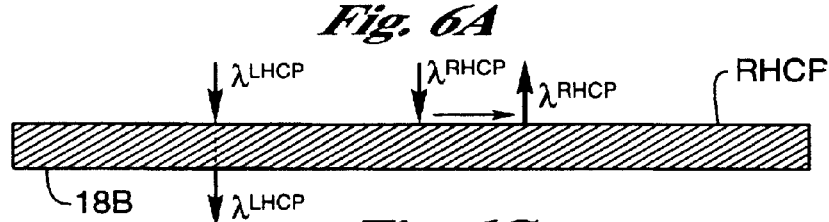
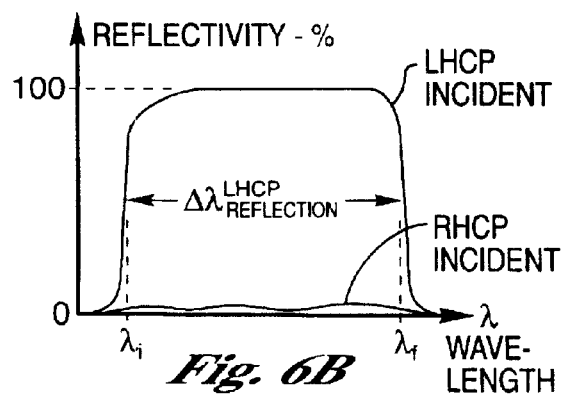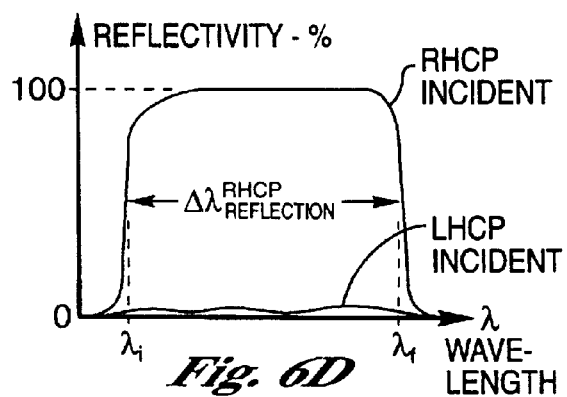

ASSYMMETRICAL TRANSPARENT
50% TRANSMISSION
50% REFLECTION

OPAQUE SYMMETRICAL
TOTAL REFLECTION

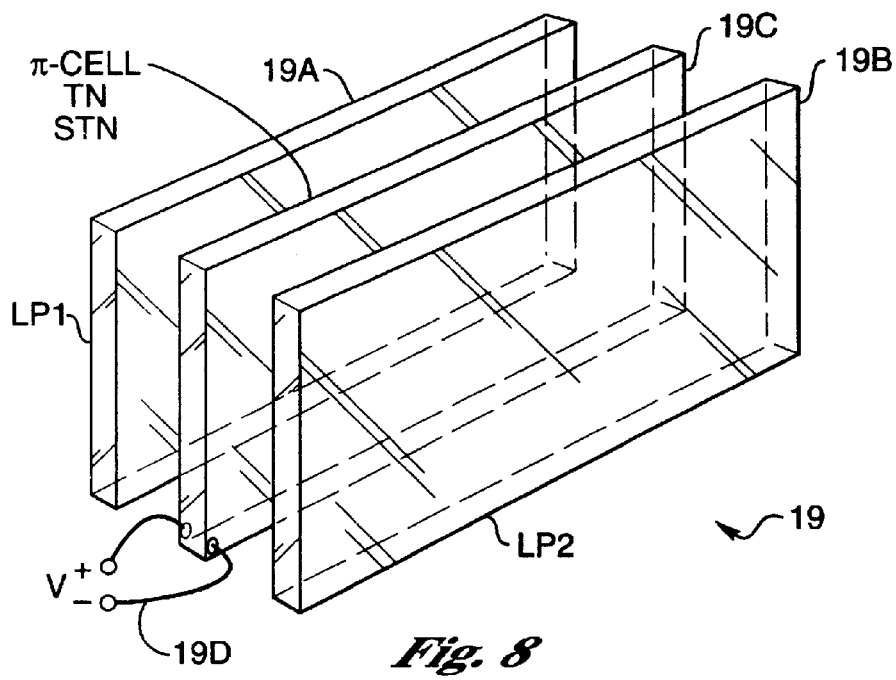
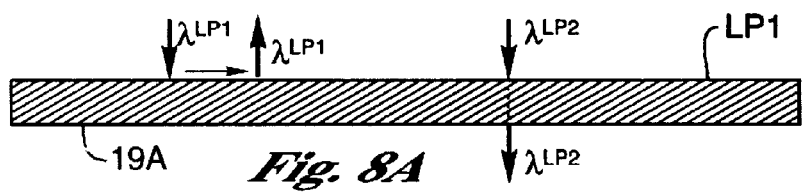
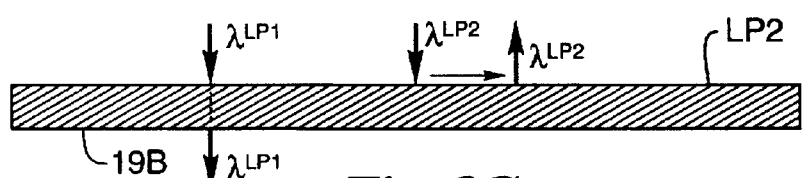
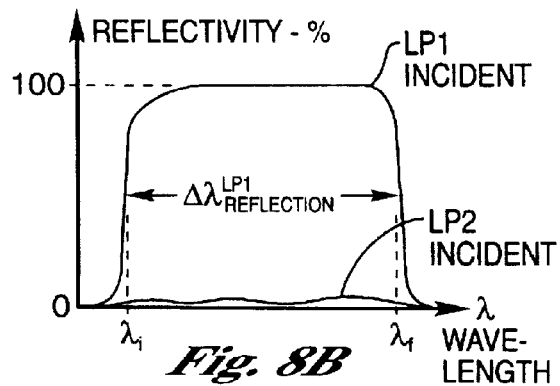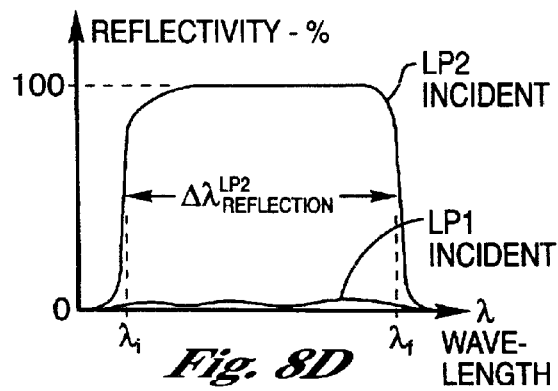

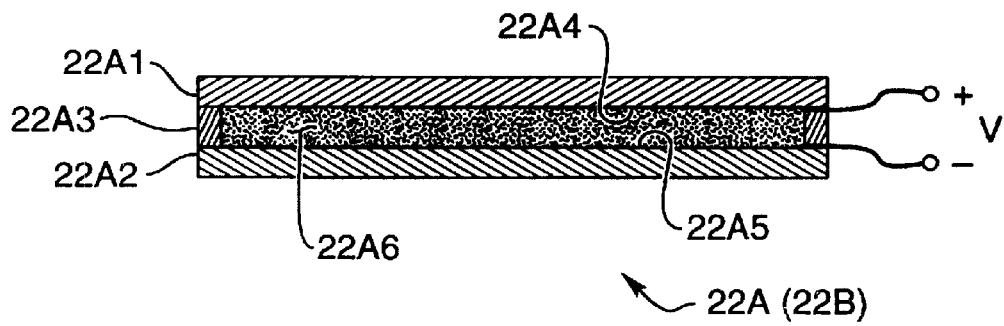
Fig. 11
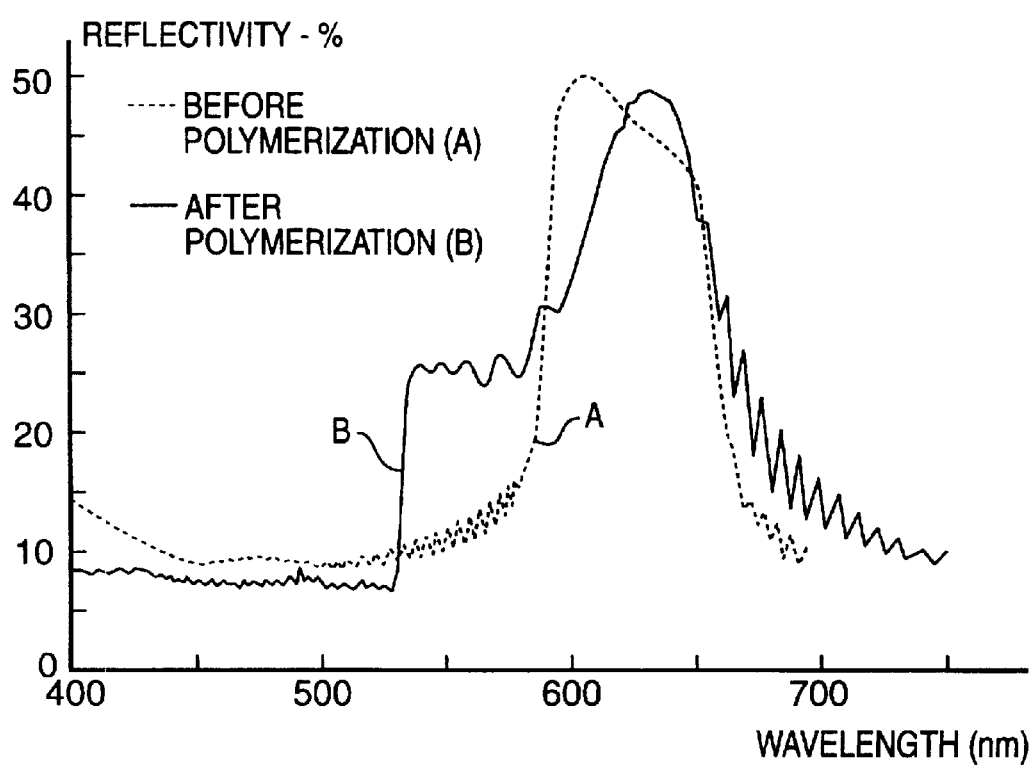
Fig. 11A1

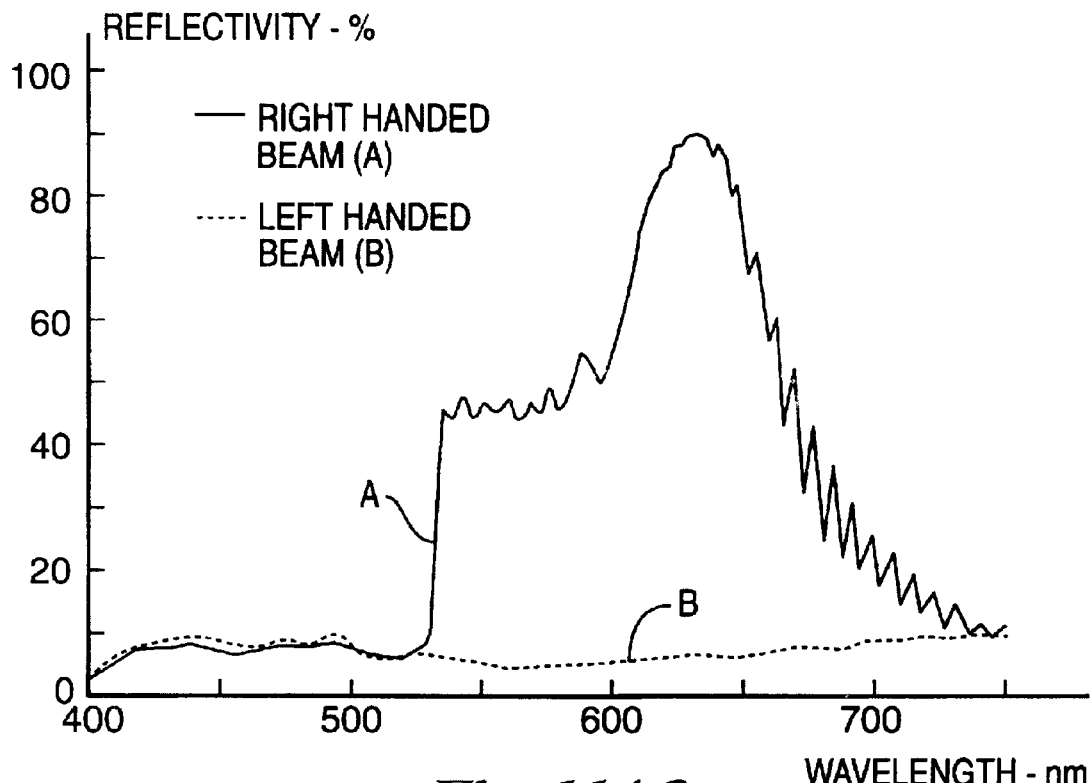
*Fig. 11A2*
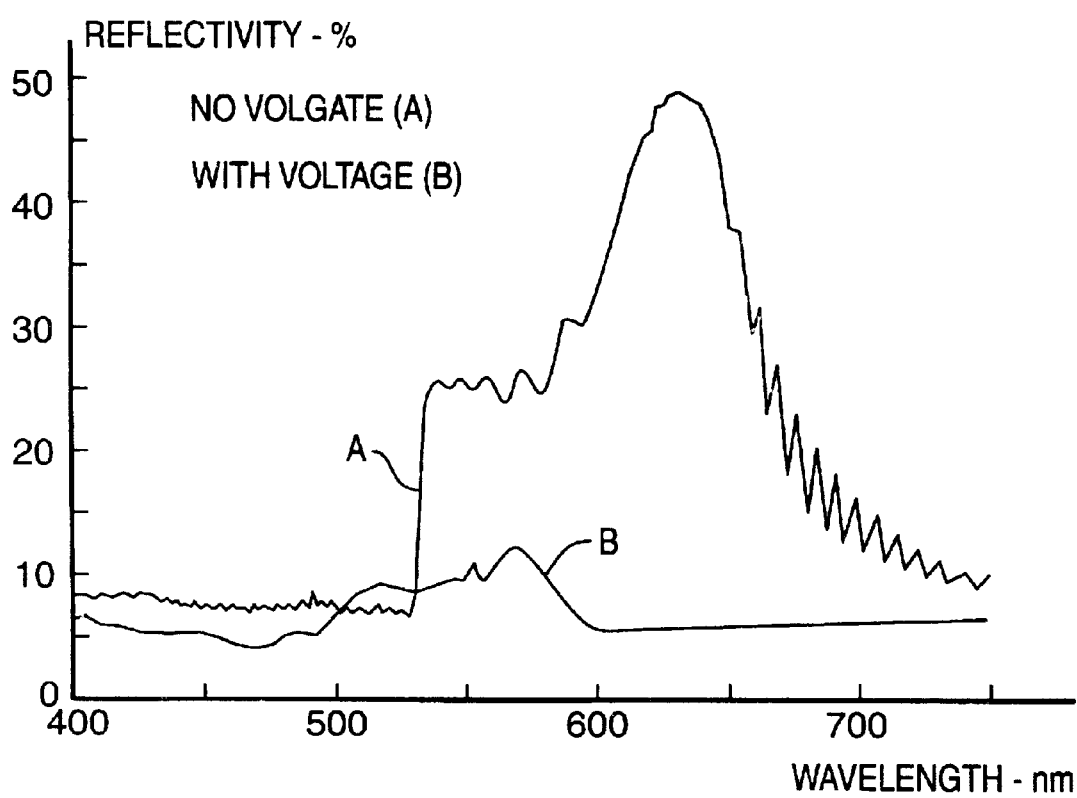
*Fig. 11A3*

TOTAL REFLECTION
OPAQUE SYMMETRICAL

TOTAL TRANSMISSION
CLEAR SYMMETRICAL

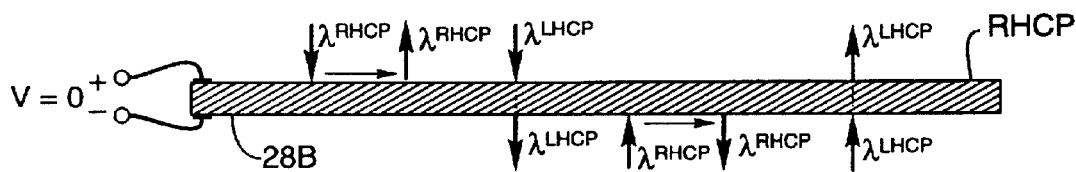
*Fig. 14E*
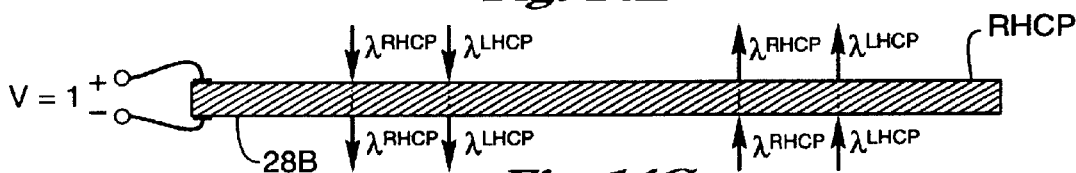
*Fig. 14G*
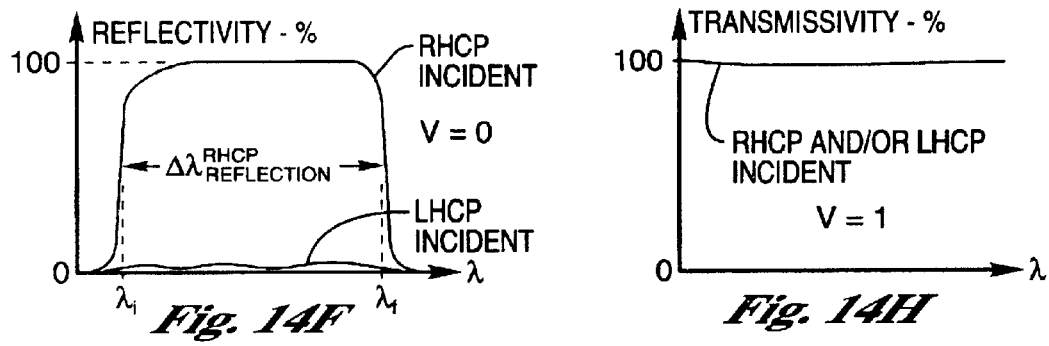
*Fig. 14F*    *Fig. 14H*
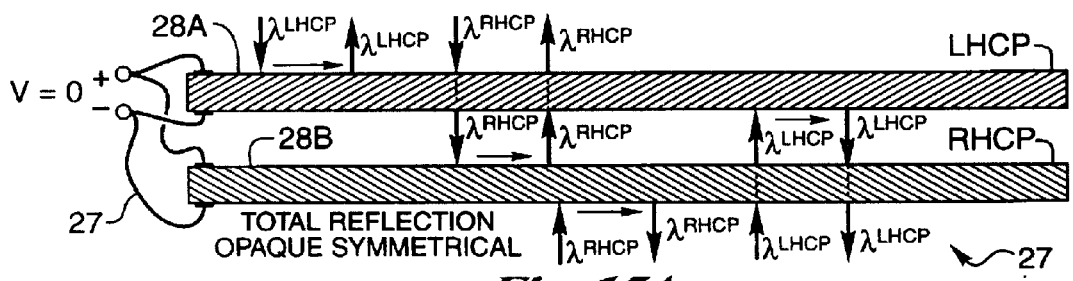
*Fig. 15A*
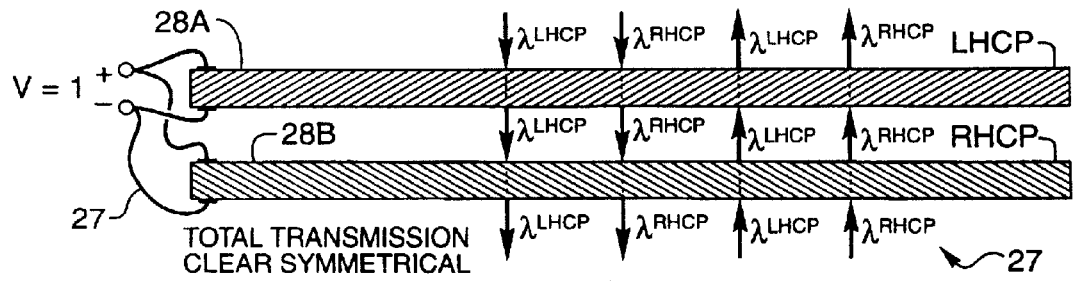
*Fig. 15B*

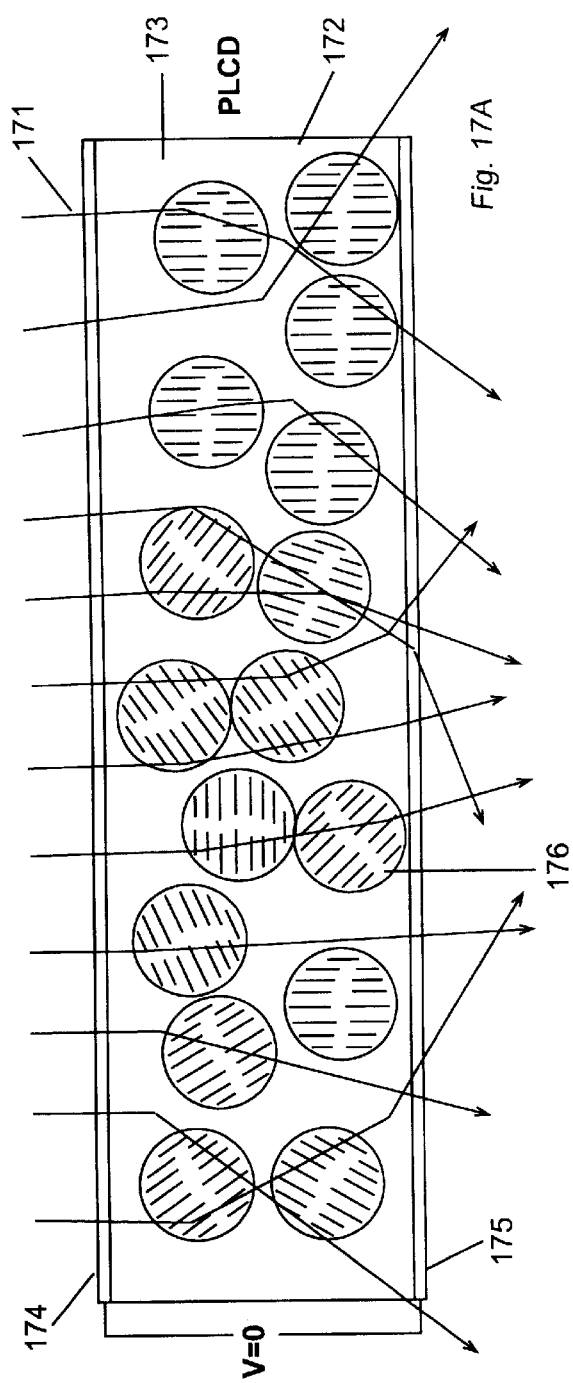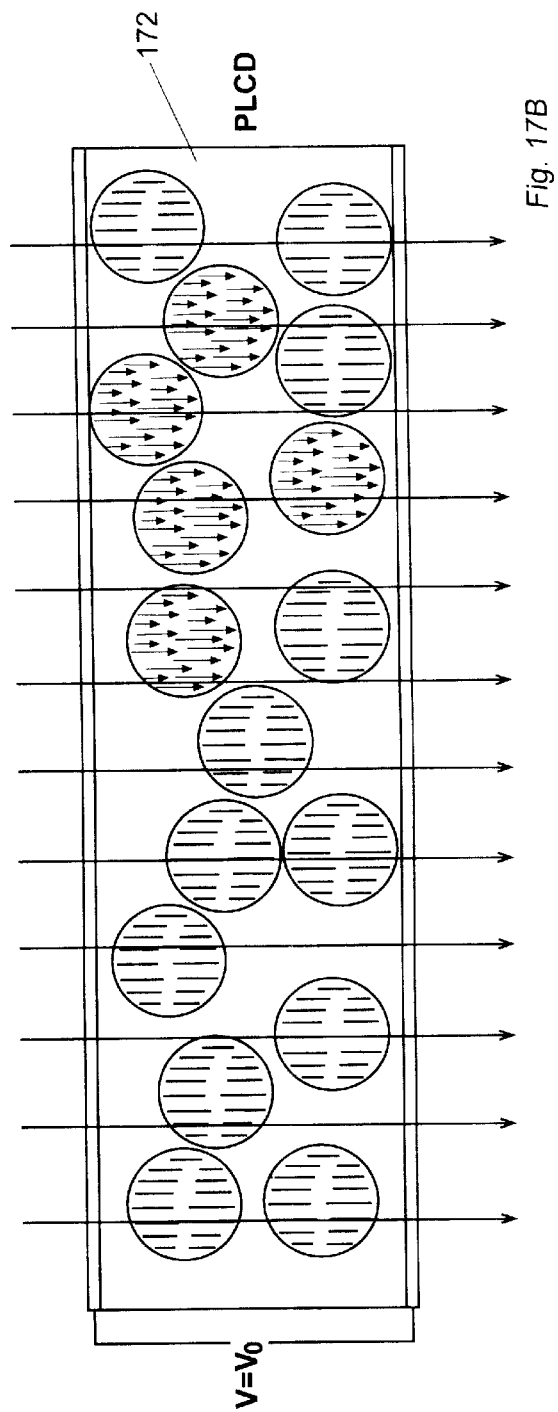

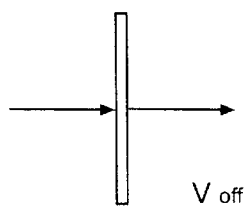
$V_{off}$  FIG. 19A
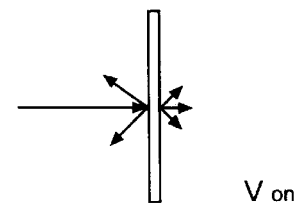
$V_{on}$  FIG. 19D
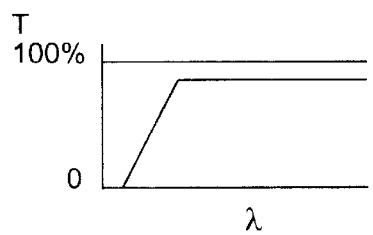
FIG. 19B
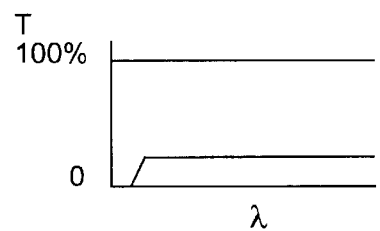
FIG. 19E
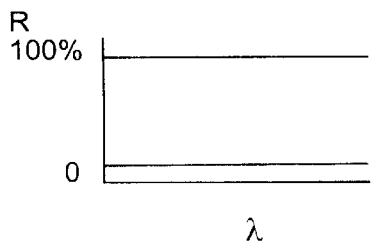
FIG. 19C
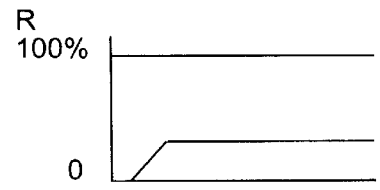
FIG. 19F
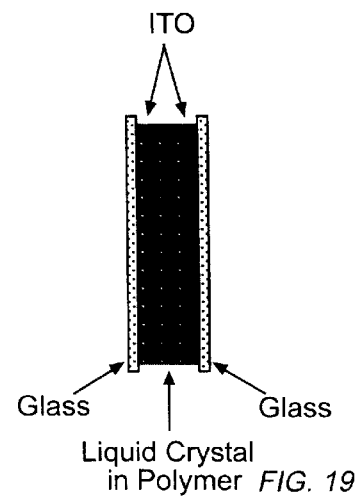
FIG. 19

V off

V on

The BB Polarizers are of a different handedness

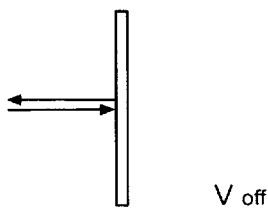
V off  *FIG. 22A*
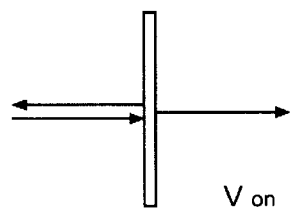
V on  *FIG. 22D*
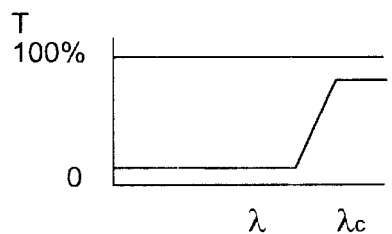
*FIG. 22B*
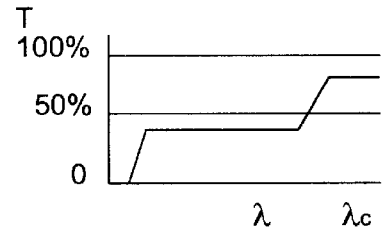
*FIG. 22E*
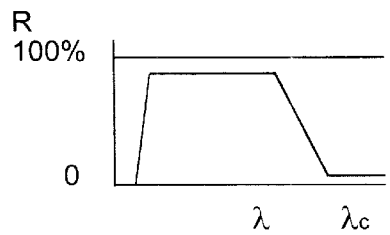
*FIG. 22C*
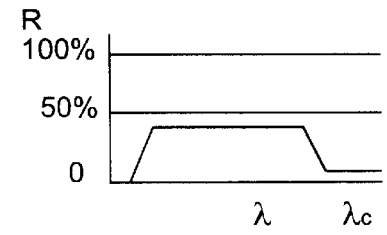
*FIG. 22F*
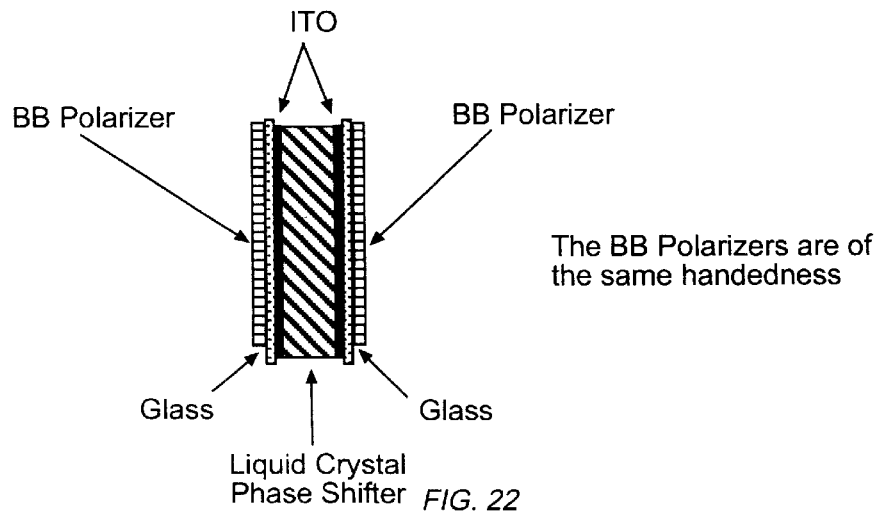
The BB Polarizers are of the same handedness
*FIG. 22*

V off

V on

V off

V on

V off

V on

The BB Polarizers are of the same handedness

V off

V on

The BB Polarizers are of the same handedness

V off

V on

Prior Art layer distributions

Depth of Polymer Layer

Non linear increase

Depth of Polymer Layer

NON-ABSORPTIVE ELECTRO-OPTICAL GLAZING STRUCTURE EMPLOYING COMPOSITE INFRARED REFLECTIVE POLARIZING FILTER

RELATED CASES

This is a Continuation-in-part of: application Ser. No. 08/805,603 entitled "Electro-optical Glazing Structures Having Total-reflection And Transparent Modes Of Operation For Use In Dynamical Control Of Electromagnetic Radiation " filed Feb. 26, 1997, now U.S. Pat. No. 5,940,150 application Ser. No. 08/739,467 entitled "Super Broadband Reflective Circularly Polarizing Material And Method Of Fabricating And Using Same In Diverse Applications", by Sadeg M. Faris and Le Li filed Oct. 29, 1996, now U.S. Pat. No. 6,034,753, which is a Continuation-in-Part of application Ser. No. 08/550,022 entitled "Single Layer Reflective Super Broadband Circular Polarizer and Method of Fabrication Therefor" by Sadeg M. Faris and Le Li filed Oct. 30, 1995, now U.S. Pat. No. 5,691,789; application Ser. No. 08/787,282 entitled "Cholesteric Liquid Crystal Inks" by Sadeg M. Faris filed Jan. 24, 1997 Now U.S. Pat. No. 6,338,807, which is a Continuation of application Ser. No. 08/265,949 filed Jun. 2, 1994, now U.S. Pat. No. 5,599,412, which is a Divisional of application Ser. No. 07/798,881 entitled "Cholesteric Liquid Crystal Inks" by Sadeg M. Faris filed Nov. 27, 1991, now U.S. Pat. No. 5,364,557; application Ser. No. 08/715,314 entitled High-Brightness Color Liquid Crystal Display Panel Employing Systemic Light Recycling And Methods And Apparatus For Manufacturing The Same" by Sadeg Faris filed Sep. 16, 1996 now U.S. Pat. No. 6,188,460; and application Ser. No. 08/743,293 entitled "Liquid Crystal Film Structures With Phase-Retardation Surface Regions Formed Therein And Methods Of Fabricating The Same" by Sadeg Faris filed Nov. 4, 1996 now U.S. Pat. No. 6,133,980; each said Application being commonly owned by Reveo, Inc, and incorporated herein by reference in its entirety.

BACKGROUND OF THE INVENTION

1. Field of Invention

The present invention relates generally to an electro-optical glazing structure having total-reflection and semi-transparent and totally-transparent modes of operation which are electrically-switchable for use in dynamically controlling electromagnetic radiation flow in diverse applications.

2. Brief Description of the Prior Art

The use of windows in homes, commercial buildings, and automotive vehicles alike is very well known. The reasons for providing windows in such structures and systems are directly related to the functions they perform. For example, window structures provide for ventilation, lighting, a sense of spaciousness, as well as a way of making contact with the outdoors. Windows made of glazing (e.g. glass material) also permit selective transmission of electromagnetic radiation between the outdoors and the interior space of homes, commercial buildings, and automotive vehicles. While conventional forms of glazing serves many useful functions, such forms are not without problems.

An appreciation of the problems presented by the use of conventional glazing in windows, can be most easily attained by recognizing the nature and composition of electromagnetic radiation with which windows universally come in contact.

On a clear day at sea level, electromagnetic radiation is composed of 3% ultraviolet light (i.e. electromagnetic radiation in the UV band), 44% visible light (i.e. electromagnetic radiation in the visible band), and 53% infrared light (i.e. electromagnetic radiation in the IR band). In accordance with the laws of physics, 50% of all electromagnetic radiation produced is left hand circularly polarized (LHCP) while the other 50% thereof is right hand circularly polarized (RHCP). The total electromagnetic radiation striking a window surface is a combination of direct radiation from the Sun and diffuse radiation from the ambient environment. While electromagnetic radiation is broad-band in nature, it is the ultraviolet light component thereof which causes molecular decomposition in various types of plastic material and inorganic dyes, which results in color fading.

When electromagnetic radiation strikes a glass window, three different physical processes occur. Some of the radiant energy is transmitted through the glass; some of the radiant energy is reflected off the glass; and a small portion of the radiant energy is absorbed by the glass. The energy transmitted through the glass window is typically absorbed by furnishings or structures within the interior environment, and often becomes trapped therewithin causing an increase in interior temperature.

Depending on the season, electromagnetic radiation transmitted through glass windows can be either mitigate or worsen the thermal loading imposed upon the heating and cooling systems associated with the glass windows. Consequently, during the hot weather season, it is highly desired to shield windows and sliding glass doors from electromagnetic radiation in order to lessen thermal loading upon cooling systems. During cold weather season, it is highly desired to expose windows and sliding glass doors to electromagnetic radiation in order to lessen thermal loading on heating systems.

In short, it is highly desired to selectively control the transmission of electromagnetic radiation through window structures at different times of the day and year so that thermal loading upon the heating and cooling systems of residential, commercial and industrial building environments can be minimized. By minimizing such thermal loading, power can be used in an economical manner to control the internal temperature of residential, commercial and industrial building environments. Achievement of this goal would impact the natural environment in a positive manner, while improving the quality of life.

With such objectives in mind, great effort has been expended in recent times to improve the ways and means of selectively controlling the transmission of electromagnetic radiation through window structures.

One approach to electromagnetic radiation control involves using a window shade to reduce the transmission of electromagnetic radiation through windows. The most popular type of shade is the window blind. However, as window blind is mounted within the interior of the building or transportation environment, electromagnetic radiation is allowed transmit through the window, raise the temperature within the internal environment, and thus increase thermal loading on cooling systems during the hot weather season. Also, the operation of window blinds requires mechanical or electro-mechanical controls which tend to be bulky and expensive to manufacture, install and maintain.

Another approach to electromagnetic radiation control involves the use of sun control films which are physically applied to the surface of glass windows in building and automotive vehicles alike. Presently a variety of different types of sun control film are marketed by various firms. Such electromagnetic control films can be categorized into one of the three basic categories, namely: high reflectivity film; heat saving or winter film; and fade protection film.

High reflectivity electromagnetic films are most effective at blocking summer heat. The higher the reflectivity of electromagnetic film, the more effective it will be at blocking electromagnetic radiation. Electromagnetic reflectivity film having a silver, mirror-like surface is more effective in blocking electromagnetic radiation than the colored, more transparent films. Electromagnetic reflectivity films can lower the U-value of glass by more than 10%. Notably, in climates having long heating seasons, the use of high reflectivity film prevents using the winter sun to warm the interior of buildings during the cold weather season, and thus lessen thermal loading on building heating systems.

Heat-saving or winter films are designed to reduce winter heat losses through glazing. These films can lower the U-value of glass windows by more than 20%.

Fade-protection films are designed to filter out ultraviolet rays. Ultraviolet rays cause about 60–65% of color fading in most home furnishing fabrics and automobile dash boards.

While electromagnetic radiation control films of the types described above can be used to control heat and glare, eliminate sun damage, and to a lesser extent, reduce visibility into buildings during the daytime. The major disadvantages thereof are reduction in interior light, loss of visibility, and extra care required in cleaning. Moreover, prior art electromagnetic window films are incapable of changing from transmissive during winter months to reflective during summer months in order to effectively use electromagnetic radiation for dynamic temperature control of biological environments (e.g. human habitats, greenhouses and the like).

An alternative approach to electromagnetic radiation control involves using special glass panels having radiation transmission characteristics which effectively absorb (i.e. block) the infrared and ultra violet wavelengths, while transmitting the visible wavelengths thereby allowing window viewing and day light to enter the interior spaces of buildings using such window technology. While the light transmission characteristics of such glass provides a measure of electromagnetic radiation control during cooling seasons, where outdoor temperatures tend to be above 72 degrees Fahrenheit, its IR absorption characteristics prevents, during heating season, IR wavelengths of Sun light to warm the interior spaces of building structures in which such glass panels are installed. Consequently, during heating seasons, such glass fails to lessen the thermal loading on the heating systems of such buildings, as would be desired in an effort to conserve energy and heating resources during the winter months.

In recent times, there has been great interest in using variable light transmission glass or glazing, referred to as "smart windows", to achieve electromagnetic radiation (i.e. energy) control in buildings and vehicles alike. The reason for using smart window structures, rather than conventional glass window panels, is quite clear. Smart window structures have light transmission characteristics that can be electrically controlled during the course of the day (or year) in order to meet lighting needs, minimize thermal load on heating and/or cooling systems, and provide privacy within the interior spaces of buildings and vehicles alike.

The use of chromogenic switchable glazing or smart windows for controlling the flow of light and heat into and out of a glazing according to occupant comfort, is discussed in great detail in the following papers: "Chromogenic Switchable Glazing: Towards the Development of the Smart Window" by Carl Lempert published in the June 1995 Proceedings of the Window Innovation Conference, Toronto, Canada; and "Optical Switching Technology for Glazings" by Carl Lempert published in Thin Solid Films, Volume 236, 1993, pages 6–13, both incorporated herein by reference.

In general, there are several different types chromogenic switchable glazing or smart windows, namely: non-electrically activated switchable glazings; and electrically-activated switchable glazings. The non-electrically activated types of chromogenic switchable glazing are based on: photochromics, thermochromics and thermotropics. The most common electrically-activated types of chromogenic switchable glazing are based on polymer dispersed liquid crystals (PDLC), dispersed particle systems (DPS), and electrochromics.

Prior art smart window structures based upon conventional twisted nematic (TN) or super twist nematic (STN) liquid crystal technology require the use of a pair of polarizers. This, however, results in high optical loss, as up to 60% of the incident light is absorbed by the polarizers, in the desired non-blocking mode of operation.

While a smart window structure based on polymer dispersed liquid crystal (PDLC) technology offers better performance than TN or STN based window structures, such smart window structures suffer from several significant shortcomings. In particular, conventional PDLC panels have a translucent state which can be used only to provide privacy, but lack a totally opaque state and a totally reflective state required for electromagnetic radiation control functions. In addition, the viewing haze limitation provided by the PDLC panels prevents clear viewing through this prior art window structure at larger viewing angles.

A primary drawback associated with Dispersed Particle Systems is that such systems simply do not have a reflection mode of operation, and thus created heat build-up within interior spaces which is sought to be avoided in thermal radiation control applications.

Thus it is clear that there is a great need in the art for an improved form of variable light transmission glazing structure which avoids the shortcomings and drawbacks of prior art technologies.

DISCLOSURE OF THE INVENTION

Accordingly, a primary object of the present invention is to provide an electro-optical glazing structure which avoids the shortcomings and drawbacks of prior art technologies.

Another object of the present invention is to provide an electro-optical glazing structure which has total-reflection, semi-transparent and totally transparent modes of operation for improved control over the flow of electromagnetic radiation within the solar region of the electromagnetic spectrum (i.e. Solar Spectrum).

A further object of the present invention is to provide such an electro-optical glazing structure, in which the modes of operation can be electrically-activated or switched, while avoiding the use of energy absorbing mechanisms.

A further object of the present invention is to provide such an electro-optical glazing structure having a broad band of operation, including the IR, visible and UV portions of the electromagnetic spectrum.

A further object of the present invention is to provide an electro-optical glazing structure, comprising an electrically-active π-phase retardation panel interposed between a pair of electrically-passive electromagnetic radiation polarizing panels, both of which are capable of reflecting electromagnetic radiation of a certain polarization state, whereby a totally reflective state of operation and a semi-transparent state of operation are provided over the electromagnetic region of the electromagnetic spectrum.

A further object of the present invention is to provide an electro-optical glazing structure, comprising an electrically-active π-phase retardation panel interposed between a pair of electrically-passive electromagnetic radiation polarizing panels, both of which are capable of reflecting electromagnetic radiation of a linear polarization state, whereby a totally reflective state of operation and a semi-transparent state of operation are provided over the electromagnetic region of the electromagnetic spectrum.

A further object of the present invention is to provide an electro-optical glazing structure, comprising an electrically-active π-phase retardation panel interposed between a pair of electrically-passive electromagnetic radiation polarizing panels, both of which are capable of reflecting electromagnetic radiation of a linear polarization state, one is parallel to other, whereby a totally reflective state of operation and a semi-transparent state of operation are provided over the electromagnetic region of the electromagnetic spectrum.

A further object of the present invention is to provide an electro-optical glazing structure, comprising an electrically-active π-phase retardation panel interposed between a pair of electrically-passive electromagnetic radiation polarizing panels, both of which are capable of reflecting electromagnetic radiation of a linear polarization state, one is perpendicular to other, whereby a totally reflective state of operation and a semi-transparent state of operation are provided over the electromagnetic region of the electromagnetic spectrum.

A further object of the present invention is to provide an electro-optical glazing structure, comprising an electrically-active π-phase retardation panel interposed between a pair of electrically-passive cholesteric liquid crystal (CLC) electromagnetic radiation polarizing panels, both of which are capable of reflecting electromagnetic radiation of a LHCP state, whereby a totally reflective state of operation and a semi-transparent state of operation are provided over the electromagnetic region of the electromagnetic spectrum.

A further object of the present invention is to provide an electro-optical glazing structure, comprising an electrically-active π-phase retardation panel interposed between a pair of electrically-passive CLC electromagnetic radiation polarizing panels, both of which are capable of reflecting electromagnetic radiation of a RHCP state, whereby a totally reflective state of operation and a semi-transparent state of operation are provided over a broad-band region of the electromagnetic spectrum.

A further object of the present invention is to provide an electro-optical glazing structure, comprising an electrically-active π-phase retardation panel interposed between a pair of electrically-passive CLC electromagnetic radiation polarizing panels, one of which is capable of reflecting electromagnetic radiation of the LHCP state and the other of which is capable of reflecting electromagnetic radiation of the RHCP state, whereby a totally reflective state of operation and a semi-transparent state of operation are provided over a broad-band region of the electromagnetic spectrum.

A further object of the present invention is to provide an electro-optical glazing structure, comprising an electrically-passive π-phase retardation panel interposed between a pair of electrically-active CLC electromagnetic radiation polarizing panels, both of which are capable of reflecting electromagnetic radiation of the LHCP state, whereby a totally reflective state of operation and a totally transparent state of operation are provided over a broad-band region of the electromagnetic spectrum.

A further object of the present invention is to provide an electro-optical structure, comprising an electrically-passive π-phase retardation panel interposed between a pair of electrically-active CLC electromagnetic radiation polarizing panels, both of which are capable of reflecting electromagnetic radiation of the RHCP state, whereby a totally reflective state of operation and a semi-transparent state of operation are provided over a broad-band region of the electromagnetic spectrum.

A further object of the present invention is to provide an electro-optical glazing structure, comprising a pair of electrically-active CLC electromagnetic radiation polarizing panels, one of which is capable of reflecting electromagnetic radiation of the LHCP state and the other of which is capable of reflecting electromagnetic radiation of the RHCP state, whereby a totally reflective state of operation and a totally transparent state of operation are provided over a broad-band region of the electromagnetic spectrum.

Another object of the present invention is to provide an actively-controlled window or viewing panel constructed from the electro-optical glazing structure of the present invention, wherein the transmission of electromagnetic radiation can be dynamically controlled over a broad-band region of the electromagnetic spectrum, between 50% transmission to 100% reflection and between 100% transmission to 100% reflection.

Another object of the present invention is to provide an actively-controlled window or viewing panel constructed from the electro-optical glazing structure of the present invention, wherein the transmission of electromagnetic radiation over the UV and IR regions of the electromagnetic spectrum can be totally reflected, rather than absorbed, reducing the temperature cycle range which the window structure is required to undergo.

Another object of the present invention is to combine the electro-optical glazing panel of the present invention with a controllable scattering layer or structure in order to scatter light transmitted therethrough or reflected therefrom.

Another object of the present invention is to provide an actively-controlled window or viewing panel constructed from the electro-optical glazing structures of the present invention, wherein only UV and IR radiation is reflected at the window surface, while electromagnetic radiation over the visible band is transmitted to the interior environment being maintained under thermal control.

Another object of the present invention is to provide an intelligent window system for installation within a house or office building, or aboard a transportation vehicle such as an airplane or automobile, wherein the electro-optical glazing structure thereof is supported within a prefabricated window frame, within which are mounted: a electromagnetic-sensor for sensing electromagnetic conditions in the outside environment; a battery supply for providing electrical power; a electromagnetic-powered battery recharger for recharging the battery; electrical circuitry for producing glazing control voltages for driving the electrically-active elements of the electro-optical glazing supported within the window frame; and a micro-computer chip for controlling the operation of the battery recharger and electrical circuitry and the production of glazing control voltages as required by a radiation flow control program stored within the programmed microcontroller.

A further object of the present invention is to provide such an electro-optical window structure which is designed for integration within the heating/cooling system of a house, office building, factory or vehicle in order to control the flow of broad-band electromagnetic radiation through the electro-optical window structure, while minimizing thermal loading upon the heating/cooling system thereof.

Another object of the present invention is to provide a thermal/viewing shield or panel made from electro-optical glazing structure of the present invention.

Another object of the present invention is to provide of an intelligent pair of sunglasses, in which each optical element is realized using an electro-optical glazing structure of the present invention, fashioned to the dimensions of a sunglass frame.

Another object of the present invention is to provide of an intelligent pair of shutter glasses, in which each optical element is realized using an electro-optical glazing structure of the present invention, fashioned to the dimensions of a shutter glass frame.

Another object of the present invention is to provide an intelligent windshield or viewing screen, which is realized from an electro-optical glazing structure of the present invention.

These and other objects of the present invention will become apparent hereinafter and in the Claims to Invention.

BRIEF DESCRIPTION OF THE DRAWINGS

For a more complete understanding of the Object of the Present Invention, the following Detailed Description of the Illustrative Embodiments of the Present Invention should be read in conjunction with the accompanying Drawings, wherein:

FIG. 2C is a schematic representation of a first embodiment of the π-phase retardation panel used in the construction of the glazing structure of FIG. 2, illustrating its operating characteristics in response to different glazing control voltages;

FIG. 2D is a schematic representation of a second embodiment of the π-phase retardation panel used in the construction of the glazing structure of FIG. 2, illustrating its operating characteristics in response to different glazing control voltages;

FIG. 2E1 is a schematic diagram of a super broad-band π-phase retardation panel construction formed by interposing a twisted nematic, super-twisted nematic or cholesteric liquid crystal cell between a pair of electrically-passive broad-band π/2 phase retardation panels;

FIG. 2E2 is a schematic diagram of a broad-band π-phase retardation panel employed in the electrically-switchable super-broad band phase-retardation panel shown in FIG. 2E1, made by laminating a plurality of narrow-band or broad-band π/2 layers, each realized using a material having a different birefringence and its π/2 phase-retardation characteristics centered about a different wavelength;

FIG. 2E3 is a graphical representation of the resulting π/2 phase retardation characteristics provided by the cooperation of the phase retardatation characteristics of the individual narrow-band or broad-band π/2 layers used to construct the electrically-passive super-broad band π/2 phase-retardation panel shown in FIG. 2E2;

FIG. 6 is an exploded perspective view of a third illustrative embodiment of the intelligent electro-optical window of the present invention, comprising an electrically-active π-phase retardation panel interposed between an electrically-passive RHCP electromagnetic radiation reflecting panel and an electrically-passive LHCP electromagnetic radiation reflecting panel, each made from CLC material having polarization-selective reflection characteristics over a broad-band region of the electromagnetic spectrum;

FIG. 6A is a schematic diagram of the LHCP electromagnetic radiation reflecting panel shown in FIG. 6, and its response to both RHCP and LHCP electromagnetic radiation incident thereto;

FIG. 6B is a schematic representation of the electromagnetic radiation reflection characteristics of the LHCP electromagnetic radiation reflecting panel of the window of FIG. 6, over its broadband range of operation, $\alpha\lambda_{reflection}^{RHCP}$;

FIG. 6C is a schematic diagram of the RHCP electromagnetic radiation reflecting panel shown in FIG. 6, and its response to both RHCP and LHCP electromagnetic radiation incident thereto;

FIG. 6D is a schematic representation of the electromagnetic radiation reflection characteristics of the RHCP electromagnetic radiation reflecting panel of the window of FIG. 6, over its broadband range of operation, $\alpha\lambda_{reflection}^{LHCP}$;

FIG. 8 is an exploded perspective view of a fourth illustrative embodiment of the intelligent electro-optical window of the present invention, comprising an electrically-active polarization rotation panel interposed between an electrically-passive linear polarizing (LP1) electromagnetic radiation reflecting panel and an electrically-passive LP1 electromagnetic radiation reflecting panel, each made from CLC material having polarization-selective reflection characteristics over a broad-band region of the electromagnetic spectrum;

FIG. 8A is a schematic diagram of the LP1 electromagnetic radiation reflecting panel shown in FIG. 8, and its response to both LP1 and LP2 electromagnetic radiation incident thereto;

FIG. 8B is a schematic representation of the electromagnetic radiation reflection characteristics of the LP1 electromagnetic radiation reflecting panel of the window of FIG. 8, over its broadband range of operation, $\alpha\lambda_{reflection}^{LP1}$;

FIG. 8C is a schematic diagram of the LP2 electromagnetic radiation reflecting panel shown in FIG. 8, and its response to both LP1 and LP2 electromagnetic radiation incident thereto;

FIG. 8D is a schematic representation of the electromagnetic radiation reflection characteristics of the LP2 electromagnetic radiation reflecting panel of the window of FIG. 8, over its broadband range of operation, $\alpha\lambda_{reflection}^{LP1}$;

FIG. 11 is schematic cross-sectional diagram illustrating the construction of the first illustrative embodiment of the electrically-switchable, circularly polarizing CLC panels used in the electro-optical glazing structures of FIGS. 10, 12 and 14;

FIG. 11A1 is a graphical representation of the reflection characteristics of the first embodiment of the electrically-switchable broad-band CLC panel of FIG. 10, measured prior to UV polymerization of the CLC material contained within the ITO coated substrate plates of the panel, using un-polarized light;

FIG. 11A2 is a graphical representation of the reflection characteristics of the first embodiment of the electrically-switchable broad-band CLC panel of FIG. 10, measured subsequent to UV polymerization of the CLC material contained within the ITO coated substrate plates of the panel, using right-handed and left-handed circularly polarized light;

FIG. 11A3 is a graphical representation of the reflection characteristics of the first embodiment of the electrically-switchable broad-band CLC panel of FIG. 10, measured during electrically inactive (no voltage applied) and electrically-active (voltage applied) states of operation using right-handed circularly polarized light;

FIG. 14E is a schematic diagram of the RHCP electromagnetic radiation reflecting panel shown in FIG. 14, and its response to both RHCP and LHCP electromagnetic radiation incident thereto when operated in its RHCP radiation reflecting state;

FIG. 14F is a schematic representation of the electromagnetic radiation reflection characteristics of the RHCP electromagnetic radiation reflecting panel of FIG. 14, over its broadband range of operation $\alpha\lambda_{reflection}^{RHCP}$, when operated in its RHCP radiation reflecting state;

FIG. 14G is a schematic diagram of the RHCP electromagnetic radiation reflecting panel shown in FIG. 14, and its response to both RHCP and LHCP electromagnetic radiation incident thereto when operated in its radiation transmission state;

FIG. 14H is a schematic representation of the electromagnetic radiation transmission characteristics of the RHCP electromagnetic radiation reflecting panel of FIG. 14, over its broadband range of operation $\alpha\lambda_{transmission}^{RHCP}$, when operated in its radiation transmission state;

FIG. 15A is a schematic diagram illustrating the operation of the intelligent electro-optical window of FIG. 14, where the control voltages provided to both LHCP and RHCP electromagnetic radiation reflecting panels are selected so that the window panel is switched into its the optically opaque state of operation;

FIG. 15B is a schematic diagram illustrating the operation of the intelligent electro-optical window of FIG. 14, where the control voltages provided to both RHCP electromagnetic radiation reflecting panels are selected so that the window panel is switched into its the optically transparent (i.e. clear) state of operation;

FIGS. 17A and 17B show a first illustrative embodiment of an electrically-controllable light scattering structure mountable to any embodiment of the electro-optical glazing structure of the invention disclosed or taught herein in order to scatter that portion of incident light which is not reflected during its reflection-mode of operation, thereby improving the privacy function of the glazing structure in the reflection mode;

FIG. 19 shows a fourth illustrative embodiment of an electrically-controllable light scattering structure mountable to any embodiment of the electro-optical glazing structure of the invention disclosed or taught herein in order to scatter that portion of incident light which is not reflected during its reflection-mode of operation, thereby improving the privacy function of the glazing structure in the reflection mode;

FIG. 19A shows the electro-optical light scattering structure of FIG. 19 operated in its transmission mode, wherein no external voltage is applied (i.e. $V=V_{off}$);

FIGS. 19B and 19C show transmission and reflection characteristics for the mode of operation indicated in FIG. 19A;

FIG. 19D shows the electro-optical light scattering structure of FIG. 19 operated in its light scattering mode, wherein an external voltage V is applied across the ITO surfaces (i.e. $V=V_{on}$);

FIGS. 19E and 19F show transmission and reflection characteristics for the mode of operation indicated in FIG. 19D;

FIGS. 22 through 22F provide a generalized description of the illustrative embodiments disclosed in FIGS. 2 and 4, wherein the electrically-passive broad-band polarizing layers have the same handedness in both the circularly polarizing (LHCP/LHCP or RHCP/RHCP) and linearly polarizing (LP1/LP1 or LP2/LP2) system configurations.

DETAILED DESCRIPTION OF THE ILLUSTRATIVE EMBODIMENTS OF THE PRESENT INVENTION

Figure 1A:
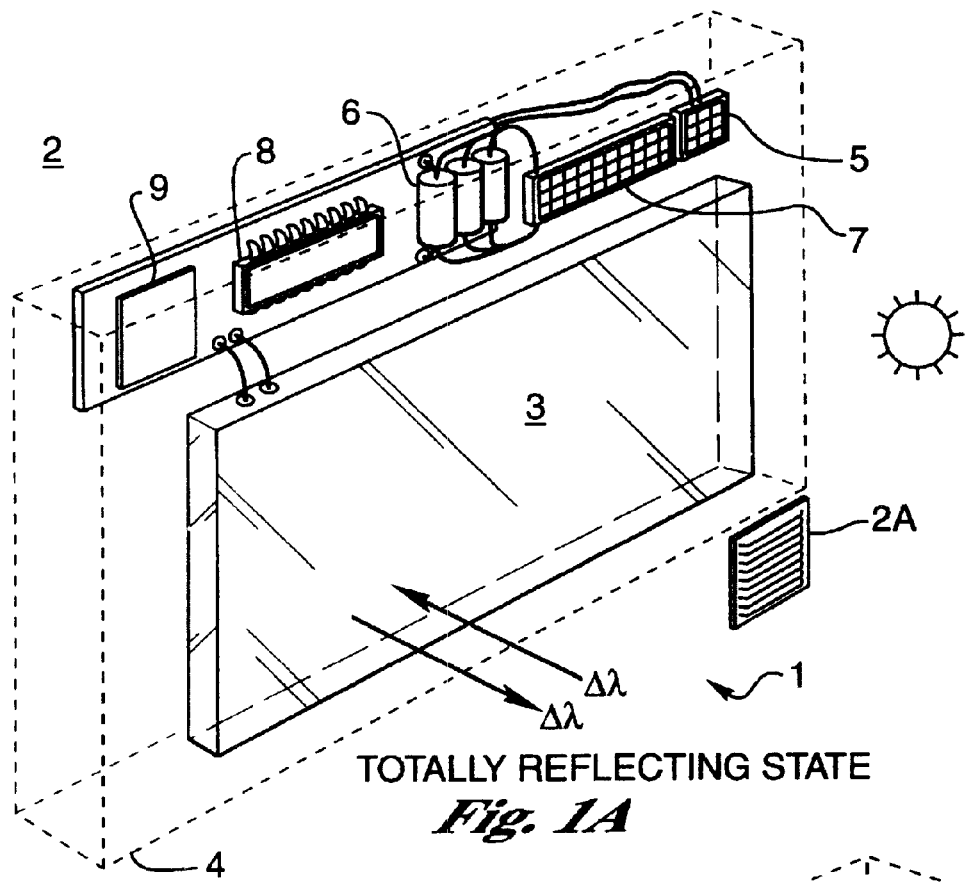
FIG. 1A is a perspective view of a generalized embodiment of the intelligent electro-optical window system of the present invention, wherein the electro-optical glazing structure thereof is electrically switched under microcomputer-control to its totally-reflecting state of operation upon detecting a first set of preprogrammed electromagnetic conditions, whereby broad-band electromagnetic radiation is completely reflected off the electro-optical glazing structure thereof.

Referring now to the accompanying Drawings, illustrative embodiments of the intelligent electro-optical window of the present invention will be described in great detail. In each of the figures, like structures and elements shall be indicated by like reference numerals.

Figure 1B:
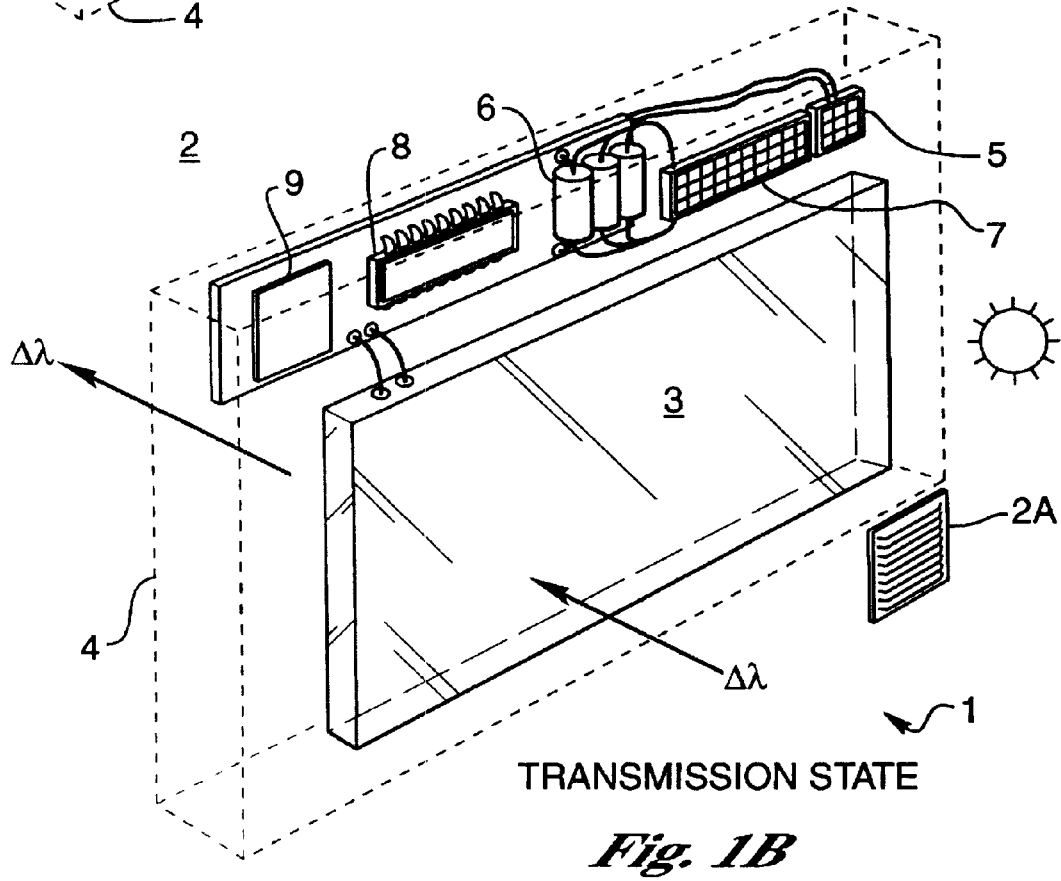
FIG. 1B is a perspective view of the generalized embodiment of the intelligent electro-optical window system shown in FIG. 1A, wherein the electro-optical glazing structure thereof is electrically switched under microcomputer-control to its transmission state of operation upon detecting a second set of preprogrammed electromagnetic conditions, where broad-band electromagnetic radiation is transmitted through the electro-optical glazing structure thereof.

In FIGS. 1A and 1B, a generalized embodiment of the intelligent electro-optical glazing structure (i.e. window structure) of the present invention is shown installed within an environment (e.g. building or vehicle) having an interior space or volume adjacent the window structure. Typically, the interior space or volume functions as a form of human habitat, although there may be applications in which this is not the case. Preferably, the intelligent electro-optical window structure 1 cooperates with the heating/cooling system 2A of a house, office building, factory or vehicle indicated by reference numeral 2. In such preferred applications, the function of the electro-optical window structure will be to selectively control the flow of electromagnetic radiation through its electro-optical glazing structure and into the interior space, in order to minimize or reduce thermal loading upon the heating/cooling system of the environment.

As shown in FIGS. 1A and 1B, the electro-optical glazing structure 1 comprises an electro-optical glazing panel 3 securely supported within a prefabricated window frame 4 which can be realized using virtually any suitable material such as, for example, plastic, metal, rubber, wood or composite material. Within the window frame, a number of system subcomponents are securely mounted, namely: a electromagnetic-radiation sensor 5 for sensing electromagnetic conditions in the outside environment; a rechargeable-type battery 6 for producing electrical power within the window frame; a electromagnetic-powered battery recharger 7 for recharging the rechargeable battery 6; a microcontroller (e.g. RISC-type micro-computer chip with onboard ROM, EPROM and RAM) 8 for controlling the battery recharger and glazing control signals as required by a radiation flow control program stored within the microcomputer chip; and electrical circuitry 9, response to glazing control signals, for producing control voltages that are applied to the electrically-active elements of the electro-optical glazing structure 3 to electrically switch the same from one optical state to another optical state under microcontroller control.

As shown in FIG. 1, when a first set of preprogrammed electromagnetic conditions (e.g. a first prespecified band of electromagnetic radiation having power above a first prespecified power threshold) is detected by electromagnetic-radiation sensor, the electro-optical glazing structure 3 is electrically switched to its totally-reflecting state of operation under the control of preprogrammed microcontroller 8. In this totally-reflecting state of operation, visible and electromagnetic radiation is completely reflected off the glazing structure over a broad band of spectral wavelengths (e.g. 400 to 750 nanometers).

As shown in FIG. 1B, when a second set of preprogrammed electromagnetic conditions (e.g. a second pre-specified band of electromagnetic radiation having power above a second prespecified power threshold) is detected by electromagnetic-radiation sensor, the electro-optical glazing structure 3 is electrically switched to its transmission state of operation under the control of preprogrammed microcontroller 8. In this transmission state, visible and electromagnetic radiation is transmitted through the electro-optical glazing structure over a broad band of spectral wavelengths (e.g. 300 to 1000 nanometers).

While only two particular reflection/transmission states are illustrated in the above generalized embodiment, it is understood that virtually any set of reflection/transmission characteristics can be realized by the window structure of the present invention. In each such alternative embodiment, a particular set of conditions can be predefined to trigger a change in the optical state of the electro-optical glazing structure of the present invention. Then microcontroller is programmed to switch the optical state of the glazing structure upon detecting the corresponding condition. In alternative embodiments, the environmental condition or conditions which cause a switching operation, need not be related to electromagnetic radiation, but may be related to moisture, barometric pressure, temperature, or any other parameter prespecified within the programmed microcontroller 8.

While in theory there exists an infinite number of embodiments of the electro-optical glazing structure of the present invention, six different embodiments of the electro-optical glazing structure will be described in detail below in order to illustrate the inventive features thereof. Notably, each electro-optical glazing structure of the present invention is realized using CLC material having polarization-selective reflection characteristics over a broad-band of operation (i.e. selectively reflecting and/or transmitting RHCP and LHCP wavelengths over the IR, visible and UV portions of the electromagnetic spectrum). An excellent tutorial and overview on the polarization-reflective properties of CLC materials and principles of polarization state conversion (i.e. linear-to-circular, circular-to-linear, linear-to-linear, circular-to-circular, unpolarized-to-linear, and unpolarized-to-circular) can be found in applicant's U.S. Pat. No. 5,221,982, incorporated herein by reference in its entirety.

By virtue of such ultra broad-band operating characteristics of the electro-optical glazing material hereof, and the novel panel configurations disclosed herein, it is now possible to provide a level of electromagnetic radiation control hitherto unattainable by prior art smart window systems and methodologies.

Figure 2:
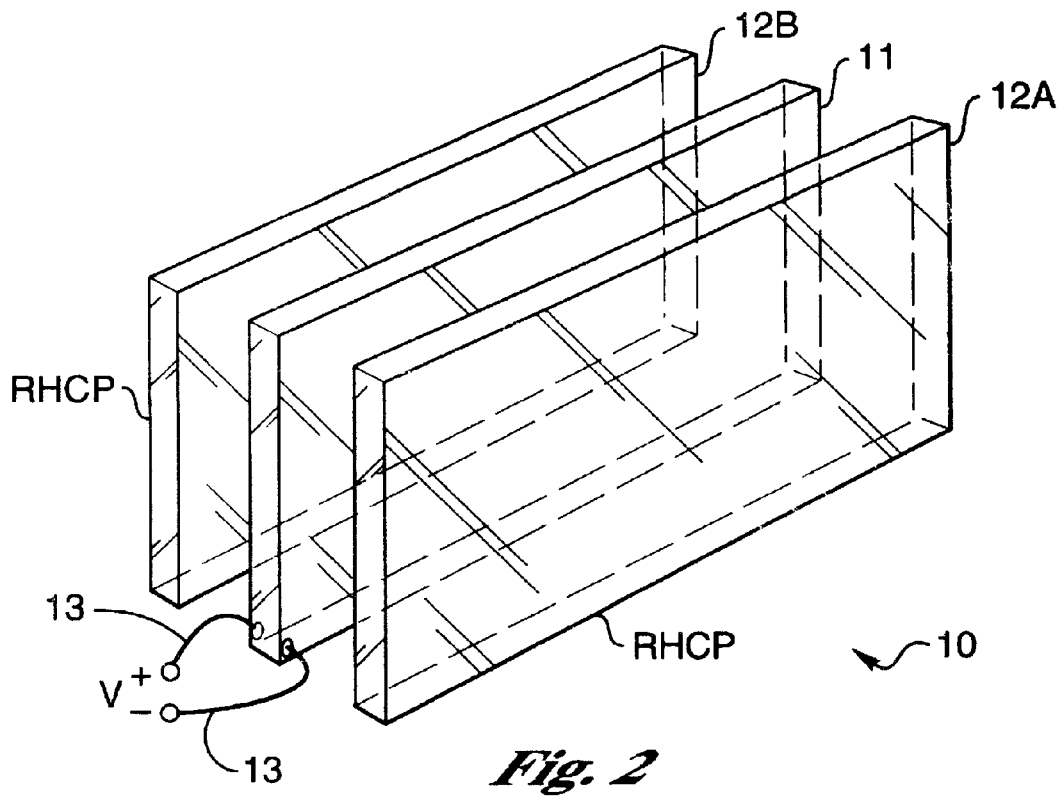
FIG. 2 is an exploded perspective view of a first illustrative embodiment of the electro-optical glazing structure of the present invention, showing an electrically-active π-phase retardation panel interposed between a pair of electrically-passive RHCP electromagnetic radiation reflecting panels, each made from CLC material having polarization-selective reflection characteristics over a broad-band region of the electromagnetic spectrum.

First Illustrative Embodiment of the Electro-Optical Glazing Structure of the Present Invention The first illustrative embodiment of the electro-optical glazing structure hereof will be described with reference to FIGS. 2 through 3B. As shown in FIG. 2, the electro-optical glazing structure of the first illustrative embodiment 10 comprises: an electrically-active $\pi$-phase retardation panel 11 interposed between a pair of electrically-passive right-hand circularly polarized (RHCP) electromagnetic radiation reflecting panels 12A and 12B, respectively, for imparting a $\pi$-phase retardation to electromagnetic radiation transmitted therethrough in response to optical-state control voltages applied across the electrically-active $\pi$-phase retardation panel 11; and electrically conductive means 13 for applying optical-state control voltages to the electrically-active $\pi$-phase retardation panel 11. Preferably, the electro-optical glazing structure of FIG. 2 is mounted within a frame structure as described in connection with the generalized embodiment shown in FIGS. 1A and 1B, and incorporates all of the power generation, electromagnetic radiation detection and micro-control mechanisms thereof.

Figure 2A:
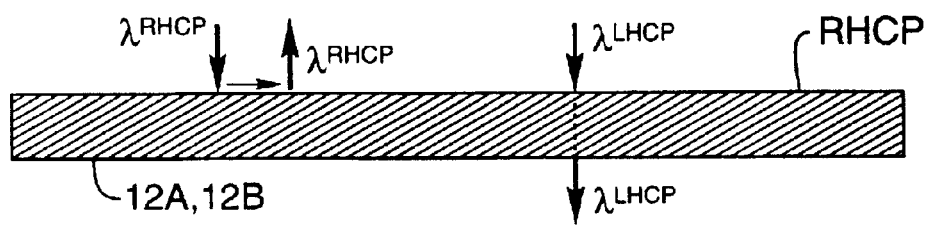
FIG. 2A is a schematic diagram of the RHCP electromagnetic radiation reflecting panel shown in FIG. 2, and its response to both RHCP and LHCP electromagnetic radiation incident thereto.
Figure 2B:
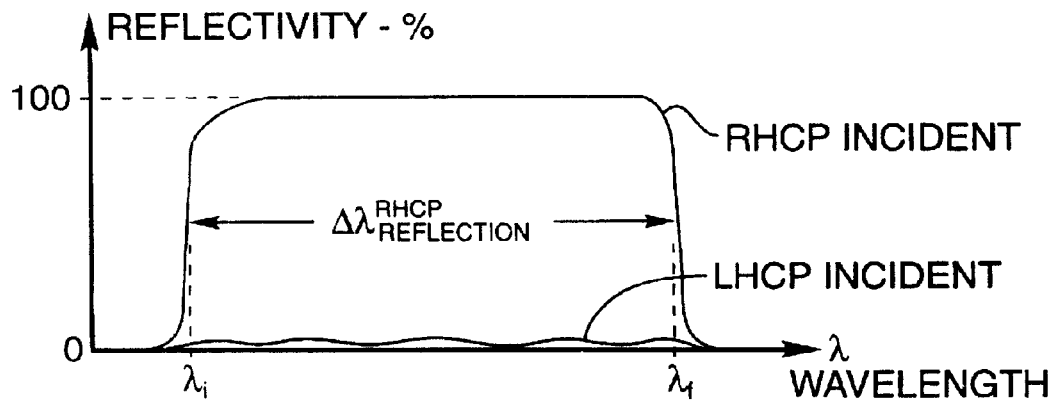
FIG. 2B is a schematic representation of the electromagnetic radiation reflection characteristics of the RHCP electromagnetic radiation reflecting panels of the glazing structure of FIG. 2, over its broadband range of operation, $\alpha\lambda_{reflection}^{RHCP}$.

As illustrated in FIGS. 2A and 2B, electromagnetic radiation having a RHCP polarization state and a wavelength inside the characteristic reflection bandwidth $\alpha\lambda_{reflection}^{RHCP}$ of the RHCP electromagnetic radiation reflecting panels 12A (12B) is 100% reflected directly therefrom without absorption, while electromagnetic radiation having either a LHCP polarization state and/or a wavelength outside the characteristic reflection bandwidth $\alpha\lambda_{reflection}^{RHCP}$ of the RHCP electromagnetic radiation reflecting panels 12A (12B) is transmitted 100% directly therethrough without absorption. Such electrically-passive, broad-band RHCP electromagnetic radiation reflecting panels can be made using the fabrication methods disclosed in InternationaL Publication No. WO 97/16762 entitled "Super Broad-Band Polarizing Reflective Material" incorporated herein by reference in its entirety. Alternatively, narrow-band RHCP electromagnetic radiation reflecting panels 12A (12B) can be made using the fabrication methods disclosed in U.S. Pat. No. 5,221,982 to Faris, or using the techniques disclosed in U.S. Pat. No. 5,506,704 to Broer, et al. each being incorporated herein by reference in its entirety.

There are a number of different ways in which to fabricate broad-band electromagnetic radiation reflecting panels 12A (12B) using the super broad-band, broad-band, narrow-band and spectrally-tunable CLC films taught in the above-cited references.

Figure 4:
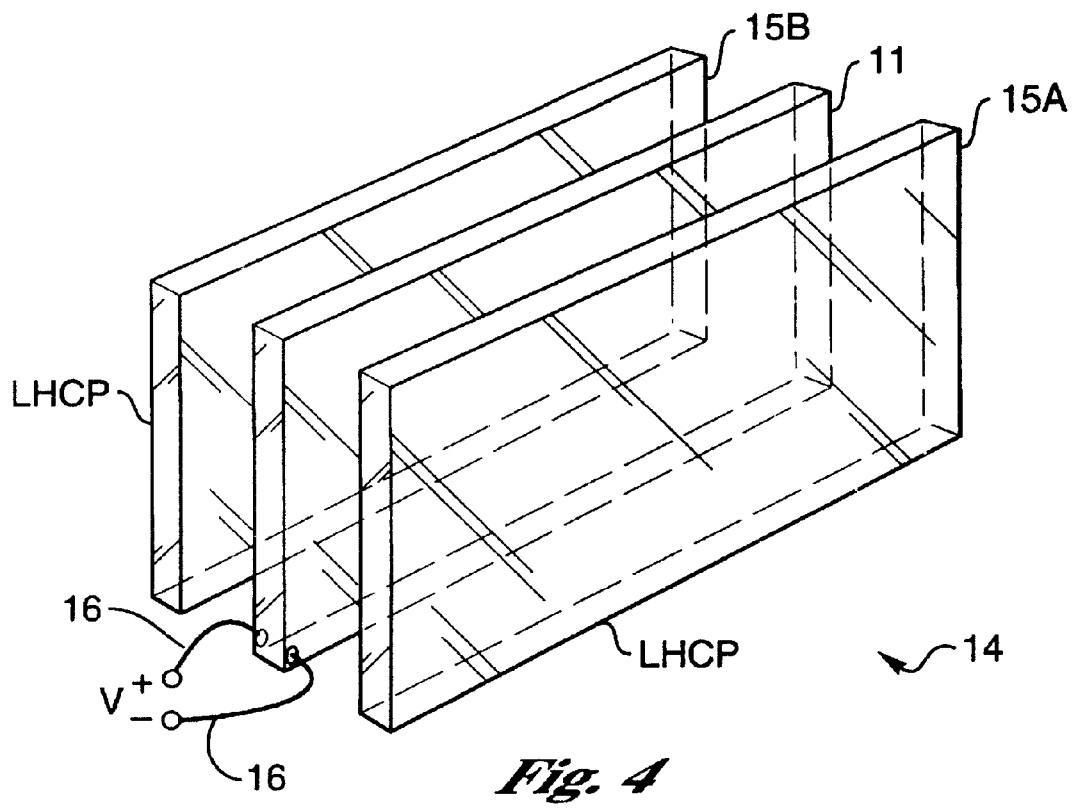
FIG. 4 is an exploded perspective view of a second illustrative embodiment of the intelligent electro-optical window of the present invention, comprising an electrically-active π-phase retardation panel interposed between a pair of electrically-passive LHCP electromagnetic radiation reflecting panels, each made from CLC material having polarization-selective reflection characteristics over a broad-band region of the electromagnetic spectrum.

For example, broad-band circularly polarizing reflective panels 12A (12B) can be fabricated by producing sheets of such CLC film and then laminating the CLC film sheets onto a surface of glass or like substrate material physically associated with the electrically-switchable $\pi$-retardation panel 11 interposed between the circularly polarizing CLC panels, as shown in FIGS. 2, 4, and 6, in particular. Notably, using the spectral-tuning techniques disclosed in detail in International Publication No. WO 97/16762, the CLC film hereof can be fabricated to have virtually any desired set of polarization reflection characteristics that would required by any particular application over a super broad-band of operation (e.g. from the UV region to the IR region of the electromagnetic spectrum).

Alternatively, sheets of super-broad-band, broad-band, narrow-band and/or spectrally-tuned CLC film can be produced as taught in the above references, and thereafter fragmented into microscopic sized CLC microflakes using film fragmentation techniques taught in U.S. Pat. No. 5,364,557. Then the CLC microflakes can be added to an optically transparent carrier fluid to produce a CLC ink or paint that can then be applied to the exterior surfaces of the glass substrates used to construct the electrically-switchable $\pi$ retardation panel component of electro-optical glazing structures, of the type shown in FIGS. 2, 4 and 6, for example. The concentration of the CLC microflakes and the viscosity of the carrier medium (e.g. lacquer, polymer, etc.) should be selected to ensure that when the coating of the CLC ink or paint is applied to a substrate, the CLC microflakes will be distributed within the carrier medium so that incident light reflects from the resulting CLC coating in a non-specular manner. This will ensure that the resulting coating produces a "super-white" appearance in the eyes of on-viewers, providing a high measure of privacy, as well as aestethic value, highly desired in window applications.

In the illustrative embodiment of the glazing structure of FIG. 2, the characteristic reflection bandwidth $\alpha\lambda_{reflection}^{RHCP}$ of the RHCP electromagnetic radiation reflecting panel 12A is designed to be substantially the same as characteristic reflection bandwidth $\alpha\lambda_{reflection}^{LHCP}$ of the LHCP electromagnetic radiation reflecting panel 12B. It is understood, however, that in alternative embodiments of the present invention, such reflection bandwidth characteristics may be specifically designed to partially overlap, or be separated from each other on the wavelength (i.e. frequency) domain in to provide desired reflection/transmission performance characteristics.

In general, a π-cell (i.e. π-retardation panel) or an electrically-controlled birefrigence (ECB) panel can be used to realize the electrically-switchable π-phase retardatation panel 11 employed in the circularly polarizing reflective glazing structures of FIGS. 2, 4 and 6 hereof. Preferably, the techniques disclosed in U.S. Pat. No. 4,566,758 to Bos, incorporated herein by reference, are used to fabricate such electrically-switchable π-phase retardatation panels 11. For most applications, the bandwidth of prior art π-cells should be sufficient to provide glazing structures having operating characteristics over the visible portion of the electromagnetic spectrum. However, in some instances, it will be desirable to provide electro-optical glazing structures having super broad-band operation (i.e. from the IR region into the UV region of the spectrum). In such applications, it will be necessary to extend the π-phase retardatation characteristics of the electrically-switchable π-phase retardatation panel beyond the visible band. The following technique may be used to construct electrically-active (switchable) π-retardation panels capable of super broad-band operation.

As shown in FIG. 2E1, an electrically-switchable super broadband π-retardation panel can be constructed by interposing an electrically-active structure linear polarization direction rotating panel such as TN, or STN, or CLC cell, between a pair of electrically-passive super broad-band π/2 retardation panels (shifters). As shown in FIG. 2E2, each super broad-band π/2-retardation panel is made by laminating, or depositing two or more broad-band or narrow-band π/2 retardation layers, each made from different material and having π/2 phase retardation characteristics centered about at different wavelength, as schematically shown in FIG. 2E3. These subcomponent broad-band or narrow-band π/2 retardation layers can be made from liquid crystal material, birefringent polymer, and crystals.

The function of each electrically-passive super-broadband π/2 retardation panel is to convert circularly polarized light into linearly polarized light which can be polarization direction rotated by the electrically switchable TN, or STN, or CLC cell sandwiched between the pair of super broad-band π/2 retardation layers. The function of the TN (twist nematic), or STN (super twist nematic), or CLC cell is to operate as an electrically-switchable optical rotator which rotates a linear polarization light by 90° when there is no electric field is applied across its ITO surfaces. If an electric field is applied, the optical rotation power of the elements disappears. This control over the electric field allows the glazing structure to be switched from its total reflection state to its half reflection state, or vice versa. When the electrically-switchable polarization direction rotator is made from low-molecular weight (LMW) liquid crystal material having a chiral phase when no voltage is applied, then its selective wavelength of the should be located outside the window operating spectrum region. By controlling the helix of the CLC molecules in the chiral phase, as well as the total thickness thereof, a 90° rotation of a linear polarization can be achieved.

In general, there are two different ways to configure electrically-switchable π retardation panel 11 in terms of external control voltages. In FIGS. 2C and 2D, these configurations are specified.

In FIG. 2C, the first embodiment of the π-phase retardation panel 11 is shown along with a specification of its various states of operation. As shown, when a non-zero voltage (e.g. 20 Volts) is applied across the phase retardation panel, 0-phase retardation is imparted to electromagnetic radiation transmitted therethrough. When a control voltage of zero volts is applied across the phase retardation panel, it imparts a π-phase retardation to electromagnetic radiation transmitted therethrough having a wavelength within its operating band $\alpha\lambda_\pi$ which is typically 300–1000 nanometers.

In FIG. 2D, a second embodiment of the π-phase retardation panel is shown along with a specification of its states of operation. As shown, when a control voltage of zero volts is applied across this retardation panel, it imparts a 0-phase shift to electromagnetic radiation having a wavelength within its operating band which is typically 350 nanometers, whereas π-phase retardation is imparted to such electromagnetic radiation when a non-zero voltage (e.g. 5–50 Volts) is applied thereacross. For wavelengths outside of the operating band, a phase shift other than π-radians is imparted to incident electromagnetic radiation when a non-zero voltage is applied.

Physically interfacing the subcomponent panels of the electro-optical glazing structure of FIG. 2 can be achieved using conventional lamination techniques well known in the glazing art.

The operation of the glazing structure of FIG. 2 will now be described with reference to FIGS. 3A and 3B, where the π-phase retardation panel of FIG. 2C is used in the construction of the glazing structure.

Figure 3A:
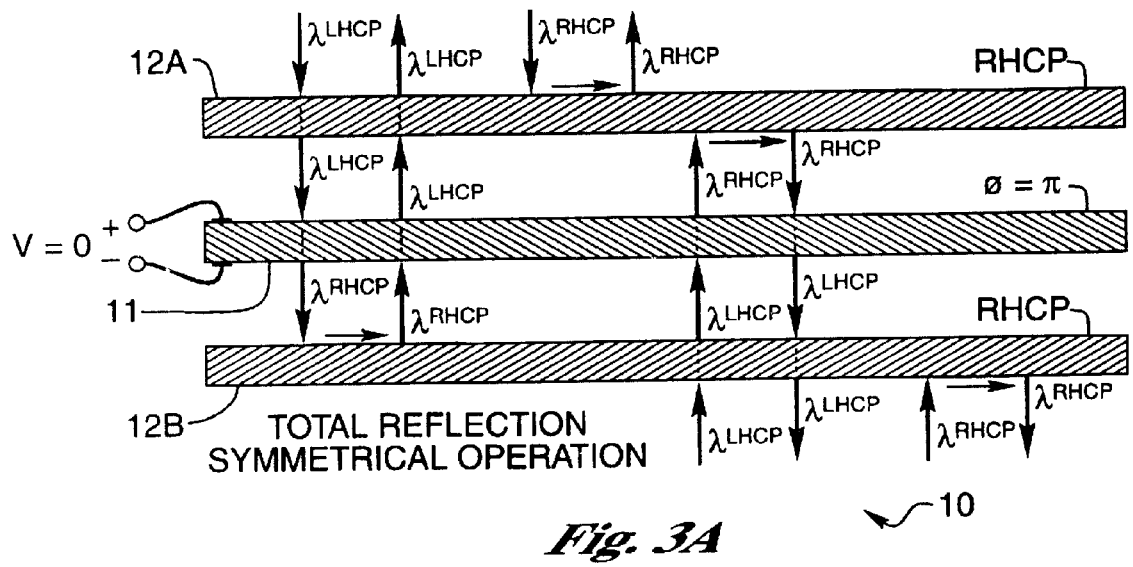
FIG. 3A is a schematic diagram illustrating the operation of the glazing structure of FIG. 2, wherein the π-phase retardation panel of FIG. 2C is used and the control voltage provided thereto is selected (i.e., V=0, φ=π) so that the window panel is switched into its optically opaque or reflection state of operation.

As shown in FIG. 3A, the electro-optical glazing structure of FIG. 2 is switched to its optically opaque state of operation by applying the appropriate control voltage thereacross (e.g. V=0 Volts). In this optical state, the electro-optical glazing structure reflects both LHCP and RHCP electromagnetic radiation within $\alpha\lambda_{reflection}^{RHCP}$ incident the window panel independent of the direction of propagation. As such, the operation of this particular electro-optical glazing structure is "symmetrical". The physical mechanisms associated with such reflection processes are schematically illustrated in FIG. 3A. Inasmuch as 100% of incident electromagnetic radiation is reflected from the surface of the electro-optical glazing structure, this glazing structure is "totally reflective" in this state of operation.

Figure 3B:
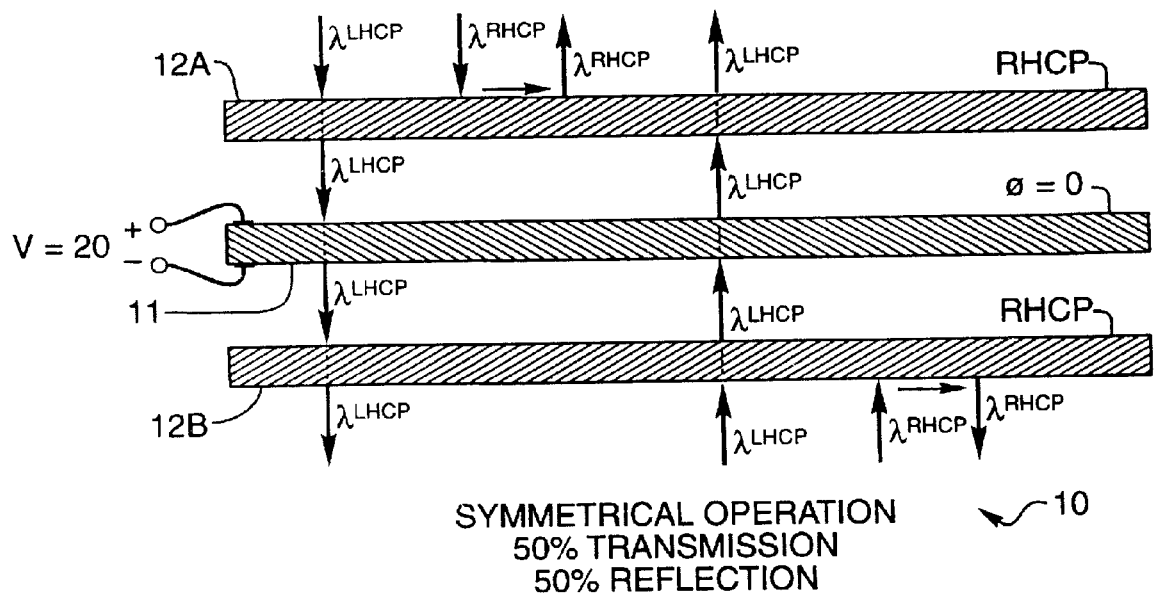
FIG. 3B is a schematic diagram illustrating the operation of the intelligent electro-optical window of FIG. 2, where the π-phase retardation panel of FIG. 2C is used and the control voltage provided thereto is selected (i.e., V=1, 0) so that the window panel is switched into its the optically transparent (i.e. semi-clear) state of operation.

As shown in FIG. 3B, the electro-optical glazing structure of FIG. 2 is switched to its optically semi-transparent (i.e. semi-clear state) of operation by applying the appropriate control voltage thereacross (e.g. V=20 Volts). In this optical state, the electro-optical glazing structure reflects RHCP electromagnetic radiation within $\alpha\lambda_{reflection}^{RHCP}$ incident the window panel independent of the direction of propagation, while transmitting LHCP electromagnetic radiation falling incident the window panel independent of the direction of electromagnetic radiation propagation. The physical mechanisms associated with such reflection and transmission processes are schematically illustrated in FIG. 3A. Inasmuch as 50% of incident electromagnetic radiation is transmitted through the electro-optical glazing structure, while 50% of such electromagnetic radiation is reflected therefrom, this glazing structure can be said to "partially transmissive" in this state of operation.

Second Illustrative Embodiment of the Electro-Optical Glazing Structure of the Present Invention The second illustrative embodiment of the electro-optical glazing structure hereof will be described with reference to FIGS. 4 through 5B. As shown in FIG. 4, the electro-optical glazing structure of the second illustrative embodiment 14 comprises: an electrically-active (i.e. switchable) π-phase retardation panel 11 interposed between a pair of electrically-passive left-hand circularly polarizing (LHCP) electromagnetic radiation reflecting panels 15A and 15B, respectively; and electrically conductive means 16 for applying optical-state control voltages to the electrically-active π-phase retardation panel 11. Preferably, the electro-optical glazing structure of FIG. 4 is mounted within a frame structure as described in connection with the generalized embodiment shown in FIGS. 1A and 1B, and incorporates all of the power generation, electromagnetic radiation detection and micro-control mechanisms thereof.

Figure 4A:
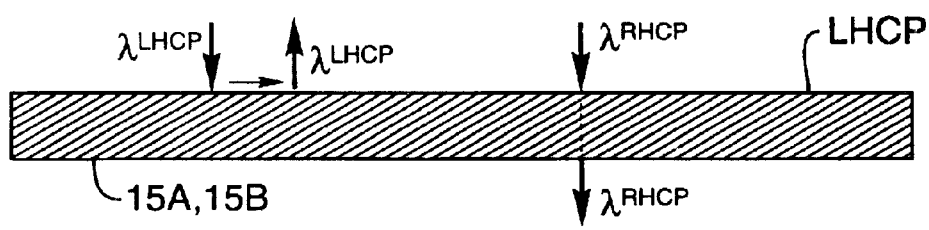
FIG. 4A is a schematic diagram of the LHCP electromagnetic radiation reflecting panel shown in FIG. 4, and its response to both RHCP and LHCP electromagnetic radiation incident thereto.
Figure 4B:
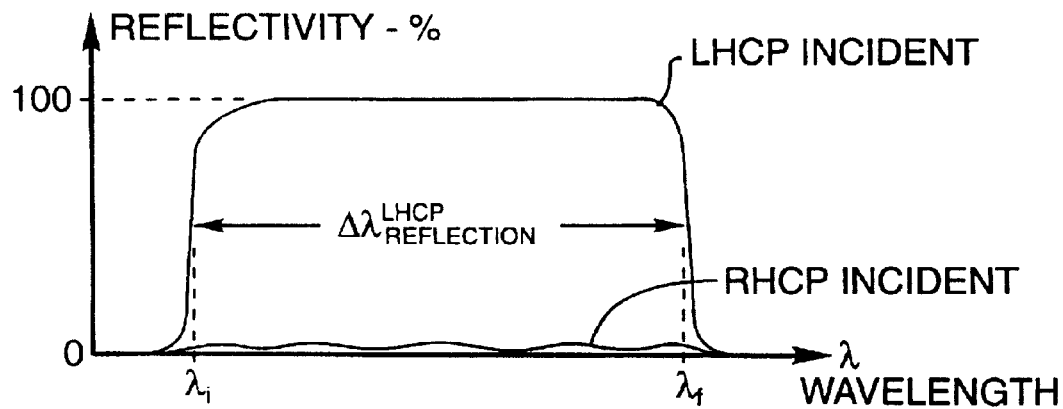
FIG. 4B is a schematic representation of the electromagnetic radiation reflection characteristics of the LHCP electromagnetic radiation reflecting panels of the window of FIG. 4, over its broadband range of operation, $\alpha\lambda_{reflection}^{LHCP}$.

As illustrated in FIGS. 4A and 4B, electromagnetic radiation having a LHCP polarization state and a wavelength inside the characteristic reflection bandwidth $\alpha\lambda_{reflection}^{L}$-$_{HCP}$ of the LHCP electromagnetic radiation reflecting panels 15A, 15B is reflected directly therefrom without absorption, while electromagnetic radiation having either a RHCP polarization state and/or a wavelength outside the characteristic reflection bandwidth $\alpha\lambda_{reflection}^{RHCP}$ of the LHCP electromagnetic radiation reflecting panels is transmitted directly therethrough without absorption. Such electrically-passive, broad-band LHCP electromagnetic radiation reflecting panels can be made using the fabrication methods disclosed in International Publication No. WO 97/16762, supra. In the preferred embodiment, the broad-band RHCP electromagnetic radiation reflecting panels 12A (12B) are fabricating by applying a coating of CLC-based ink (with suspended CLC flakes therein) onto a conventional glass panel, as taught in International Publication No. WO 97/16762, supra. Alternatively, narrow-band RHCP electromagnetic radiation reflecting panels can be made using the fabrication methods disclosed in U.S. Pat. No. 5,506,704 to Broer, et al, or the methods disclosed in U.S. Pat. No. 5,221,982 to Faris.

Physically interfacing panels 11, 15A and 15B of the electro-optical glazing structure of FIG. 4 can be achieved using conventional lamination techniques well known in the glazing art.

In the illustrative embodiment of the glazing structure of FIG. 4, characteristic reflection bandwidth $\alpha\lambda_{reflection}^{LHCP}$ of the LHCP electromagnetic radiation reflecting panel 15A is designed to be substantially the same as characteristic reflection bandwidth $\alpha\lambda_{reflection}^{LHCP}$ of the LHCP electromagnetic radiation reflecting panel 15B. It is understood, however, that in alternative embodiments of the present invention, such reflection characteristics may be specifically designed to partially overlap, or be separated from each other on the wavelength (i.e. frequency) domain in to provide desired reflection/transmission performance characteristics.

The electrically-active π-retardation panel 11 can be constructed using any of the techniques described in detail above.

The operation of the glazing structure of FIG. 4 will now be described with reference to FIGS. 5A and 5B, where the π-phase retardation panel 11 of FIG. 2C is used in the construction of the glazing structure.

Figure 5A:
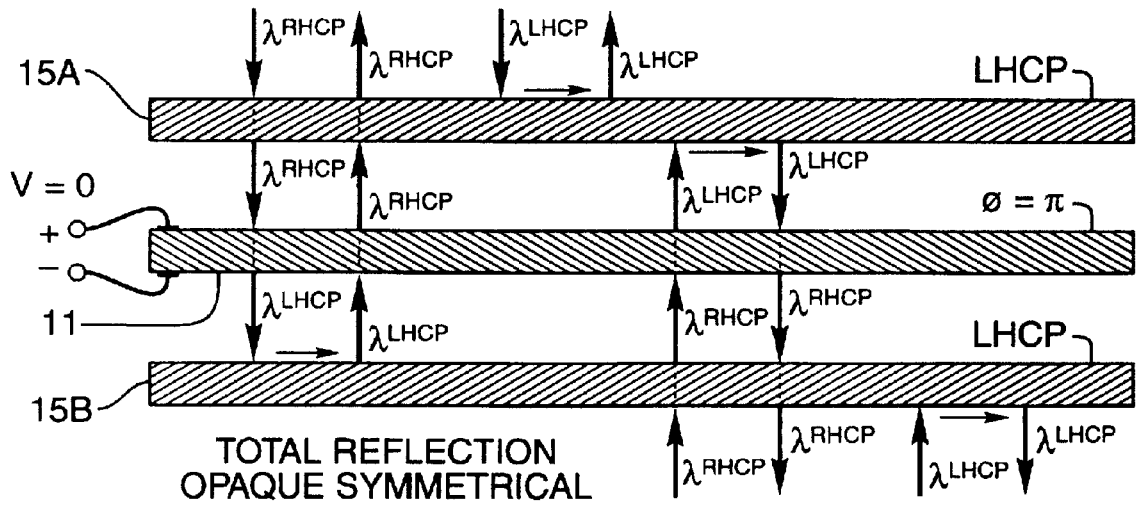
FIG. 5A is a schematic diagram illustrating the operation of the intelligent electro-optical window of FIG. 4, where the π-phase retardation panel of FIG. 2D is used and the control voltage provided thereto is selected (i.e., v=1, φ=π) so that the window panel is switched into its the opaque or reflection state of operation.

As shown in FIG. 5A, the electro-optical glazing structure of FIG. 4 is switched to its optically opaque state of operation by applying the appropriate control voltage thereacross (i.e. V=0 Volts). In this optical state, the electro-optical glazing structure 14 reflects both LHCP and RHCP electromagnetic radiation within $\alpha\lambda_{reflection}^{LHCP}$ incident the window panel, independent of its direction of propagation. As such, the operation of this particular electro-optical glazing structure is "symmetrical". The physical mechanisms associated with such reflection processes are schematically illustrated in FIG. 5A. Inasmuch as 100% of incident electromagnetic radiation is reflected from the surface of the electro-optical glazing structure, this glazing structure is "totally reflective" in this state of operation.

Figure 5B:
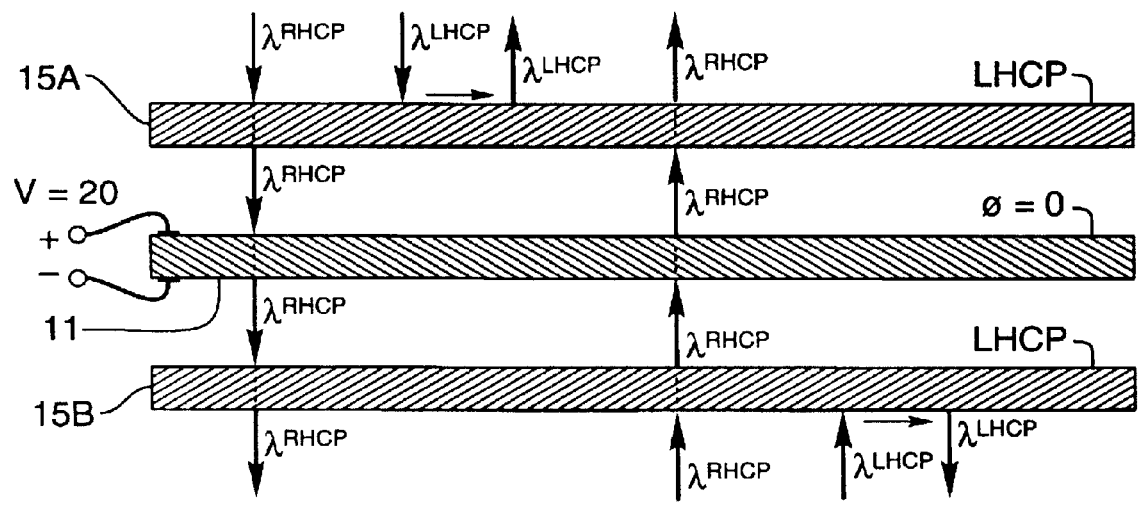
FIG. 5B is a schematic diagram illustrating the operation of the intelligent electro-optical window of FIG. 5, where the π-phase retardation panel of FIG. 5D is used and the control voltage provided thereto is selected (I.e., V=0, φ=0) so that the window panel is switched into its optically semi-transparent (i.e., semi-clear) state of operation.

As shown in FIG. 5B, the electro-optical glazing structure of FIG. 4 is switched to its optically semi-transparent (i.e. semi-clear state) of operation by applying the appropriate control voltage thereacross (i.e. V=20 Volts). In this optical state, the electro-optical glazing structure 14 reflects LHCP electromagnetic radiation within $\alpha\lambda_{reflection}^{LHCP}$ incident the window panel, independent of its direction of propagation, while transmitting RHCP electromagnetic radiation within $\alpha\lambda_{reflection}^{LHCP}$ incident the window panel, independent of the direction of electromagnetic radiation propagation. As such, the operation of this particular electro-optical glazing structure is "symmetrical". The physical mechanisms associated with such reflection and transmission processes are schematically illustrated in FIG. 5A. Inasmuch as 50% of incident electromagnetic radiation is transmitted through the electro-optical glazing structure, while 50% of such electromagnetic radiation is reflected therefrom, this glazing structure is "partially transmissive" in this state of operation.

Third Illustrative Embodiment of the Electro-Optical Glazing Structure of the Present Invention The third illustrative embodiment of the electro-optical glazing structure hereof will be described with reference to FIGS. 6 through 7B. As shown in FIG. 6, the electro-optical glazing structure of the third illustrative embodiment 17 comprises: an electrically-active π-phase retardation panel 11 interposed between an electrically-passive LHCP electromagnetic radiation reflecting panel 18A and an electrically-passive RHCP electromagnetic radiation reflecting panel 18B; and electrically conductive means 19 for applying optical-state control voltages to the electrically-active π-phase retardation panel 11. Preferably, the electro-optical glazing structure of FIG. 6 is mounted within a frame structure as described in connection with the generalized embodiment shown in FIGS. 1A and 1B, and incorporates all of the power generation, electromagnetic radiation detection and micro-control mechanisms thereof.

As illustrated in FIGS. 6A and 6B, electromagnetic radiation having a LHCP polarization state and a wavelength inside the characteristic reflection bandwidth $\alpha\lambda_{reflection}^{L}$-$_{HCP}$ of the LHCP electromagnetic radiation reflecting panel 18A is reflected directly therefrom without absorption, while electromagnetic radiation having either a RHCP polarization state and/or a wavelength outside the characteristic reflection band $\alpha\lambda_{reflection}^{LHCP}$ of the LHCP electromagnetic radiation reflecting panel is transmitted directly therethrough without absorption. In the preferred embodiment, the broad-band RHCP electromagnetic radiation reflecting panels 18A are fabricating by applying a coating of CLC-based ink (with suspended CLC flakes therein) onto a conventional glass panel, as taught in International Publication No. WO 97/16762, and described hereinabove. Alternatively, narrow-band RHCP electromagnetic radiation reflecting panels 18A can be made using the fabrication methods disclosed in U.S. Pat. No. 5,221,982 to Faris, and while less preferred, using the methods disclosed in U.S. Pat. No. 5,506,704 to Broer, et al.

As illustrated in FIGS. 6C and 6D, electromagnetic radiation having a RHCP polarization state and a wavelength inside the characteristic reflection bandwidth $\alpha\lambda_{reflection}^{RHCP}$ of the RHCP electromagnetic radiation reflecting panel 18B is reflected directly therefrom without absorption, while electromagnetic radiation having either a LHCP polarization state and/or a wavelength outside the characteristic reflection bandwidth $\alpha\lambda_{reflection}^{RHCP}$ of the RHCP electromagnetic radiation reflecting panel is transmitted directly therethrough without absorption. In the preferred embodiment, the broad-band RHCP electromagnetic radiation reflecting panels 18B are fabricating by applying a coating of CLC-based ink (with suspended CLC flakes therein) onto a conventional glass panel, as taught in International Publication No. WO 97/16762, and described hereinabove. Alternatively, narrow-band RHCP electromagnetic radiation reflecting panels 18B can be made using the fabrication methods disclosed in U.S. Pat. No. 5,221,982 to Faris, and using the less preferred techniques disclosed in U.S. Pat. No. 5,506,704 to Broer, et al.

In the illustrative embodiment of the glazing structure of FIG. 6, characteristic reflection bandwidth $\alpha\lambda_{reflection}^{RHCP}$ of the RHCP electromagnetic radiation reflecting panel 18B is designed to be substantially the same as characteristic reflection bandwidth $\alpha\lambda_{reflection}^{LHCP}$ of the LHCP electromagnetic radiation reflecting panel 18A. It is understood, however, that in alternative embodiments of the present invention, such reflection bandwidth characteristics may be specifically designed to partially overlap, or be separated from each other on the wavelength (i.e. frequency) domain in to provide desired reflection/transmission performance characteristics.

Electrically-active π retardation panel 11 can be realized using any of the construction techniques described in detail above. Physically interfacing panels 11, 18A and 18B of the electro-optical glazing structure of FIG. 6 can be achieved using conventional lamination techniques well known in the glazing art.

The operation of the glazing structure of FIG. 6 will now be described with reference to FIGS. 7A and 7B, where the π-phase retardation panel 11 of FIG. 2C is used in the construction of the glazing structure.

Figure 7A:
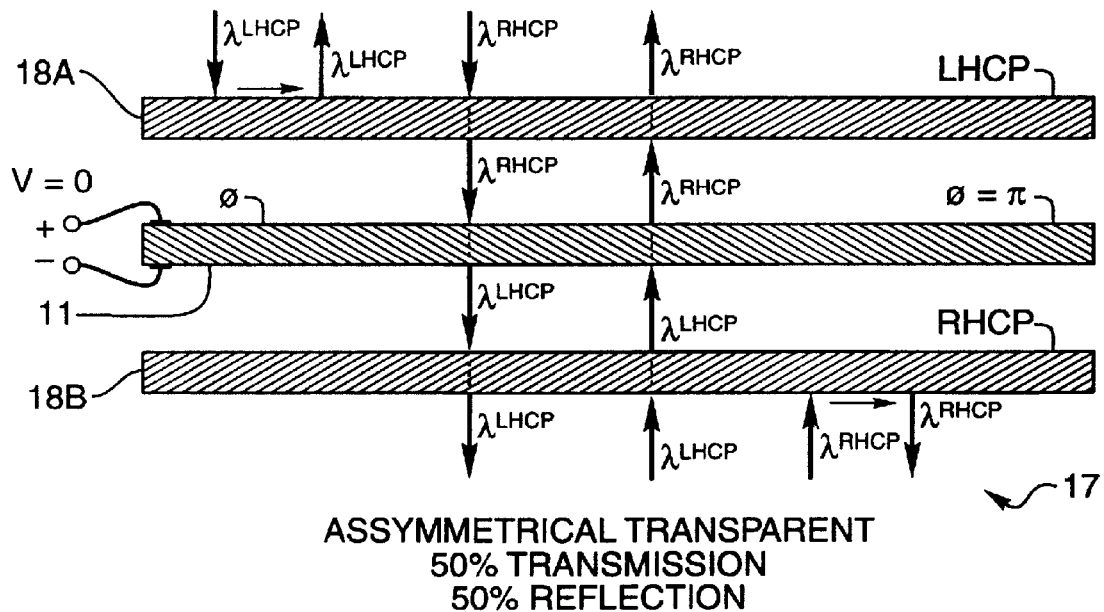
FIG. 7A is a schematic diagram illustrating the operation of the intelligent electro-optical window of FIG. 6, where the π-phase retardation panel of FIG. 2C is used and the control voltage provided thereto is selected (i.e., v=0, φ=π) so that the window panel is switched into its the optically semi-transparent (i.e. semi-clear) state of operation.

As shown in FIG. 7A, the electro-optical glazing structure of FIG. 6 is switched to its semi-optically transparent (i.e. clear) state of operation by applying the appropriate control voltage thereacross (i.e. V=0 Volts). In this optical state, the electro-optical glazing structure reflects LHCP electromagnetic radiation within $\alpha\lambda_{reflection}^{LHCP}$ incident on the LHCP electromagnetic radiation reflecting panel 18A of the window panel, while transmitting RHCP electromagnetic radiation within $\alpha\lambda_{reflection}^{LHCP}$ incident thereto and converting the same into LHCP electromagnetic radiation by the π-phase shifter as it emanates from the RHCP electromagnetic radiation reflecting panel 18B. In this optical state, the electro-optical glazing structure reflects RHCP electromagnetic radiation within $\alpha\lambda_{reflection}^{RHCP}$ incident on the RHCP electromagnetic radiation reflecting panel 18B of the window panel, while transmitting LHCP electromagnetic radiation within $\alpha\lambda_{reflection}^{RHCP}$ incident thereto and converting the same into RHCP electromagnetic radiation as it emanates from the LHCP electromagnetic radiation reflecting panel 18A. As such, the operation of this particular electro-optical glazing structure is "assymmetrical". The physical mechanisms associated with such reflection and transmission-reflection processes are schematically illustrated in FIG. 7A in great detail. Inasmuch as 50% of incident electromagnetic radiation is transmitted through the electro-optical glazing structure, while 50% of such electromagnetic radiation is reflected therefrom, this glazing structure is "partially transmissive" in this state of operation.

Figure 7B:
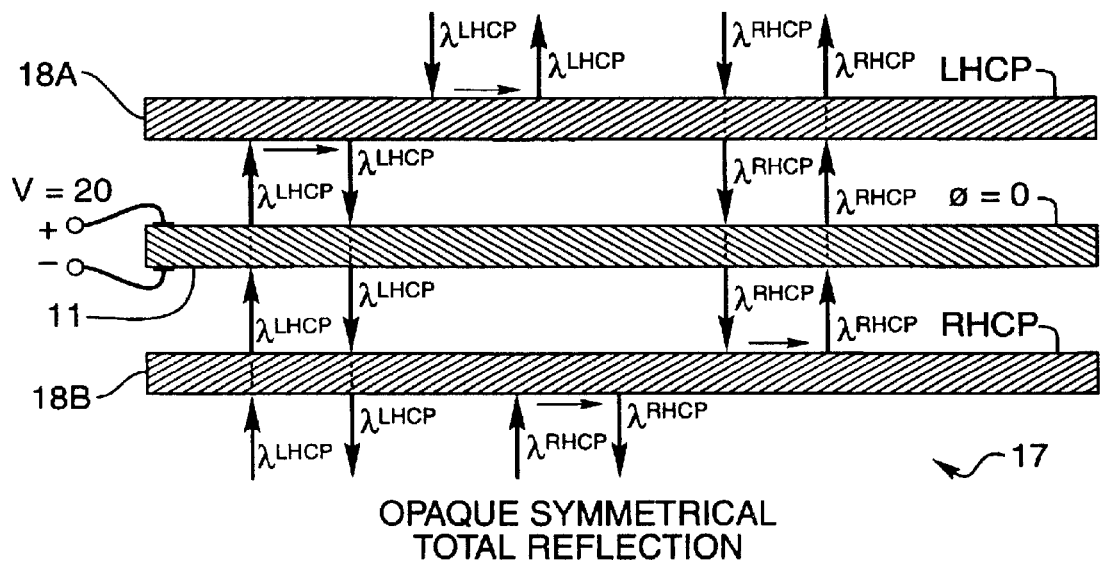
FIG. 7B is a schematic diagram illustrating the operation of the intelligent electro-optical window of FIG. 6, where the π-phase retardation panel of FIG. 2C is used and the control voltage provided thereto is selected (i.e., v=0, φ=0) so that the window panel is switched into its optically opaque or reflection state of operation.

As shown in FIG. 7B, the electro-optical glazing structure of FIG. 6 is switched to its optically opaque state of operation by applying the appropriate control voltage thereacross (i.e. V=20 Volts). In this optical state, the electro-optical glazing structure reflects LHCP and RHCP electromagnetic radiation within $\alpha\lambda_{reflection}^{LHCP}$ incident on the LHCP electromagnetic radiation reflecting panel of the window panel. In this optical state, the electro-optical glazing structure 17 also reflects RHCP and LHCP electromagnetic radiation within $\alpha\lambda_{reflection}^{RHCP}$ incident on the RHCP electromagnetic radiation reflecting panel 18B of the window panel. As such, the operation of this particular electro-optical glazing structure is "symmetrical". The physical mechanisms associated with such reflection and transmission-reflection processes are schematically illustrated in FIG. 7B in great detail. Inasmuch as 100% of incident electromagnetic radiation is reflected from the surface of the electro-optical glazing structure, this glazing structure is "totally reflective" in this state of operation.

Figure 8E:
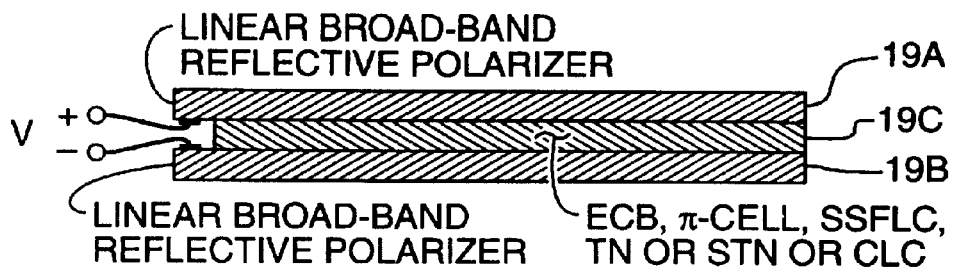
FIG. 8E is a schematic representation of an illustrative embodiment of the electro-optical glazing structure of FIG. 8, in which an electrically-switchable linear polarization direction rotating panel, realized using an electrically-controlled birefringence (ECB) cell, surface stablized ferro-electric liquid crystal (SSFLC) cell, twisted nematic cell, super-twisted nematic cell, or cholesteric liquid crystal cell, is interposed between a pair of electrically-passive linear broad-band polarizing reflective panels realized using (1) broad-band CLC films with π/2 phase-retardation surfaces integrally formed therein and/or other types of reflective linear polarizers such as multi-layer interference linear polarizers.

Fourth Illustrative Embodiment of the Electro-Optical Glazing Structure of the Present Invention The fourth illustrative embodiment of the electro-optical glazing structure hereof will be described with reference to FIGS. 8 through 9B. As shown in FIG. 8, the electro-optical glazing structure of the fourth illustrative embodiment 19 comprises: an electrically-passive linear polarization direction rotating panel 19C interposed between a first electrically-active linearly polarizing electromagnetic radiation reflecting panel 19A having linearly polarization state LP1, and a second electrically-active LHCP electromagnetic radiation reflecting panel 19C having linearly polarization state LP2, orthogonal to LP1 or parallel; and electrically conductive means 19D for applying optical-state control voltages to the electrically-active LHCP electromagnetic radiation reflecting panels 19B and 19C. Preferably, the electro-optical glazing structure of FIG. 8 is mounted within a frame structure as described in connection with the generalized embodiment shown in FIGS. 1A and 1B, and incorporates all of the power generation, electromagnetic radiation detection and micro-control mechanisms thereof.

In FIGS. 8A and 8B, the reflection characteristics of electrically-passive LP1 electromagnetic radiation reflecting panel 19B are illustrated. As shown, electromagnetic radiation having a LP1 polarization state and a wavelength inside the characteristic reflection bandwidth $\alpha\lambda_{reflection}^{LP1}$ of the LP1 electromagnetic radiation reflecting panel is reflected directly therefrom without absorption, while electromagnetic radiation having either a LP2 polarization state and/or a wavelength outside the characteristic reflection bandwidth $\alpha\lambda_{reflection}^{LP2}$ of the LP2 electromagnetic radiation reflecting panel is transmitted directly therethrough without absorption.

In FIGS. 8C and 8D, the reflection characteristics of electrically-active LP2 electromagnetic radiation reflecting panel 19C are illustrated. As shown in FIGS. 8C and 8D, electromagnetic radiation having a LP1 polarization state and any wavelength within transmission bandwidth $\alpha\lambda_{transmission}^{LP2}$ is transmitted directly through the glazing panel without absorption, while electromagnetic radiation having either a LP2 polarization state and/or a wavelength outside the characteristic reflection bandwidth $\alpha\lambda_{reflection}{}^{LP2}$ of the LP2 electromagnetic radiation reflecting panel is transmitted directly therethrough without absorption.

Electrically-passive LP1 and LP2 polarization reflective panels 19A and 19B can be made from super broad-band CLC film taught in International Publication No. WO 97/16762 by Reveo, Inc., and while less preferred, using the fabrication methods disclosed in U.S. Pat. No. 5,221,982 to Faris, and in U.S. Pat. No. 5,506,704 to Broer, et al, each of these references incorporated herein by reference in its entirety. These applications disclose how to make circularly polarizing reflective CLC films. Such films can be converted into linearly polarizing CLC films using the novel phase-retardation imparting techniques taught in great detail in International application Ser. No. PCT/US97/20091 entitled "Liquid Crystal Film Structures With Phase-Retardation Surface Regions Formed Therein" by Reveo, Inc., incorporated herein by reference in its entirety. The methods taught therein allows one to make an electrically-passive, broad-band linear polaring panel from a single layer of CLC film material, without laminating a π/2 phase-retardation panel to a layer of circularly polarizing CLC film.

An alternative method of making broad-band linearly polarizing reflective panels 19A and 19B is disclosed in U.S. Pat. No. 5,506,704 to Broer, et al. However, the fabrication techniques disclosed therein are less preferred than those taught in International Application Serial No. PCT/US97/20091, as the technique disclosed in U.S. Pat. No. 5,506,704 requires laminating a π/2 phase retardation panel to a circularly polarizing CLC film layer, which complicates manufacture and increases manufacturing costs.

The electronically-switchable linear polarization direction rotating panel 19C employed in the electro-optical glazing structure of FIG. 8 can be realized as an electrically-controlled birefrigence (ECB) cell, surface stabilized ferro-electric liquid crystal (SSFLC) cell, twisted nematic (TN) liquid crystal cell, super-twisted nematic (STN) liquid crystal cell, or CLC cell, whose operation is controlled by a control voltage well known in the art. To construct the linear polarization rotating cell 19C, a layer of liquid crystal material is contained between a spaced apart pair of glass panels bearing layers of ITO on the interior surfaces thereof, and rubbed polyimide to provide liquid crystal alignment in a manner well known in the art. The ITO layers are used to create the necessary voltage across the layer of liquid crystal material and align the liquid crystal molecules, thereby preventing rotation of the polarization direction of linearly polarized light being transmitted therethrough during operation of the electro-optical glazing structure.

Physically interfacing panels 19A, 19B and 19C of the electro-optical glazing structure of FIG. 8 can be achieved using conventional lamination techniques well known in the glazing art.

The operation of the glazing structure of FIG. 8 will now be described with reference to FIGS. 9A and 9B.

Figure 9A:
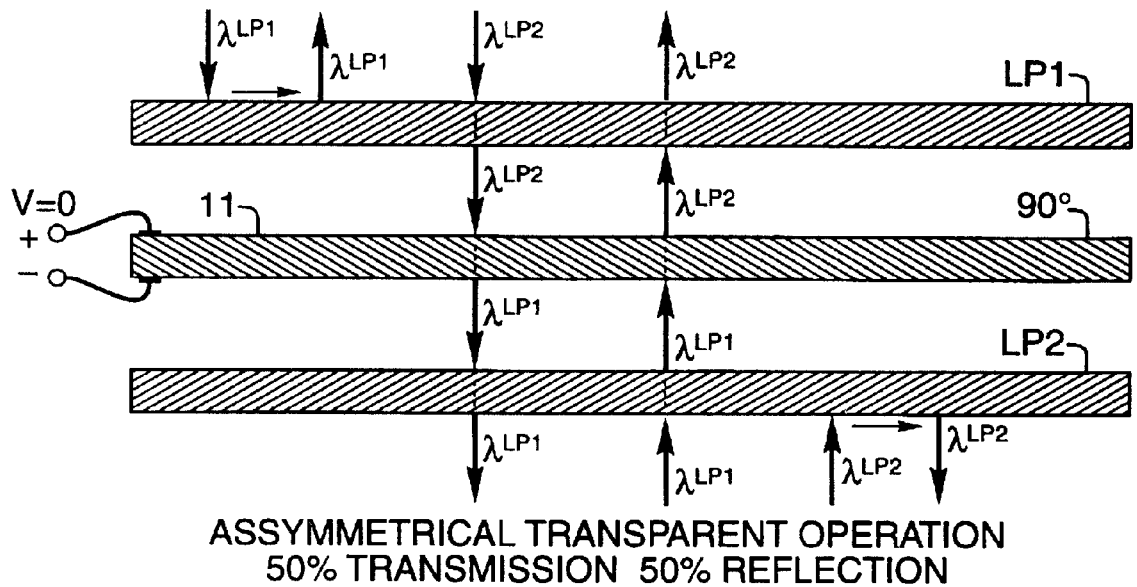
FIG. 9A is a schematic diagram illustrating the operation of the intelligent electro-optical window of FIG. 8, where the linear polarization direction rotating panel of FIG. 8 is used and the control voltage provided thereto is selected (i.e., v=0, 90 degrees rotation) so that the window panel is switched into its transmission or semi-clear state of operation.

As shown in FIG. 9A, the electro-optical glazing structure of FIG. 8 is switched to its optically opaque state of operation by not applying a control voltage thereacross (i.e. V=0). In this optical state, the electro-optical glazing structure 19 reflects LP1 electromagnetic radiation within $\alpha\lambda_{reflection}{}^{LP1}$ incident on the LP1 electromagnetic radiation reflecting panel without adsorption, while transmitting LP2 electromagnetic radiation within $\alpha\lambda_{reflection}{}^{LP1}$ incident thereto without adsorption. Also in this optical state, the electro-optical glazing structure 19 reflects LP2 electromagnetic radiation within $\alpha\lambda_{reflection}{}^{LP2}$ incident on the LP2 electromagnetic radiation reflecting panel without adsorption, while transmitting LP1 electromagnetic radiation within $\alpha\lambda_{reflection}{}^{LP2}$ incident thereto without adsorption. As such, the operation of this particular electro-optical glazing structure is "assymmetrical". The physical mechanisms associated with such reflection processes are schematically illustrated in FIG. 9A in great detail. Inasmuch as 50% of incident electromagnetic radiation is reflected from the electro-optical glazing structure and 50% of incident electromagnetic radiation is transmitted through the electro-optical glazing structure, this glazing structure is "partially reflective" in this state of operation.

Figure 9B:
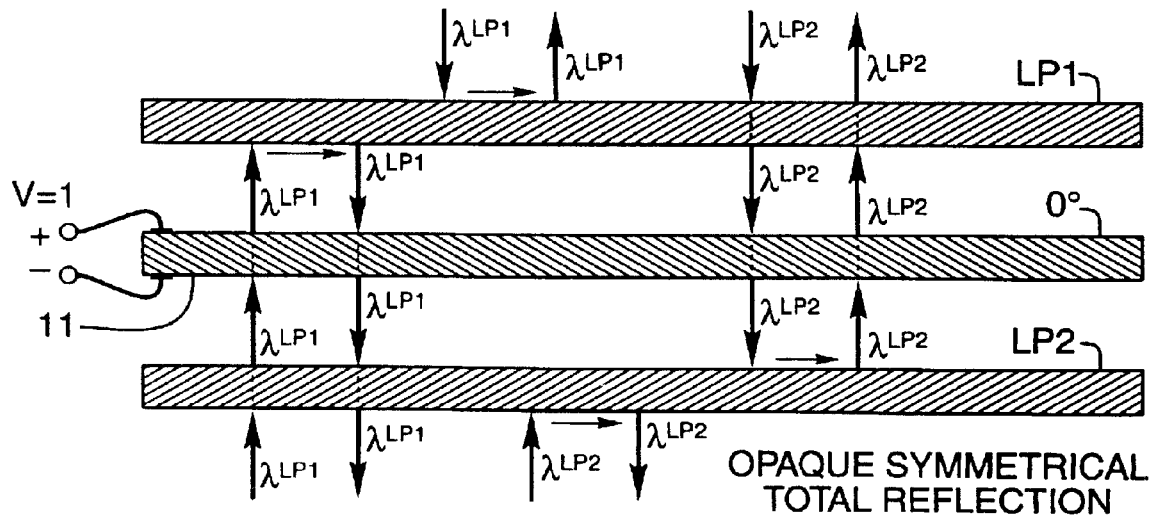
FIG. 9B is a schematic diagram illustrating the operation of the intelligent electro-optical window of FIG. 9, where the linear polarization direction rotating panel of FIG. 8 is used and the control voltage provided thereto is selected (i.e., v=1, zero degrees rotation) so that the window panel is switched into its optically opaque state of operation.

As shown in FIG. 9B, the electro-optical glazing structure of FIG. 8 is switched to its optically transparent (i.e. clear) state of operation by applying the appropriate control voltage thereacross (i.e. V=1). In this optical state, the electro-optical glazing structure 19 reflects both LP1 and LP2 electromagnetic radiation within $\alpha\lambda_{reflection}{}^{LP1}$ and $\alpha\lambda_{reflection}{}^{LP2}$ incident on either electromagnetic radiation reflecting panel of the window panel without adsorption, independent of the direction of propagation of the incident electromagnetic radiation. As such, the operation of this particular electro-optical glazing structure is "symmetrical". The physical mechanisms associated with such transmission processes are schematically illustrated in FIG. 9B in great detail. Inasmuch as 100% of incident electromagnetic radiation is transmitted through the electro-optical glazing structure, this glazing structure is "totally opaque" in this state of operation.

The electro-optical glazing structure of FIG. 8 can be readily adapted to exhibit "asymmetrical" reflection/transmission characteristics over its broad-band of operation by tuning the spectral transmission characteristics of both the CLC-based LP1 and LP2 electromagnetic radiation reflecting panels 19A and 19B of the illustrative embodiment so that the spectral reflection (and transmission) bandwidth characteristics thereof are either completely or partially overlapping or are separated on the wavelength (i.e. frequency) domain. Using such CLC-tuning techniques, it is possible to create an electro-optical glazing structure having the construction of FIG. 8 which, when switched to its first optical state, is capable of totally reflecting electromagnetic radiation within a desired reflection band (e.g. within the ultraviolet and infrared bands) in a first direction defined with respect to the panel, and when switched to its second optical state, totally transmitting electromagnetic radiation within such reflection band.

Fifth Illustrative Embodiment of the Electro-Optical Glazing Structure of the Present Invention The fifth illustrative embodiment of the electro-optical glazing structure hereof will be described with reference to FIGS. 10 through 11C2.

Figure 10:
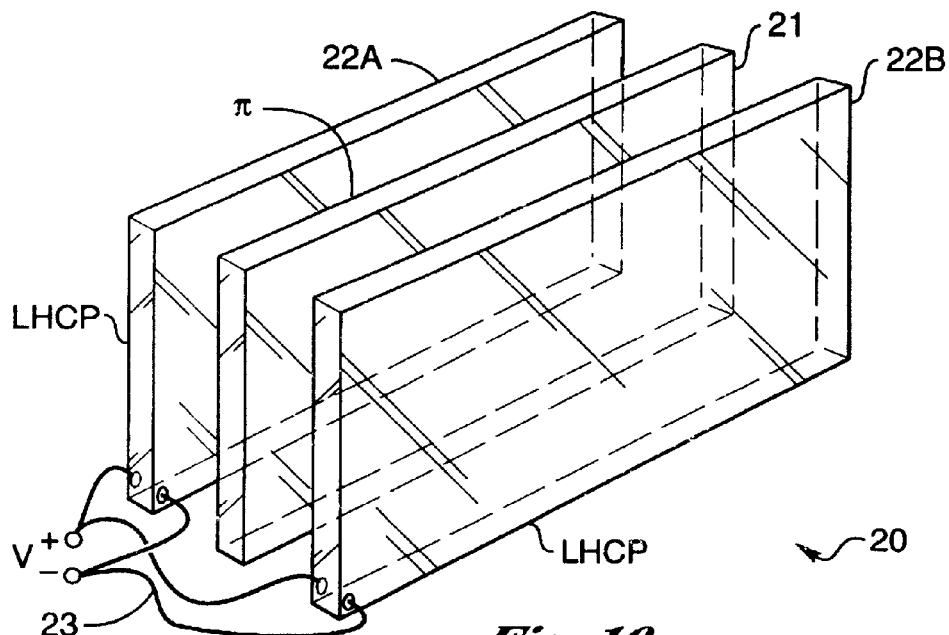
FIG. 10 is an exploded perspective view of a fifth illustrative embodiment of the intelligent electro-optical window of the present invention, comprising an electrically-passive π-phase retardation panel interposed between a first electrically-active LHCP electromagnetic radiation reflecting panel and a second electrically active LHCP electromagnetic radiation reflecting panel, each made from CLC material having polarization-selective reflection characteristics over a broad-band region of the electromagnetic spectrum.

As shown in FIG. 10, the electro-optical glazing structure of the fifth illustrative embodiment 20 comprises: an electrically-passive π-phase retardation panel 21 interposed between a first electrically-active LHCP electromagnetic radiation reflecting panel 22A and a second electrically-active LHCP electromagnetic radiation reflecting panel 22B; and electrically conductive means 23 for applying optical-state control voltages to the electrically-active LHCP electromagnetic radiation reflecting panels 22A and 22B. Preferably, the electro-optical glazing structure of FIG. 10 is mounted within a frame structure as described in connection with the generalized embodiment shown in FIGS. 1A and 1B, and incorporates all of the power generation, electromagnetic radiation detection and micro-control mechanisms thereof.

Figure 10A:
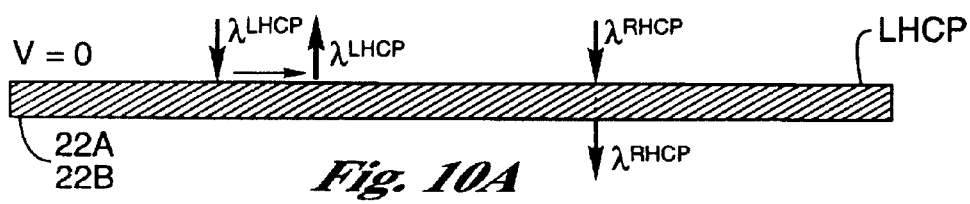
FIG. 10A is a schematic diagram of the LHCP electromagnetic radiation reflecting panel shown in FIG. 10, and its response to both RHCP and LHCP electromagnetic radiation incident thereto when operated in the LHCP radiation reflecting state thereof.

In FIG. 10A, electrically-active LHCP electromagnetic radiation reflecting panel 22A is shown operated in its electrically inactive state (i.e. when V=0). As shown in FIG. 10C, electromagnetic radiation having a LHCP polarization state and a wavelength inside the characteristic reflection bandwidth $\alpha\lambda_{reflection}^{LHCP}$ of the LHCP electromagnetic radiation reflecting panel is reflected directly therefrom without absorption, while electromagnetic radiation having either a RHCP polarization state and/or a wavelength outside the characteristic reflection bandwidth $\alpha\lambda_{reflection}^{LHCP}$ of the LHCP electromagnetic radiation reflecting panel is transmitted directly therethrough without absorption.

Figure 10B:
FIG. 10B is a schematic representation of the electromagnetic radiation reflection characteristics of the LHCP electromagnetic radiation reflecting panels of FIG. 10, over the broadband range of operation thereof $\alpha\lambda_{reflection}^{LHCP}$, when operated in the LHCP radiation reflecting state thereof.
Figure 10C:
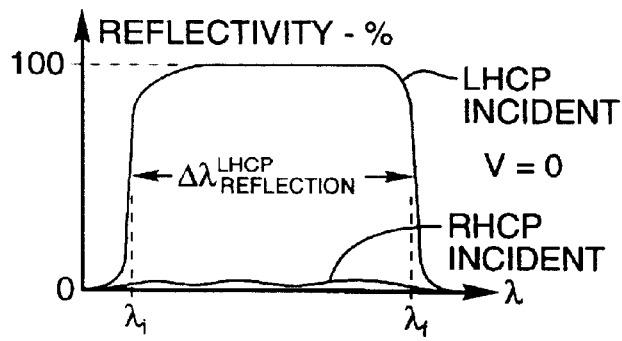
FIG. 10C is a schematic diagram of the LHCP electromagnetic radiation reflecting panel shown in FIG. 10, and its response to both RHCP and LHCP electromagnetic radiation incident thereto when operated in the radiation transmission state thereof.
Figure 10D:
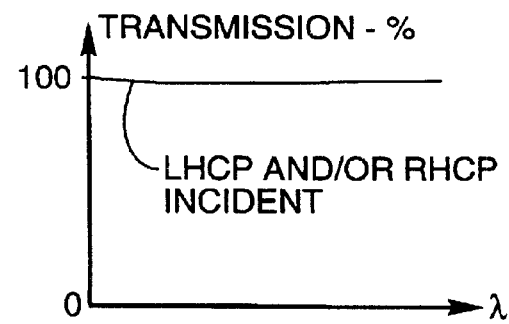
FIG. 10D is a schematic representation of the electromagnetic transmission characteristics of the LHCP electromagnetic radiation reflecting panels of FIG. 10, over the broadband range of operation thereof $\alpha\lambda_{transmission}^{LHCP}$, when operated in the radiation transmission state thereof.

In FIG. 10B, the electrically-active LHCP electromagnetic radiation reflecting panel 22B is shown operated in its electrically active state (i.e. when V=1). As shown in FIG. 10D, electromagnetic radiation having a LHCP or RHCP polarization state and any wavelength within transmission bandwidth $\alpha\lambda_{transmission}^{LHCP}$ is transmitted directly through the glazing panel without absorption.

The electrically-passive π-phase retardation panel 21 employed in the electro-optical glazing structure of FIG. 10 can made from any material having a permanent birefringence which imparts to a π-phase retardation to electromagnetic radiation (within the operational band of the device). This panel can be fabricated from PVA, nematic liquid crystal, mica, etc. in a manner well known in the art. Methods for making such optical devices are disclose in U.S. Pat. No. 5,113,285 to Franklin, et al., incorporated herein by reference.

Electrically-switchable circularly polarizing reflective panels 22A and 22B can be fabricated using the construction techniques illustrated in FIGS. 11 through 11A3. As shown in FIG. 11, each such panel generally comprises a pair of optically transparent plates 22A1 and 22A2 (e.g. made of glass, acrylic, etc.) spaced apart by a spacers 22A3 in a manner known in the art. In the illustrative embodiment, the spacing between the plates is about 20 microns, however, it is understood that such dimensions may vary from embodiment to embodiment of the invention. The internal surfaces of the plates are coated with a layer of ITO material 22A4 and 22A to form optically transparent electrode surfaces. A polyimide coating is applied over the ITO layers, which is then rubbed to create director (i.e. alignment) surfaces for liquid crystal molecules to spontaneously order in accordance with the chiral phase, in a manner well known in the art. Electrical leads are attached to the ITO layers.

Having formed a cell between the spaced apart plates 22A1 and 22A2, a cholesteric liquid crystal (CLC) mixture 22A6 is prepared and then poured into the interior volume of the "cell" formed between the plates and spacers. In the illustrative embodiment set forth in FIG. 10, a "left-hand CLC formula" must be used to make the CLC mixture for the electrically switchable LCHP panels 22A and 22B. In the illustrative embodiment set forth in FIG. 12, a "right-hand CLC formula" must be used to make the CLC mixture for the electrically switchable RCHP panels 25A and 25B. In the illustrative embodiment set forth in FIG. 14, a "left-hand CLC formula" must be used to make the CLC mixture for the electrically switchable LHCP panel 28A, and a "right-hand CLC formula" must be used to make the CLC mixture for the electrically switchable RHCP panel 28B. These CLC formulas will be described in detail below.

According to the left-handed CLC formula, the following material components are measured and mixed together in a vessel, in the hereinafter specified "by weight" proportions, namely: 1 weight unit of liquid crystal polymerizable material having a left-handed cholesteric order (phase) (e.g. CC4039L from Wacker Chemical, Germany); 49.4 weight units of low-molecular weight nematic liquid crystal material (e.g. E7 from EMI, Inc. of Hawthorne, N.Y.); 0.026 weight units of UV photointiator (e.g. IG184 from Ciba Gigy); 0.30 weight units of a first left-handed chiral additive (e.g. R1011 from EMI, Inc.); and 0.42 weight units of a second left-handed chiral additive (e.g. CB15 from EMI, Inc.).

According to the right-handed CLC formula, the following material components are measured and mixed together in a vessel, in the hereinafter specified "by weight" proportions, namely: 1 weight unit of liquid crystal polymerizable material having a right-handed cholesteric order (phase) (e.g. CC4039R from Wacker Chemical, Germany); 49.4 weight units of low-molecular weight nematic liquid crystal material (e.g. E7 from EMI, Inc. Of Hawthorne, N.Y.); 0.026 weight units of UV photointiator (e.g. IG184 from Ciba-Gigy); 0.30 weight units of a first right-handed chiral additive (e.g. R1011 from EMI, Inc.); and 0.42 weight units of a second right-handed chiral additive (e.g. CB15 from EMI, Inc.). The spectral reflection characteristics for this particular right-handed CLC material (prior to UV polymerization) are shown in FIG. 11A1.

After the appropriate CLC mixture has been made and poured into the cell region between the glass plates 22A1 and 22A2, the panel structure is placed in a temperature-controlled curing cabinet containing a UV light source of controlled light intensity. The CLC panel structure is then cured within the cabinet. For the case of the above-described embodiment, using the above-described CLC mixture formulas, the CLC structure is cured for 12 hours while being maintained at 25° C. and exposed to UV light of 365 nm and power density 0.72 mW/cm².

In FIG. 11A1, the reflection characteristics of the RHCP CLC panel prior to UV polymerization are shown. In FIG. 11A2, the reflection characteristics for the RHCP CLC panel after UV polymerization are shown when no voltage has been applied across the ITO coated plates. Notably, after UV polymerization, the reflection bandwidth of the CLC material has doubled. In FIG. 11A3, the reflection characteristics for the RHCP CLC panel are shown when a voltage has been applied. Notably, the big reflection peak shown in FIG. 11A2 disappears due to the unwinding of the CLC helix of the CLC panel in the presence of the electric field created by the applied voltage. However, a weak peak is still observed in the reflection characteristics of this example due to the fact that the applied voltage had not been high sufficiently high enough intensity.

Having constructed the various subcomponents of the electro-optical glazing structure of FIG. 10, panels 21, 22A and 22B can then be physically interfaced as an integral unit using conventional lamination techniques well known in the glazing art.

The operation of the glazing structure shown in FIG. 10 will now be described with reference to FIGS. 10E and 10F.

Figure 10E:
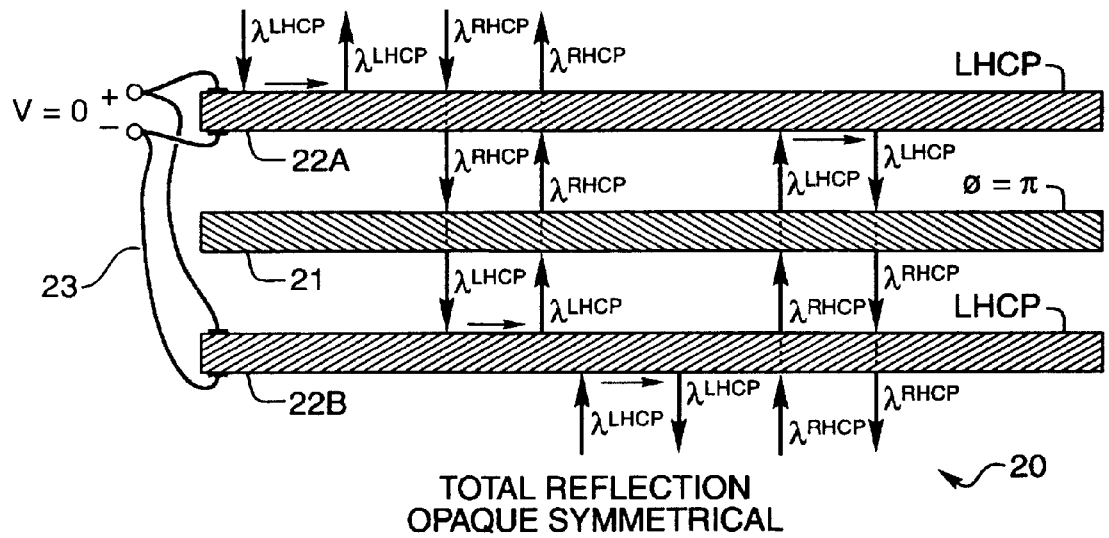
FIG. 10E is a schematic diagram illustrating the operation of the intelligent electro-optical window of FIG. 10, where the control voltages provided to both LHCP electromagnetic radiation reflecting panels are selected so that the window panel is switched into its the optically opaque state of operation.

As shown in FIG. 10E, the electro-optical glazing structure of FIG. 10 is switched to its optically opaque state of operation by not applying a control voltage thereacross (i.e. V=0). In this optical state, the electro-optical glazing structure 20 reflects LHCP and RHCP electromagnetic radiation within $\alpha\lambda_{reflection}^{LHCP}$ incident on either LHCP electromagnetic radiation reflecting panel without adsorption, independent of the direction of propagation thereof, as shown in FIG. 10E. As such, the operation of this particular electro-optical glazing structure is "symmetrical". The physical mechanisms associated with such reflection processes are schematically illustrated in FIG. 10E in great detail. Inasmuch as 100% of incident electromagnetic radiation is transmitted through the electro-optical glazing structure, this glazing structure is "totally reflective" in this state of operation.

Figure 10F:
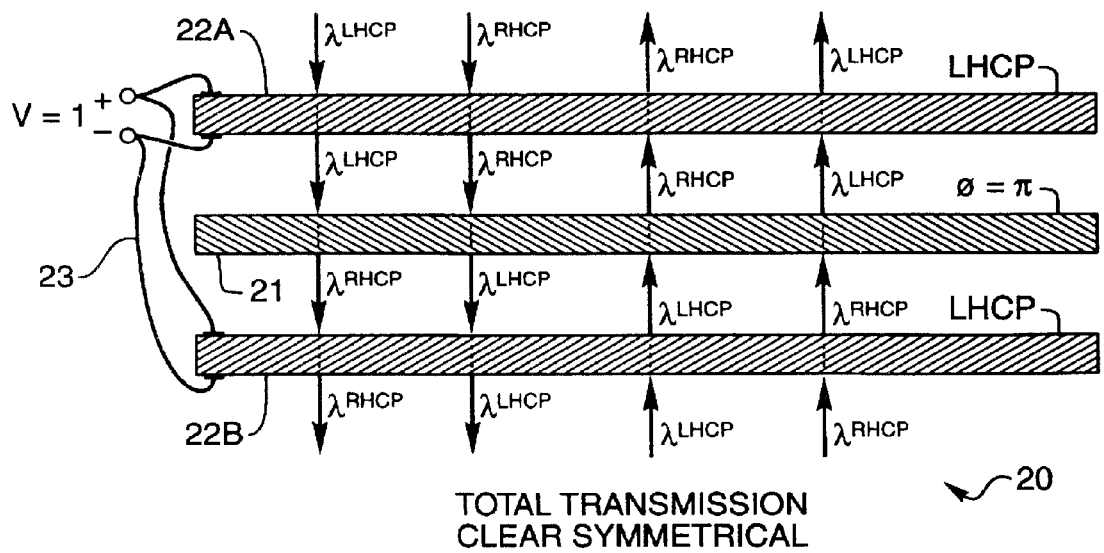
FIG. 10F is a schematic diagram illustrating the operation of the intelligent electro-optical window of FIG. 10, where the control voltages provided to both LHCP electromagnetic radiation reflecting panels are selected so that the window panel is switched into its the optically transparent (i.e. clear) state of operation.

As shown in FIG. 10F, the electro-optical glazing structure of FIG. 10 is switched to its optically transparent (i.e. clear) state of operation by applying the appropriate control voltage thereacross (i.e. V=1). In this optical state, the electro-optical glazing structure 20 transmits both LHCP and RHCP electromagnetic radiation within $\alpha\lambda_{reflection}^{LHCP}$ incident on either LHCP electromagnetic radiation reflecting panel of the window panel without adsorption, independent of the direction of propagation of the incident electromagnetic radiation. As such, the operation of this particular electro-optical glazing structure is "symmetrical". The physical mechanisms associated with such transmission processes are schematically illustrated in FIG. 10F in great detail. Inasmuch as 100% of incident electromagnetic radiation is transmitted through the electro-optical glazing structure, this glazing structure is "totally transmissive" in this state of operation.

The electro-optical glazing structure of FIG. 10 can be readily adapted to exhibit "asymmetrical" reflection/transmission characteristics over its broad-band of operation by tuning the spectral transmission characteristics of both the CLC-based LHCP electromagnetic radiation reflecting panels 22A and 22B so that the spectral reflection (and transmission) bandwidth characteristics thereof are either completely or partially overlapping or are separated on the wavelength (i.e. frequency) domain. Using such CLC-tuning techniques, it is possible to create an electro-optical glazing structure having the construction of FIG. 10 which, when switched to its first optical state, is capable of totally reflecting electromagnetic radiation within a desired reflection band (e.g. within the ultraviolet and infrared bands) in a first direction defined with respect to the panel, and when switched to its second optical state, totally transmitting electromagnetic radiation within such reflection band.

Sixth Illustrative Embodiment of the Electro-Optical Glazing Structure of the Present Invention The sixth illustrative embodiment of the electro-optical glazing structure hereof will be described with reference to FIGS. 12 through 13B.

Figure 12:
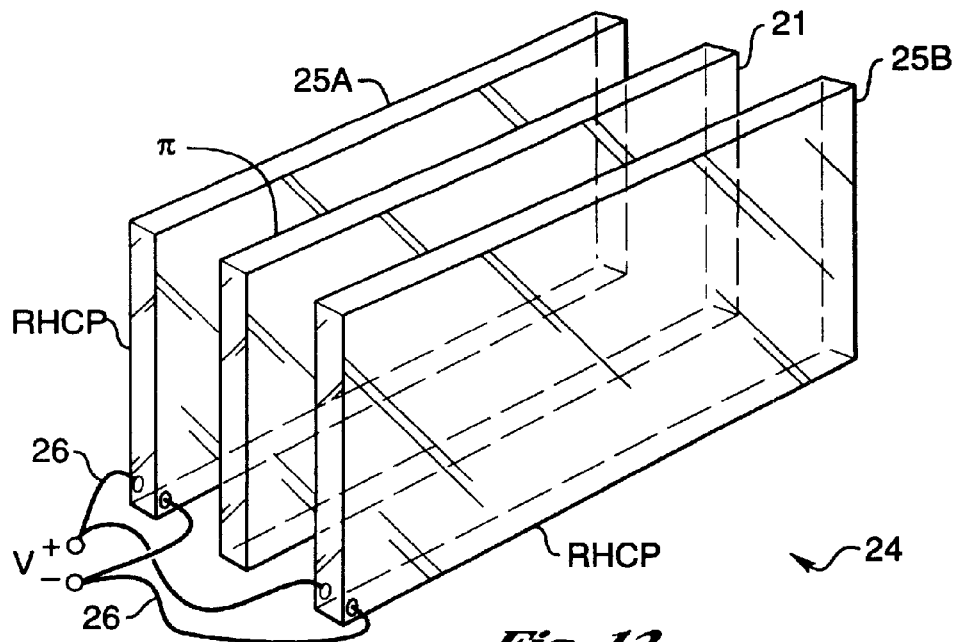
FIG. 12 is an exploded perspective view of a sixth illustrative embodiment of the intelligent electro-optical window of the present invention, comprising an electrically-passive π-phase retardation panel interposed between a first electrically-active RHCP electromagnetic radiation reflecting panel and a second electrically-active RHCP electromagnetic radiation reflecting panel, each made from CLC material having polarization-selective reflection characteristics over a broad-band region of the electromagnetic spectrum.

As shown in FIG. 12, the electro-optical glazing structure of the sixth illustrative embodiment 24 comprises: an electrically-passive π-phase retardation panel 21 interposed between a first electrically-active RHCP electromagnetic radiation reflecting panel 25A and a second electrically-active RHCP electromagnetic radiation reflecting panel 25B; and electrically conductive means 26 for applying optical-state control voltages to the electrically-active RHCP electromagnetic radiation reflecting panels 25A and 25B. Preferably, the electro-optical glazing structure of FIG. 12 is mounted within a frame structure as described in connection with the generalized embodiment shown in FIGS. 1A and 1B, and incorporates all of the power generation, electromagnetic radiation detection and micro-control mechanisms thereof.

Figure 12A:
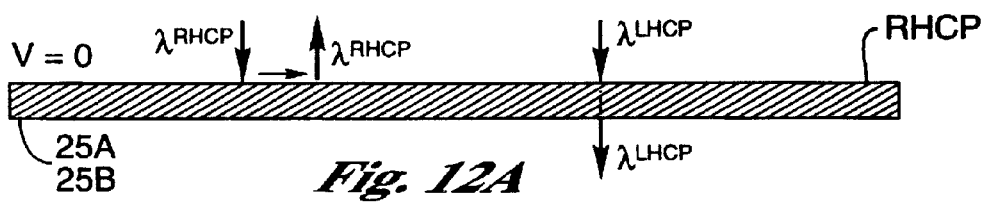
FIG. 12A is a schematic diagram of the LHCP electromagnetic radiation reflecting panel shown in FIG. 12, and its response to both RHCP and LHCP electromagnetic radiation incident thereto when operated in the RHCP radiation reflecting state thereof.

In FIG. 12A, the electrically-active RHCP electromagnetic radiation reflecting panel 25A (25B) is shown being operated in its electrically inactive state (i.e. when V=0). As shown in FIG. 12B, electromagnetic radiation having a RHCP polarization state and a wavelength inside the characteristic reflection bandwidth $\alpha\lambda_{reflection}^{RHCP}$ of the RHCP electromagnetic radiation reflecting panel 25A (25B) is reflected directly therefrom without absorption, while electromagnetic radiation having either a LHCP polarization state and/or a wavelength outside the characteristic reflection bandwidth $\alpha\lambda_{reflection}^{RHCP}$ of the RHCP electromagnetic radiation reflecting panel is transmitted directly therethrough without absorption.

Figure 12C:
FIG. 12C is a schematic diagram of the RHCP electromagnetic radiation reflecting panel shown in FIG. 12, and its response to both RHCP and LHCP electromagnetic radiation incident thereto when operated in the radiation transmission state thereof.
Figure 12B:
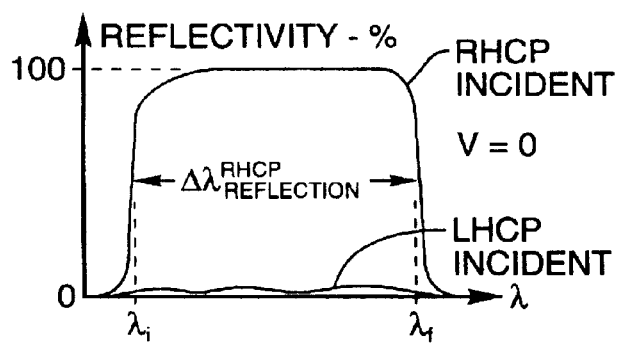
FIG. 12B is a schematic representation of the electromagnetic radiation reflection characteristics of the RHCP electromagnetic radiation reflecting panels of FIG. 12, over the broadband range of operation thereof $\alpha\lambda_{reflection}^{RHCP}$, when operated in the RHCP radiation reflecting state thereof.
Figure 12D:
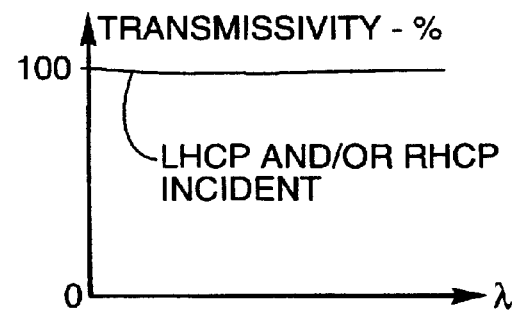
FIG. 12D is a schematic representation of the electromagnetic transmission characteristics of the RHCP electromagnetic radiation reflecting panels of FIG. 12, over the broadband range of operation thereof $\alpha\lambda_{transmission}^{RHCP}$, when operated in the radiation transmission state thereof.

In FIG. 12C, the electrically-active RHCP electromagnetic radiation reflecting panel 25A (25B) is shown being operated in its electrically active state (i.e. when V=1). As shown in FIG. 12D, electromagnetic radiation having a LHCP or RHCP polarization state and any wavelength within transmission bandwidth $\alpha\lambda_{transmission}^{RHCP}$ is transmitted directly through the electro-optical panel without absorption.

The electrically-passive π-phase retardation panel 21 employed in the electro-optical glazing structure of FIG. 12 can be realized in the manner described above in connection with the embodiment shown in FIG. 12 above. The electrically-active, broad-band LHCP electromagnetic radiation reflecting panels 25A and 25B used in the glazing structure of FIG. 10 can be made using the fabrication methods described above in connection with the embodiment shown in FIG. 10. Physically interfacing panels 21, 25A and 25B of the electro-optical glazing structure of FIG. 12 can be achieved using conventional lamination techniques well known in the glazing art.

The operation of the glazing structure of FIG. 12 will now be described with reference to FIGS. 13A and 13B.

Figure 13A:
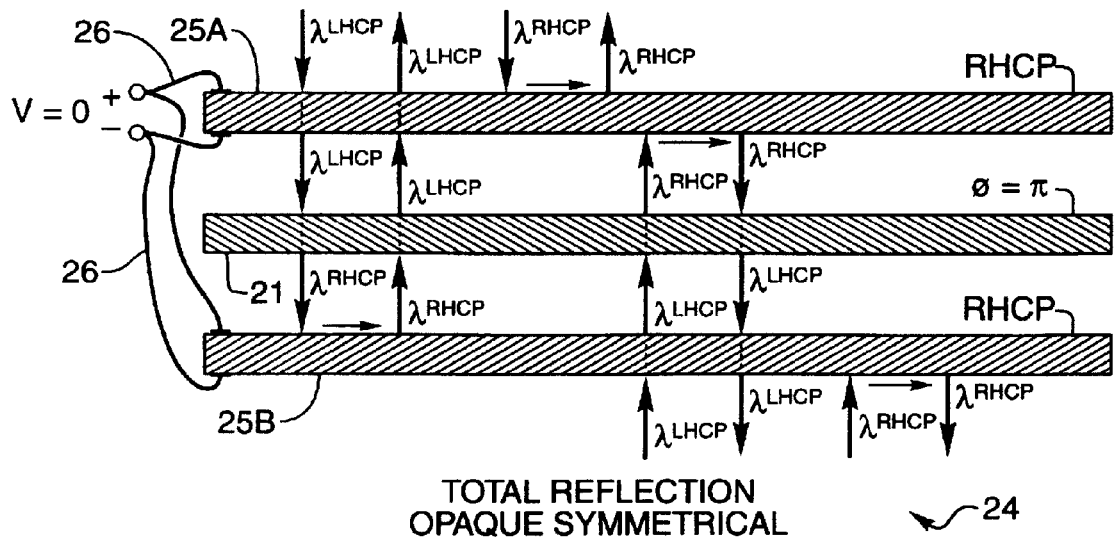
FIG. 13A is a schematic diagram illustrating the operation of the intelligent electro-optical window of FIG. 12, where the control voltages provided to both RHCP electromagnetic radiation reflecting panels are selected so that the window panel is switched into its the optically opaque state of operation.

As shown in FIG. 13A, the electro-optical glazing structure of FIG. 12 is switched to its optically opaque state of operation by not applying a control voltage thereacross (e.g. V=0 Volts). In this optical state, the electro-optical glazing structure 24 reflects LHCP and RHCP electromagnetic radiation within $\alpha\lambda_{reflection}^{RHCP}$ incident on the RHCP electromagnetic radiation reflecting panel 25A (25B) of the window panel without adsorption, independent of the direction of propagation of the incident electromagnetic radiation. As such, the operation of this particular electro-optical glazing structure is "symmetrical". The physical mechanisms associated with such reflection processes are schematically illustrated in FIG. 13A in great detail. Inasmuch as 100% of incident electromagnetic radiation is reflected from the electro-optical glazing structure, this glazing structure is "totally reflective" in this state of operation.

Figure 13B:
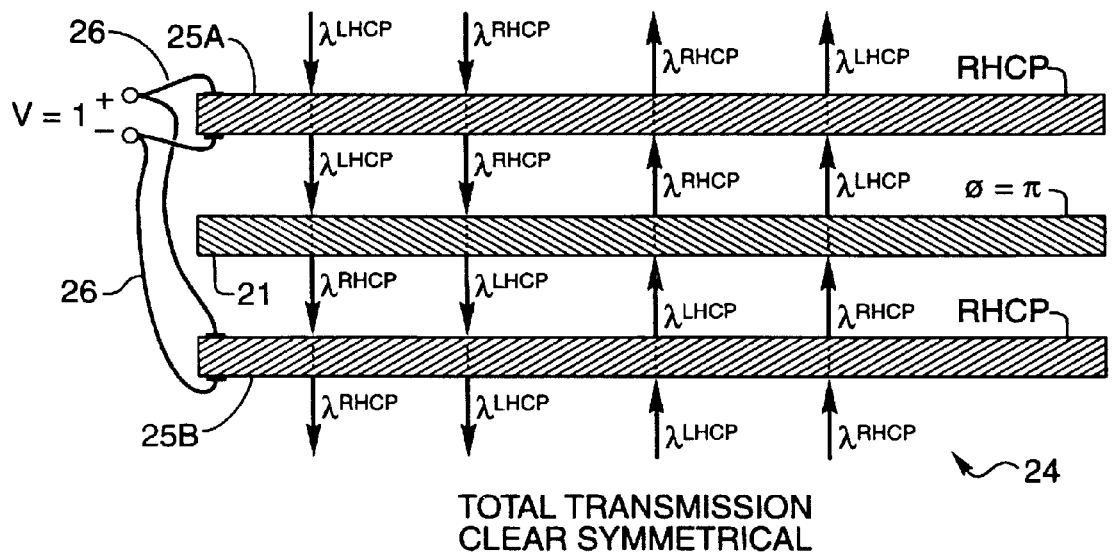
FIG. 13B is a schematic diagram illustrating the operation of the intelligent electro-optical window of FIG. 12, where the control voltages provided to both RHCP electromagnetic radiation reflecting panels are selected so that the window panel is switched into its the optically transparent (i.e. clear) state of operation.

As shown in FIG. 13B, the electro-optical glazing structure of FIG. 12 is switched to its optically transparent (i.e. clear) state of operation by applying the appropriate control voltage thereacross (e.g. V=1 Volts). In this optical state, the electro-optical glazing structure 24 transmits both LHCP and RHCP electromagnetic radiation within $\alpha\lambda_{reflection}^{RHCP}$ incident on either RHCP electromagnetic radiation reflecting panel 25A (or 25B) without adsorption, independent of the direction of propagation of the incident electromagnetic radiation. As such, the operation of this particular electro-optical glazing structure is "symmetrical". The physical mechanisms associated with such transmission processes are schematically illustrated in FIG. 13B in great detail. Inasmuch as 100% of incident electromagnetic radiation is transmitted through the electro-optical glazing structure, this glazing structure is "totally transmissive" in this state of operation.

The electro-optical glazing structure of FIG. 12 can be readily adapted to exhibit "asymmetrical" reflection/ transmission characteristics over its broad-band of operation by tuning the spectral transmission characteristics of both the CLC-based RHCP electromagnetic radiation reflecting panels 25A and 25B so that the spectral reflection (and transmission) bandwidth characteristics thereof are either completely or partially overlapping or are separated on the wavelength (i.e. frequency) domain. Using CLC-tuning techniques, it is possible to create an electro-optical glazing structure having the construction of FIG. 12 which, when switched to its first optical state, is capable of totally reflecting electromagnetic radiation within a desired reflection bandwidth (e.g. within the ultraviolet and infrared bands) in a direction defined with respect to the panel, and when switched to its second optical state, totally transmitting electromagnetic radiation within such reflection band.

Seventh Illustrative Embodiment of the Electro-Optical Glazing Structure of the Present Invention The seventh illustrative embodiment of the electro-optical glazing structure hereof will be described with reference to FIGS. 14 through 15B.

Figure 14:
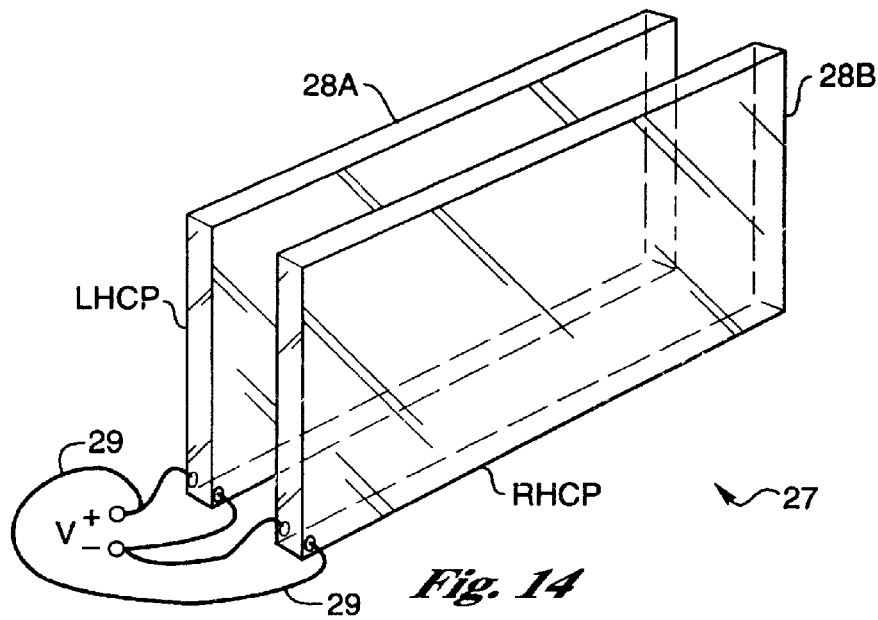
FIG. 14 is an exploded perspective view of a seventh illustrative embodiment of the intelligent electro-optical window of the present invention, showing an electrically-active LHCP electromagnetic radiation reflecting panel laminated to an electrically-active RHCP electromagnetic radiation reflecting panel, each made from CLC material having polarization-selective reflection characteristics over a broad-band region of the electromagnetic spectrum.

As shown in FIG. 14, the electro-optical glazing structure of the seventh illustrative embodiment 27 comprises: an electrically-active LHCP electromagnetic radiation reflecting panel 28A; an electrically-active RHCP electromagnetic radiation reflecting panel 28B laminated to panel 28A; and electrically conductive means 29 for applying optical-state control voltages to the electrically-active LHCP and RHCP electromagnetic radiation reflecting panels 28A and 28B. Preferably, the electro-optical glazing structure of FIG. 14 is mounted within a frame structure as described in connection with the generalized embodiment shown in FIGS. 1A and 1B, and incorporates all of the power generation, electromagnetic radiation detection and micro-control mechanisms thereof.

Figure 14A:
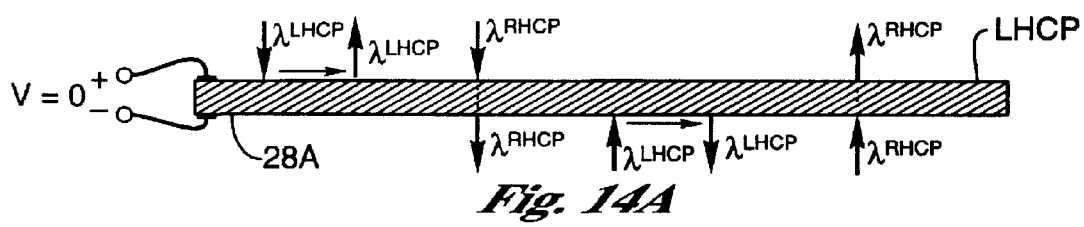
FIG. 14A is a schematic diagram of the LHCP electromagnetic radiation reflecting panel shown in FIG. 14, and its response to both RHCP and LHCP electromagnetic radiation incident thereto when operated in its LHCP radiation reflecting state.

In FIG. 14A, the electrically-active LHCP electromagnetic radiation reflecting panel 28A is shown being operated in its electrically inactive state (i.e. when V=0). As shown in FIG. 14B, electromagnetic radiation having a LHCP polarization state and a wavelength inside the characteristic reflection bandwidth $\alpha\lambda_{reflection}{}^{LHCP}$ of the LHCP electromagnetic radiation reflecting panel 28A is reflected directly therefrom without absorption, while electromagnetic radiation having either a RHCP polarization state and/or a wavelength outside the characteristic reflection bandwidth $\alpha\lambda_{reflection}{}^{LHCP}$ of the LHCP electromagnetic radiation reflecting panel 28A is transmitted directly therethrough without absorption.

Figure 14C:
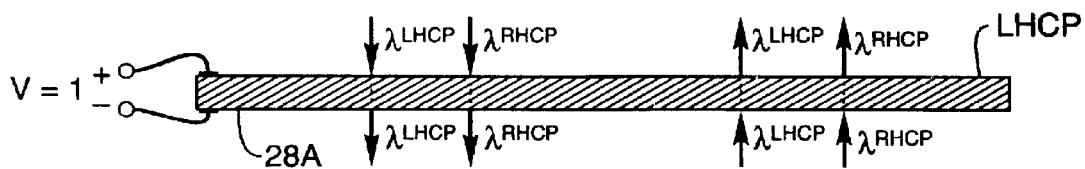
FIG. 14C is a schematic diagram of the LHCP electromagnetic radiation reflecting panel shown in FIG. 14, and its response to both RHCP and LHCP electromagnetic radiation incident thereto when operated in its radiation transmission state.
Figure 14B:
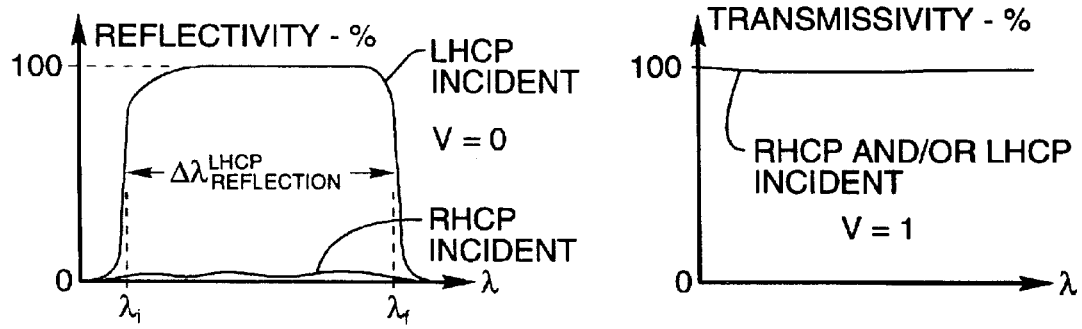
FIG. 14B is a schematic representation of the electromagnetic radiation reflection characteristics of the LHCP electromagnetic radiation reflecting panel of FIG. 14, over its broadband range of operation $\alpha\lambda_{reflection}^{LHCP}$, when operated in its LHCP radiation reflecting state.
Figure 14D:
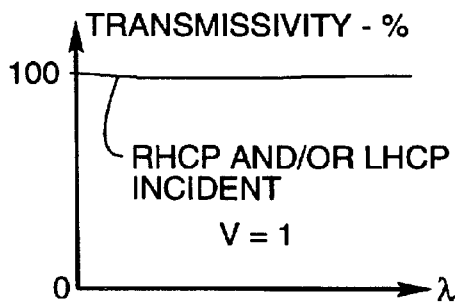
FIG. 14D is a schematic representation of the electromagnetic radiation transmission characteristics of the LHCP electromagnetic radiation reflecting panel of FIG. 14, over its broadband range of operation $\alpha\lambda_{transmission}^{LHCP}$, when operated in its radiation transmission state.

In FIG. 14C, the electrically-active LHCP electromagnetic radiation reflecting panel 28B is shown being operated in its electrically active state (i.e. when V=1). As shown in FIG. 14D, electromagnetic radiation having a LHCP or RHCP polarization state and any wavelength within transmission bandwidth $\alpha\lambda_{reflection}{}^{LHCP}$ is transmitted directly through the electro-optical panel 28A without absorption.

In FIG. 14E, the electrically-active RHCP electromagnetic radiation reflecting panel 28B is shown being operated in its electrically inactive state (i.e. when V=0). As shown in FIG.14F, electromagnetic radiation having a RHCP polarization state and a wavelength inside the characteristic reflection bandwidth $\alpha\lambda_{reflection}{}^{RHCP}$ of the RHCP electromagnetic radiation reflecting panel 28B is reflected directly therefrom without absorption, while electromagnetic radiation having either a LHCP polarization state and/or a wavelength outside the characteristic reflection bandwidth $\alpha\lambda_{reflection}{}^{RHCP}$ of the RHCP electromagnetic radiation reflecting panel 28B is transmitted directly therethrough without absorption.

In FIG. 14G, the electrically-active RHCP electromagnetic radiation reflecting panel 28B is shown being operated in its electrically active state (i.e. when V=1). As shown in FIG. 14H, electromagnetic radiation having a LHCP or RHCP polarization state and any wavelength within transmission bandwidth $\alpha\lambda_{transmission}{}^{RHCP}$ is transmitted directly through the electro-optical panel 28B without absorption.

The electrically-active, broad-band LHCP and RHCP electromagnetic radiation reflecting panels 28A abd 28B used in the glazing structure of FIG. 14 can be made using the fabrication methods described above in connection with the embodiment shown in FIG. 10. In the preferred embodiment, the liquid crystal polymer material contained within panel 28A can be made using the following formula: CLC polymer (BASF 171): 12%; CB15: 25%; E44: 64%; IG184: 1%. The sample is made by filling the mixture into a pair of buffed polyimide ITO glass substitutes. UV curving intensity is $10^5$ w/cm². A similar formula is used to make the liquid crystal polymer material contained within panel 28B.

Physically interfacing panels 28A and 28B of the electro-optical glazing structure of FIG. 14 can be achieved using conventional lamination techniques well known in the glazing art.

The operation of the glazing structure of FIG. 14 will now be described with reference to FIGS. 15A and 15B.

As shown in FIG. 15A, the electro-optical glazing structure of FIG. 14 is switched to its optically opaque state of operation by not applying a control voltage thereacross (i.e. V=0). In this optical state, the electro-optical glazing structure 27 reflects LHCP and RHCP electromagnetic radiation within reflection bandwidth $\alpha\lambda_{reflection}{}^{LHCP}$ incident on the LHCP electromagnetic radiation reflecting panel 28A without adsorption, while reflecting LHCP and RHCP electromagnetic radiation within reflection bandwidth $\alpha\lambda_{reflection}{}^{RHCP}$ incident on the RHCP electromagnetic radiation reflecting panel 28B without adsorption. As such, the operation of this particular electro-optical glazing structure is "symmetrical". The physical mechanisms associated with such reflection processes are schematically illustrated in FIG. 15A in great detail. Inasmuch as 100% of incident electromagnetic radiation is reflected from the electro-optical glazing structure, this glazing structure is "totally reflective" in this state of operation.

As shown in FIG. 15B, the electro-optical glazing structure of FIG. 14 is switched to its optically transparent (i.e. clear) state of operation by applying the appropriate control voltage thereacross (i.e. V=1). Assuming that the LHCP electromagnetic radiation reflecting panel 28A and RHCP electromagnetic radiation reflecting panel 28B each have the same characteristic transmission bandwidth (i.e $\alpha\lambda_{transmission}{}^{LHCP}$ is the same as $\alpha\lambda_{transmission}{}^{RHCP}$), then when switched in this optical state, the electro-optical glazing structure of FIG. 14 transmits without adsorption, both LHCP and RHCP wavelengths within transmission bandwidth $\alpha\lambda_{transmission}{}^{LHCP}$ independent of whether such wavelengths fall incident on either the LHCP or RHCP electromagnetic radiation reflecting panel of the electro-optical glazing structure. As such, the operation of this particular embodiment of the electro-optical glazing structure is "symmetrical". The physical mechanisms associated with such transmission processes are schematically illustrated in FIG. 15B in great detail. Inasmuch as 100% of incident electromagnetic radiation is transmitted through the electro-optical glazing structure, this glazing structure is "totally transmissive" in this state of operation.

Notably, the electro-optical glazing structure of FIG. 14 can be readily adapted to exhibit "asymmetrical" reflection/transmission characteristics over its broad-band of operation. Such characteristics can be imparted by tuning the spectral transmission characteristics of both the CLC-based RHCP and LHCP electromagnetic radiation reflecting panels 28A and 28B of the present invention so that the spectral characteristics thereof are either completely or partially overlapping or are separated on the wavelength (or frequency) domain. Using CLC-tuning techniques disclosed in International Publication No. WO 97/16762, it is possible to create an electro-optical glazing structure which, when switched to its first optical state, is capable of totally reflecting electromagnetic radiation within a desired reflection bandwidth (e.g. within the UV and IR bands) in a direction defined with respect to the panel, and when switched to its second optical state, totally transmitting electromagnetic radiation within the reflection band.

Figure 16A:
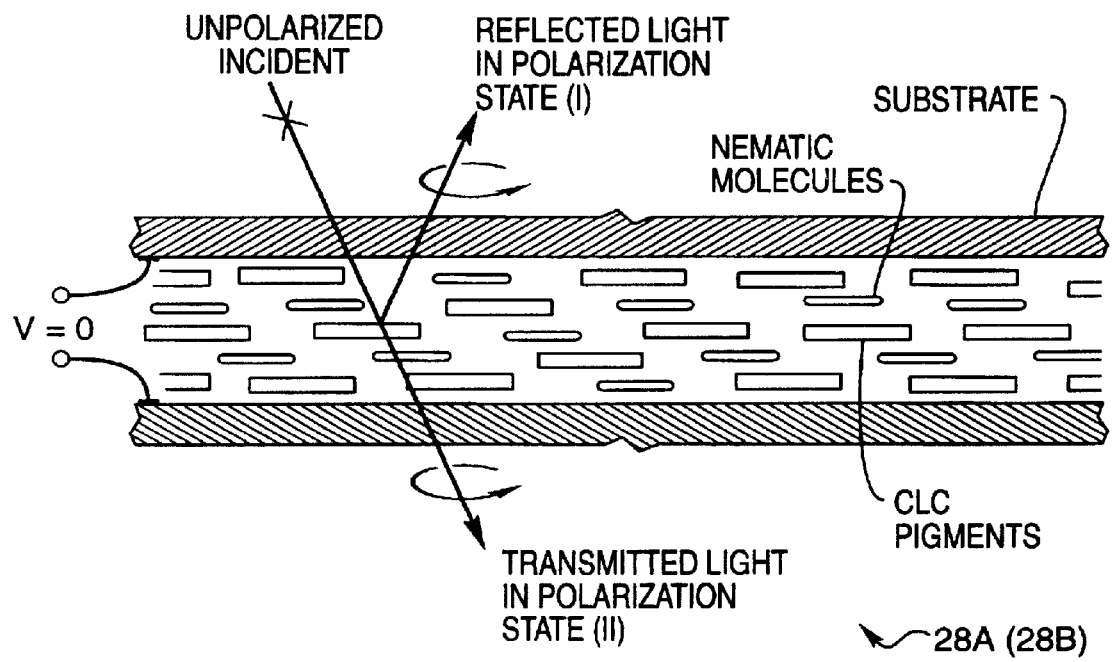
FIG. 16A is a schematic diagram of a second, alternative embodiment of the electrically-switchable broad-band CLC panel of FIG. 14, showing a portion of un-polarized light being polarized in a first polarization state and reflected off CLC microflakes (i.e. CLC pigments) that are oriented in a parallel manner within electrically-active host nematic liquid crystal molecules homogeneously aligned between a pair of ITO coated plates, across which no control voltage is applied, while a second portion of the un-polarized light is polarized in a second polarization state and transmitted through the oriented CLC microflakes.
Figure 16B:
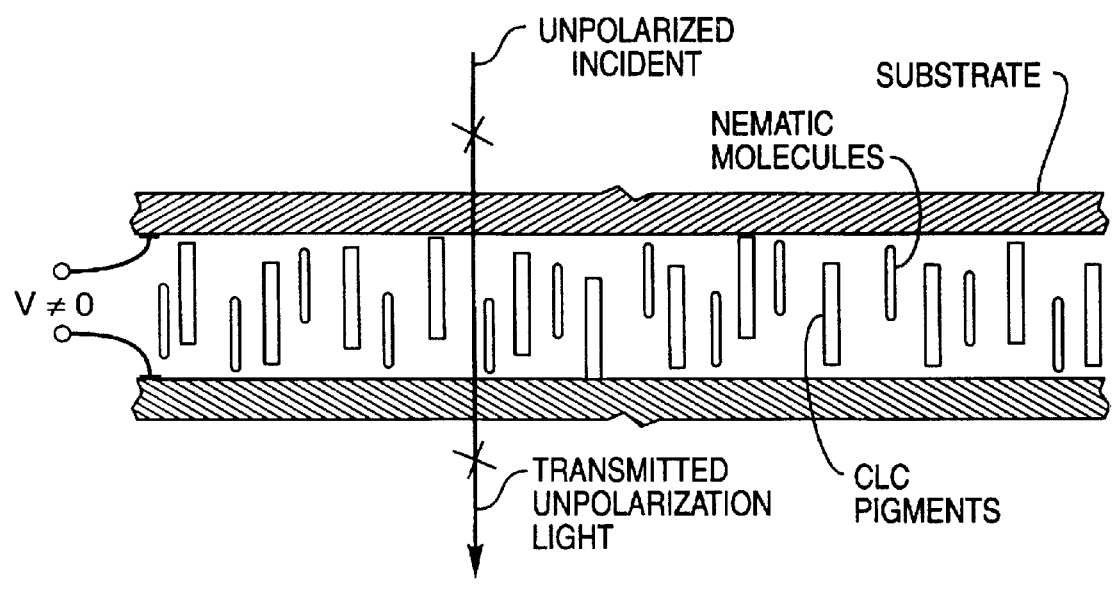
FIG. 16B is a schematic diagram of the second embodiment of the electrically-switchable broad-band CLC panel of FIG. 14, showing the un-polarized light being transmitted between CLC microflakes that are oriented in a vertical manner within electrically-active host nematic liquid crystal molecules homotropically aligned between a pair of ITO coated plates, across which a control voltage is applied.

Alternatively, the electrically-active LHCP and RHCP reflecting panels 28A and 28B panels in the glazing structure of FIG. 14 can be realized using the novel electro-optical construction schematically illustrated in FIGS. 16A and 16B.

As shown in FIGS. 16A and 16B, the physical construction of this alternative embodiment of the electrically-switchable broad-band CLC panels 28A (28B) is very similar to that of the panels described above in connection with FIGS. 11 through 11A3. However, in this alternative embodiment shown in FIGS. 16A and 16B, the broad-band (or super broad-band) CLC material contained between glass plates thereof is radically different from that contained with the panel illustrated in FIGS. 11 through 11A3, as will be explained below.

The novel material contained between the plates of this novel electrically-switchable super-broadband CLC (BBCLC) polarizer is made from polymerizable liquid crystal blends in cholesteric order. According to this aspect of the present invention, "functional pigment suspended liquid crystal" (FPSLC) material is created by mixing (i) broad-band CLC pigments (e.g. CLC microflakes taught in International Publication No. WO 97/16762) into (ii) an electrically-active (i.e. electrically-responsive) carrier fluid such as a low-molecular weight (LMW) nematic liquid crystal fluid (e.g. E7 and E44) which is commercially available from EMI of Hawthorne, N.Y. As will be explained in greater detail hereinafter, the micro-sized functional pigments of this particular embodiment have unique optical properties that can be exploited in various applications including electro-optical glazing structures. In the illustrative embodiment, the functional pigments are realized using BBCLC microflakes having a size in the range of about 20–100 microns. When making the LHCP panel 28A, left-handed BBCLC microflakes should be used, whereas when making the RHCP panel 28B, right-handed BBCLC microflakes should be used. The mass density of the CLC microflakes should be substantially equal to the mass density of the LMW carrier liquid fluid. Also the refractive index of the CLC microflakes should be matched closely to the refractive index of the carrier fluid.

Once prepared, the FPSLC mixture is poured into a cell constructed from a pair of spaced apart ITO-coated glass or plastic plates. To achieve the required liquid crystal alignment, the ITO layers are coated with rubbed polyimide in a manner well known in the art. The ITO layers are also provided with electrical leads so that an external field can be impressed across the ITO coated glass plates. As will be illustrated greater detail below, this makes the FPSLC material between the plates electrically-active or switchable between its electro-optical states of operation. Notably, when making such electrically-switchable plates, there is no UV polymerization step, as in the above-described fabrication methods.

After the filling operation, the CLC pigments are uniformly distributed inside the cell in order to cover the entire cell area. The cell thickness is designed to be larger than the pigment dimension. It is assumed that the liquid crystal molecules are spontaneously aligned in homogeneous state due to the surface coating. The homogeneous alignment of the host LC molecules forces the CLC pigments to align parallel to the cell surface, as shown in FIG. 16A. The switching or reorientation of the host liquid crystal molecules by an applied electric field forces the suspended CLC pigments to be reoriented accordingly, as shown in FIG. 16B. For purposes of convention, it will be helpful to designate state "A" of the host liquid crystal as the state when there is no electrical field is applied, as illustrated in FIG. 16A. Accordingly, the CLC pigments are assigned to be in state "$A_{c/c}$". Once a strong enough field, e.g., an electric field, is applied, the host liquid crystal molecules are reoriented to state "B" as shown in FIG. 16B. Accordingly, the CLC pigments are reoriented from state "$A_{c/c}$" to state "$B_{c/c}$". Since the BBCLC pigments in the host liquid crystal preserve the same polarization property, then its parallel orientation should exhibit a polarizing state for an incoming light onto the cell surface. If the CLC microflakes are vertically aligned due to the reorientation of the host liquid crystal molecules under an applied field, then the cell loses the capability to polarize light and becomes transparent or quasi-transparent, i.e. provided that the thickness of the CLC microflakes is much smaller than the aerial dimension of the electro-optical cell.

The electrically-switchable circularly polarizing panels of the type shown in FIGS. 16A and 16B can be realized in a variety of configurations. These alternative configurations will be described below.

Parallel-To-Vertical Configuration (Case I)

In this configuration, the cell is constructed so that the host nematic liquid crystal adopts a spontaneous alignment in homogeneous state. The ITO substrate is coated with a polyimide favorable for such an alignment followed by a mechanical rubbing. If the host liquid crystal has a positive dielectric anisotropy, it can be vertically reoriented into a homeotropic state by an electric field (E-field). In this case, state "A" of the host LC refers to homogeneous, and state "B" to homeotropic; while state "$A_{c/c}$" and "$B_{c/c}$" of the CLC pigments refers to parallel and perpendicular to the cell surface, respectively, as schematically shown in FIG. 16A. In this way, the panel can be switched from polarizing reflection to transparent or quasi-transparent state. Varying the strength of the E-field can change the final reflectivity of the panel. It should be pointed out that rubbed polyimide is not the only choice for surface treatment. Other techniques are also applicable, such as oblique deposition of SiOx, UV alignable layers, etc.

Parallel-To-Vertical Configuration (Case II)

In this configuration, the cell is constructed so that the host low molecular weight (LMW) cholesteric liquid crystal adopts a spontaneous alignment in the planar state. The pitch of the LMW CLC can be tuned either inside or outside of the CLC pigment reflection spectral region. The ITO substrate is coated with a rubbed polyimide favorable for planar alignment. If the host liquid crystal in cholesteric order has a positive dielectric anisotropy, it can be reoriented vertically into a homeotropic state by an electric field (E-field). In this case, state "A" of the host LC refers to planar, and state "B" to homeotropic; while state "$A_{c/c}$" and "$B_{c/c}$" of the CLC pigments refers to parallel and perpendicular to the cell surface, respectively. Thus the panel can be switched from polarizing reflection to transparent state. Varying the strength of the E-field can change the final reflectivity of the panel. It should be pointed out that rubbed polyimide is not the only choice for surface treatment. Other techniques are applicable, such as oblique deposition of SiOx, UV alignable layers, etc. In some cases, no alignment layer is required.

Vertical-To-Parallel Configuration (Case I)

In this configuration, the cell is constructed so that the host nematic liquid crystal adopts a spontaneous alignment in homeotropic state. The ITO substrate is coated with an alignment agent favorable for such an alignment. No mechanical rubbing is necessary. If the host liquid crystal has a negative dielectric anisotropy, it can be reoriented into a homogeneous state by an electric field (E-field). In this case, state "A" of the host LC refers to homeotropic, and state "B" to homogeneous; while state "$A_{c/c}$" and "$B_{c/c}$" of the CLC pigments refer to perpendicular and parallel to the cell surface, respectively. Thus the panel can be switched from transparent to polarizing reflection state. Varying the strength of the E-field can change the final reflectivity of the panel.

Vertical-To-Parallel Configuration (Case II)

In this configuration, the cell is constructed so that the host low molecular weight (LMW) cholesteric liquid crystal adopts a spontaneous alignment in homeotropic state. The pitch of the LMW CLC can be tuned either inside or outside of the CLC pigment reflection spectral region. The ITO substrate is coated with an alignment agent favorable for homeotropic alignment. If the host liquid crystal in cholesteric order has a negative dielectric anisotropy, it can be reoriented into a planar state by an electric field (E-field). In this case, state "A" of the host LC refers to homeotropic, and state "B" to planar; while state "$A_{c/c}$" and "$B_{c/c}$" of the CLC pigments refers to perpendicular and parallel to the cell surface, respectively. Thus the panel can be switched from transparent to polarizing reflection state. Varying the strength of the E-field can change the final reflectivity of the panel.

FPSLC with Polymer Network

In this preferred configuration, the cell is constructed so that the host low molecular weight (LMW) liquid crystal in cholesteric order contains a small amount of polymer network which is formed by UV polymerizing a polymer material mixed inside the LMW LC in absence of any field. The purpose of introducing the polymer network is to realize a bistable state, i.e., weak scattering state and high reflection state of the panel and, possibly, improving the reflectivity. The polymer network helps to better confine CLC flakes in a preferred orientation, for example, a parallel orientation. The host liquid crystal can adopt either an ECB or TN or STN or cholesteric order. The ITO substrate is coated with a polyimide favorable for a homogeneous alignment. If the host liquid crystal in cholesteric order has a positive dielectric anisotropy, it can be reoriented from planar to homeotropic state by an electric field (E-field). In this case, state "A" of the host LC refers to homogeneous, and state "B" to homeotropic; while state "$A_{c/c}$" and "$B_{c/c}$" of the CLC pigments refers to parallel and perpendicular to the cell surface, respectively. Thus the panel can be switched from polarizing reflection to semi-or total transparent state. Varying the strength of the E-field can change the final reflectivity of the panel. Another important feature of this polymer stabilized FPSLC configuration is that a reflection and scattering mixed mode can be realized by properly controlling polymer density and applied voltage, similar to the conventional polymer stabilized cholesteric texture (PSCT).

FPSLC with Surface Stabilization Function

In this preferred configuration, the cell is constructed so that the host low molecular weight (LMW) liquid crystal in cholesteric order is surface stabilized which exhibits also a bistable state, i.e., weak scattering state and relatively high reflective state. This texture helps to better confine CLC flakes in a preferred orientation, for example, a parallel orientation. The ITO substrate is coated with a polyimide favorable for a homogeneous alignment. If the host liquid crystal in cholesteric order has a positive dielectric anisotropy, it can be reoriented from planar to homeotropic state by an electric field (E-field). In this case, state "A" of the host LC refers to homogeneous, and state "B" to homeotropic; while state "$A_{c/c}$" and "$B_{c/c}$" of the CLC pigments refers to parallel and perpendicular to the cell surface, respectively. Thus the panel can be switched from polarizing reflection to semi-or total transparent state. Varying the strength of the E-field can change the final reflectivity of the panel. Another important feature of this surface-stabilized FPSLC configuration is that a reflection and scattering mixed mode can be realized by properly controlling polymer density and applied voltage, similar to the conventional polymer stabilized cholesteric texture (PSCT).

Each of the cell configurations described above can be used to build a switchable (super) broadband FPSLC panel which is electrically switchable from reflection state to transparent state, or vice versa. The reflected light is polarized and can cover a broad spectral bandpass, such as the entire visible region. Ideally, in a perfect reflection state, 50% of the incident light is reflected into one polarization state and another 50% is transmitted in other polarization state. However, when switched into the total transmission mode, the panel passes 100% of the incident light. Varying the strength of the E-field can change the final reflectivity between 0% and 50% (equivalently, the transmittance can be varied between 50% to 100%).

The electrically-switchable FPSLC-based structures described above can be used to realize the electrically-switchable circularly polarizing panels employed in the systems shown in FIGS. 10 and 12 hereof. In such electro-optical glazing structures, the particular compositions used to created the FPSLC material will vary in order to provide the required polarization reflective functions. For example, when making broad-band LHCP panels 22A and 22B, left-handed BBCLC microflakes should be added to the LMW liquid crystal carrier fluid of the FPSLC mixture thereof. When making broad-band RHCP panels 25A and 25B, right-handed BBCLC microflakes should be added to the LMW liquid crystal carrier fluid of the FPSLC mixture thereof. When making RHCP panels 25A and 25B having spectrally-tuned reflection characteristics, right-handed BBCLC microflakes with narrow-band reflection characteristics should be added to the LMW liquid crystal carrier fluid of the FPSLC mixture thereof. For example, five color CLC microflakes (i.e. pigments) can be added into the LMW liquid crystal carrier fluid in order to cover the visible band. It is understood, various combinations of left and right handed CLC microflakes (having super broad-band, broad-band and/or narrow-band polarization reflection characteristics) can be added to the LMW liquid crystal carrier fluid in order to produce electrically-switchable circularly polarizing glazing structures having diverse polarization reflection characteristics adapted to meet any application imaginable.

Additional Embodiments of the Electro-Optical Glazing Structure of the Present Invention Many more embodiments of the electro-optical glazing structure of the present invention can be provided by combining the above-described embodiments so provide systems and devices having transmission and reflection modes of operation.

In particular, the illustrative embodiments of the invention disclosed in FIGS. 2 through 9B and FIGS. 14 through 15B, in particular, can be readily combined with other structures to provide additional embodiments of the present invention. For simplicity of explanation, the embodiments described hereinabove are generalized in FIGS. 21 through 23F.

Figure 21A:
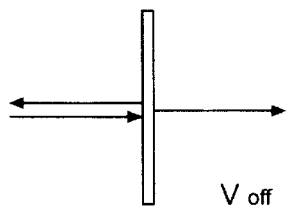
FIGS. 21 through 21F provide a generalized description of the illustrative embodiment disclosed in FIGS. 6 and 8, wherein the electrically-passive broad-band polarizing layers have different handedness in both the circularly polarizing (RHCP/LHCP) and linearly polarizing (LP1/LP2) system configurations.
Figure 21D:
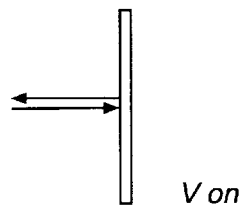
Figure 21B:
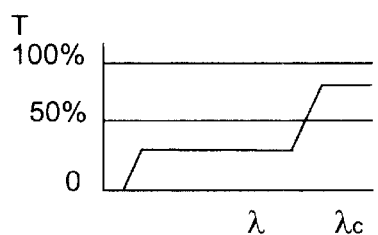
Figure 21E:
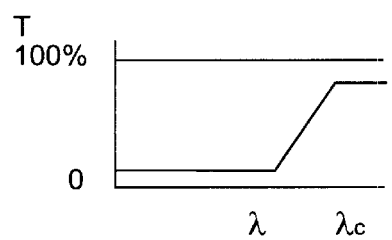
Figure 21C:
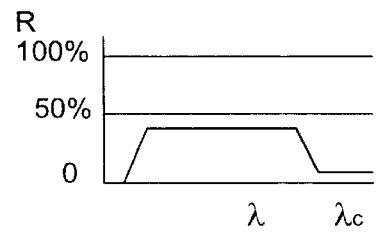
Figure 21F:
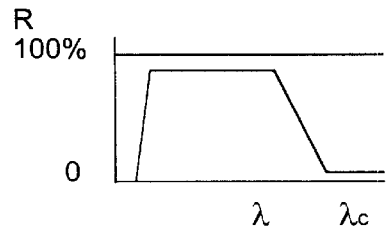
Figure 21:
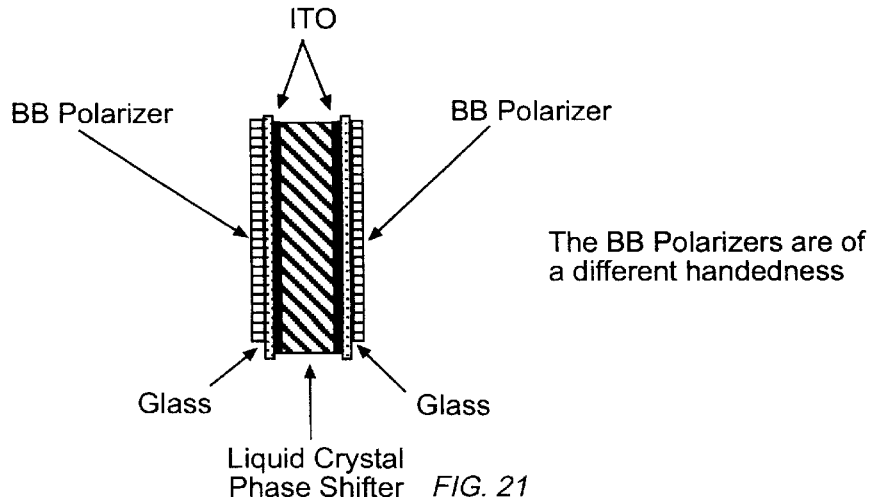

In paricular, FIGS. 21 through 21F provide a generalized description of the illustrative embodiments disclosed in FIGS. 6 and 8, wherein the electrically-passive broad-band polarizing layers have different handedness in both the circularly polarizing (RHCP/LHCP) and linearly polarizing (LP1/LP2) system configurations. FIGS. 22 through 22F provide a generalized description of the illustrative embodiments disclosed in FIGS. 2 and 4, wherein the electrically-passive broad-band polarizing layers have the same handedness in both the circularly polarizing (LHCP/LHCP or RHCP/RHCP) and linearly polarizing (LP1/LP1 or LP2/LP2) system configurations. Before describing these additional embodiments of the electro-optical glazing structure hereof, the operation of these two generalized embodiments of the present invention will be briefly summarized. Likewise, FIGS. 23 through 23F provide a generalized description of the illustrative embodiment disclosed in FIGS. 14 through 15B, wherein the electrically-active broad-band polarizing layers have a different handedness in the circularly polarizing (LHCP/LHCP or RHCP/RHCP) system configurations, and there is no otpically active element disposed between the electrically-active polarizing layers.

Before describing additional embodiments of the electro-optical glazing structure hereof which can be based on the above-indentified embodiments, it will be helpful to briefly summarize the structure and function of these embodiments hereinbelow in a more generalized manner to more clearly appreciate the various aspects of the present invention.

In FIG. 21A, the electro-optical glazing structure of FIG. 21 is shown operated in its partial-reflection/transmission mode, wherein no external voltage (i.e. $V=V_{off}$) is applied to the $\pi$ phase shifter. In FIGS. 21B and 21C, transmission and reflection characteristics for this mode of operation are shown, respectively. In FIG. 21D, the electro-optical light glazing structure of FIG. 21 is shown operated in its total-reflection mode, wherein an external voltage V (i.e. $V=V_{on}$) is applied to the $\pi$ phase shifter. In FIGS. 21E and 21F, transmission and reflection characteristics for this mode of operation are shown, respectively.

In FIG. 22A, the electro-optical glazing structure of FIG. 22 is shown operated in its total-reflection mode, wherein no external voltage (i.e. $V=V_{off}$) is applied to the $\pi$ phase shifter. In FIGS. 22B and 22C, transmission and reflection characteristics for this mode of operation are shown, respectively. In FIG. 22D, the electro-optical light glazing structure of FIG. 22 is shown operated in its partial-reflection/transmission mode, wherein an external voltage V (i.e. $V=V_{on}$) is applied to the $\pi$ phase shifter. In FIGS. 22E and 22F, transmission and reflection characteristics for this mode of operation are shown, respectively.

Figure 23A:
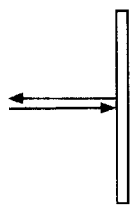
FIGS. 23 through 23F provide a generalized description of the illustrative embodiment disclosed in FIGS. 14 through 15B, wherein the electrically-active broad-band polarizing layers have a different handedness in the circularly polarizing (LHCP/LHCP or RHCP/RHCP) system configurations, and there is no optically active element disposed between the electrically-active polarizing layers.
Figure 23D:
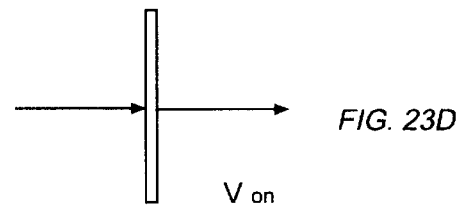
Figure 23B:
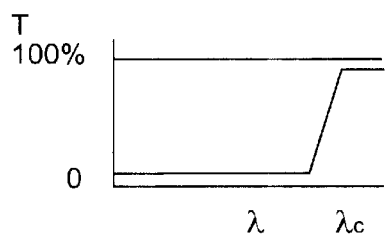
Figure 23E:
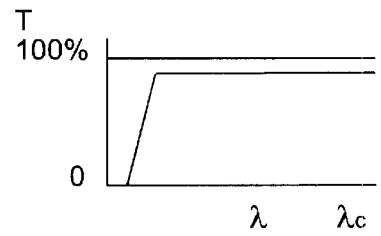
Figure 23C:
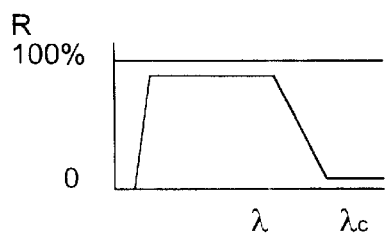
Figure 23F:
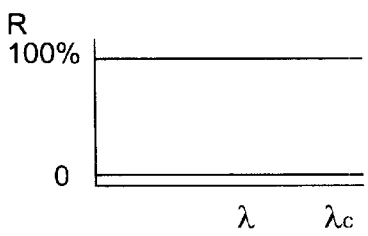
Figure 23:
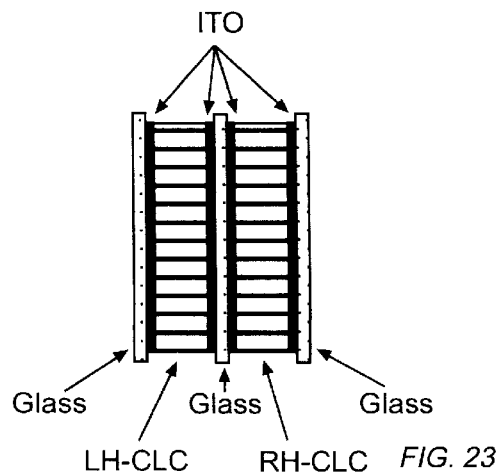

In FIG. 23A, the electro-optical glazing structure of FIG. 23 is shown operated in its total-reflection mode, wherein no external voltage (i.e. $V=V_{off}$) is applied to the $\pi$ phase shifter. In FIGS. 23B and 23C, transmission and reflection characteristics for this mode of operation are shown, respectively. In FIG. 23D, the electro-optical light glazing structure of FIG. 23 is shown operated in its total-transmission mode, wherein an external voltage V (i.e. $V=V_{on}$) is applied to the $\pi$ phase shifter. In FIGS. 23E and 23F, transmission and reflection characteristics for this mode of operation are shown, respectively.

Figure 24A:
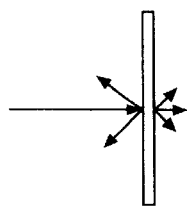
FIG. 24A shows the electro-optical glazing structure of FIG. 24 operated in scattering mode, wherein no external voltage (i.e. $V=V_{off}$) is applied to the electrically-controlled scattering panel.
Figure 24D:
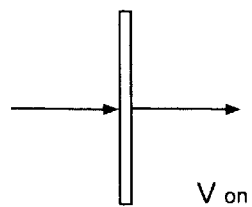
FIG. 24D shows the electro-optical light glazing structure of FIG. 24 operated in its total-transmission mode, wherein an external voltage V (i.e. $V=V_{on}$) is applied to electrically-controlled light scattering panel.
Figure 24B:
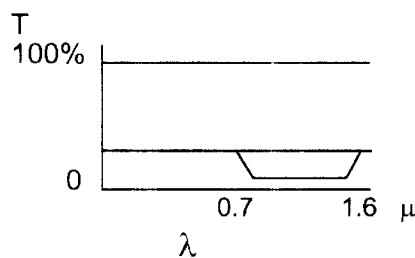
FIGS. 24B and 24C show transmission and reflection characteristics for the mode of operation shown in FIG. 24A.
Figure 24E:
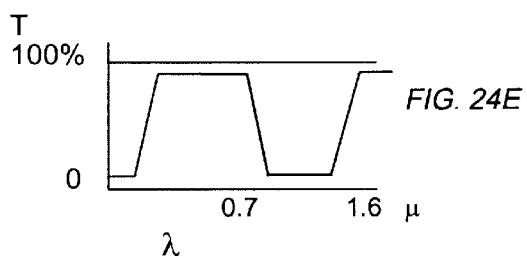
FIGS. 24E and 24F show the transmission and reflection characteristics for the mode of operation shown in FIG. 24D.
Figure 24C:
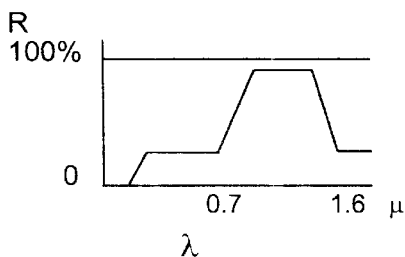
Figure 24F:
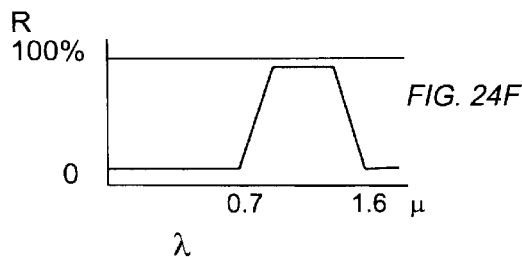
Figure 24:
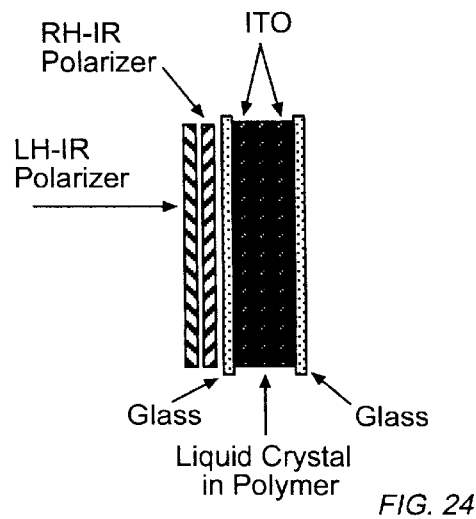
FIG. 24 shows an illustrative embodiment of the electro-optical glazing structure of the present invention comprising (1) a pair of electrically-passive broadband IR reflective polarizing panels for reflecting incident LHCP and RHCP light within the broad IR band and transmitting all other components of light, and (2) an electrically-controlled light scattering panel for selectively scattering light over the visible band (when no external voltage is applied) so as to render the resulting glazing structure opaque to provide privacy behind the window structure into which is installed.

In FIG. 24, an other illustrative embodiment of the electro-optical glazing structure of the present invention is shown comprising: a first electrically-passive broadband IR reflective polarizing panel for reflecting incident LHCP light within the broad IR band, and transmitting all other components of light; a second electrically-passive broadband IR reflective polarizing panel, laminated or mounted to the first IR reflective polarizing panel, for reflecting incident RHCP light within the broad IR band, and transmitting all other components of light. The resulting IR filter structure is mounted or affixed to an electrically-controlled light scattering panel, for selectively scattering light over the visible band (when no external voltage is applied) so as to render the resulting glazing structure opaque to provide privacy behind the window structure into which is installed. While circularly polarizing reflectors of the type taught in Internaational Publication No WO/97/16762 by Reveo, Inc., incorporated herein by reference, can be used to realize the broad-band IR circularly-polarizing panels of this structure, it is understood that broad-band IR polarizers which reflect linearly polarized light, as taught in International Application No. PCT/US97/20091 by Reveo, Inc., incorporated herein by reference, may also well be used to realize such linearly polarizing IR panels. Alternatively, such broadband IR reflecting panels may be made from multilayer polymer layers as disclosed in U.S. Pat. No. 5,686,979, incorporated herein by reference, and as taught elsewhere in the prior art. The electrically-controlled light scattering panel employed in the glazing structure of FIG. 24 can be realized by any one of the electrically-controlled light scattering panels disclosed in FIGS. 17A through 20F, described in detail hereinbelow.

In FIG. 24A, the electro-optical glazing structure of FIG. 24 is shown operated in scattering mode, wherein no external voltage (i.e. $V=V_{off}$) is applied to the electrically-controlled scattering panel. In FIGS. 24B and 24C, transmission and reflection characteristics for this mode of operation are shown, respectively. During this state operation, the composite broad-band IR structure totally reflects incident IR radation providing excellent thermal insulation to the glazing structure, while the electrically-controlled scattering panel renders the glazing structure optically opaque over the visible-band of the spectrum. In FIG. 24D, the electro-optical light glazing structure of FIG. 24 is shown operated in its total-transmission mode, wherein an external voltage V (i.e. $V=V_{on}$) is applied to electrically-controlled light scattering panel. In FIGS. 24E and 24F, transmission and reflection characteristics for this mode of operation are shown, respectively. During this state operation, the composite broad-band IR structure totally reflects incident IR radation providing excellent thermal insulation to the glazing structure, while the electrically-controlled scattering panel renders the glazing structure optically transparent over the visible-band of the spectrum enabling viewing through the glazing structure in bi-directional manner.

Figure 25A:
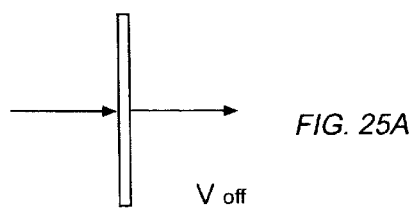
FIG. 25A shows the electro-optical glazing structure of FIG. 25 operated in its light transmission mode, wherein no external voltage (i.e. $V=V_{off}$) is applied to the electrically-controlled scattering panel.
Figure 25D:
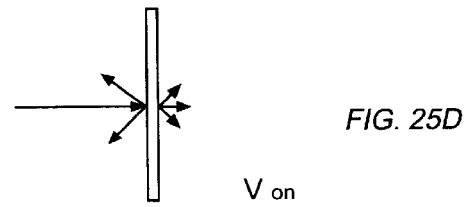
FIG. 25D shows the electro-optical light glazing structure of FIG. 24 operated in its light scattering mode, wherein an external voltage V (i.e. V=$V_{on}$) is applied to electrically-controlled light scattering panel.
Figure 25B:
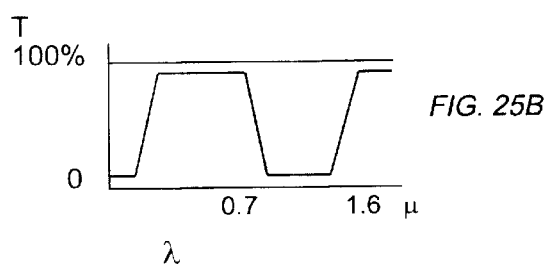
FIGS. 25B and 25C show transmission and reflection characteristics for the mode of operation shown in FIG. 25A.
Figure 25E:
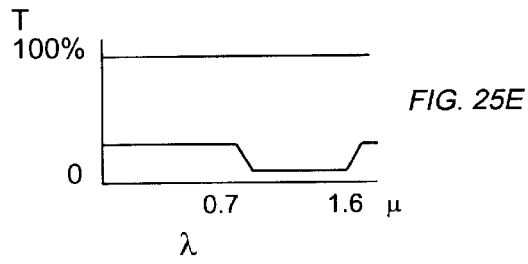
FIGS. 25E and 25F show transmission and reflection characteristics for the mode of operation shown in FIG. 25D.
Figure 25C:
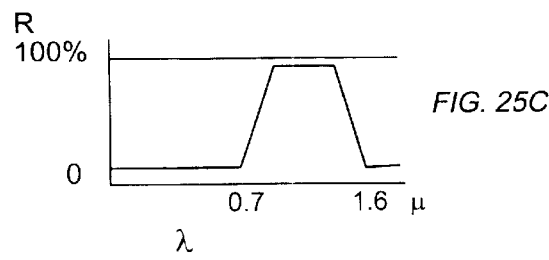
Figure 25F:
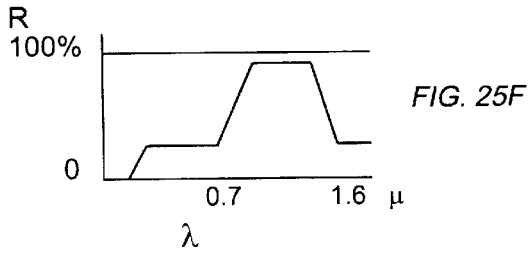
Figure 25:
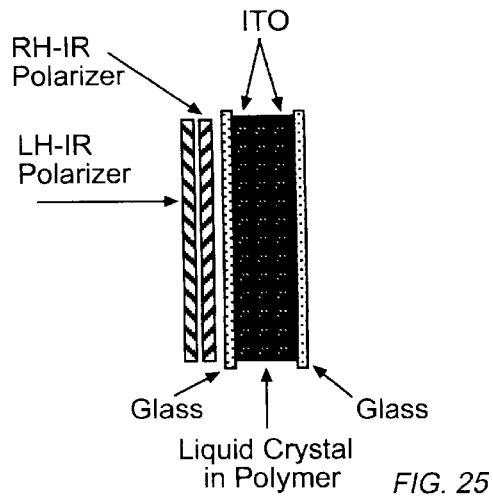
FIG. 25 shows an other illustrative embodiment of the electro-optical glazing structure of the present invention which is the reverse mode of the electro-optical glazing structure shown in FIG. 24.

In FIG. 25, an other illustrative embodiment of the electro-optical glazing structure of the present invention is shown. This is the reverse mode of the electro-optical glazing structure shown in FIG. 24. As shown, this glazing structure comprises: a first electrically-passive broadband IR reflective polarizing panel for reflecting incident LHCP light within the broad IR band, and transmitting all other components of light; a second electrically-passive broadband IR reflective polarizing panel, laminated or mounted to the first IR reflective polarizing panel, for reflecting incident RHCP light within the broad IR band, and transmitting all other components of light. As shown, the resulting IR filter structure is mounted or affixed to an electrically-controlled light scattering panel, for selectively scattering light over the visible band (when an external voltage is applied) so as to render the resulting glazing structure opaque to provide privacy behind the window structure into which is installed. While circularly polarizing reflectors of the type taught in Internaational Publication No WO/97/16762 by Reveo, Inc., incorporated herein by reference, can be used to realize the broad-band IR circularly-polarizing panels of this structure, it is understood that broad-band IR polarizers which reflect linearly polarized light, as taught in PCT Application No. PCT/US97/20091 by Reveo, Inc., incorporated herein by reference, may also well be used to realize such linearly polarizing IR panels. Alternatively, such broadband IR reflecting panels may be made from multilayer polymer layers as are know in the art. Alternatively, such broadband IR reflecting panels may be made from multilayer polymer layers as disclosed in U.S. Pat. No. 5,686,979, incorporated herein by reference, and as taught elsewhere in the prior art. The electrically-controlled light scattering panel employed in the glazing structure of FIG. 24 can be realized by any one of the electrically-controlled light scattering panels disclosed in FIGS. 17A through 20F, described in detail hereinbelow.

In FIG. 25A, the electro-optical glazing structure of FIG. 25 is shown operated in its light transmission mode, wherein no external voltage (i.e. $V=V_{off}$) is applied to the electrically-controlled scattering panel. In FIGS. 25B and 25C, transmission and reflection characteristics for this mode of operation are shown, respectively. During this state operation, the composite broad-band IR structure totally reflects incident IR radation providing excellent thermal insulation to the glazing structure, while the electrically-controlled scattering panel renders the glazing structure substantially transparent over the visible-band of the spectrum. In FIG. 25D, the electro-optical light glazing structure of FIG. 24 is shown operated in its light scattering mode, wherein an external voltage V (i.e. $V=V_{on}$) is applied to electrically-controlled light scattering panel. In FIGS. 25E and 25F, transmission and reflection characteristics for this mode of operation are shown, respectively. During this state operation, the composite broad-band IR structure totally reflects incident IR radation providing excellent thermal insulation to the glazing structure, while the electrically-controlled scattering panel renders the glazing structure optically opaque over the visible-band of the spectrum preventing viewing through the glazing structure.

Figure 26A:
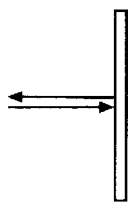
FIG. 26A shows the electro-optical glazing structure of FIG. 26 operated in its total-transmission mode, wherein no external voltage (i.e. V=$V_{off}$) is applied to the π phase shifting panel disposed between the pair of broadband polarizing reflective panels thereof.
Figure 26D:
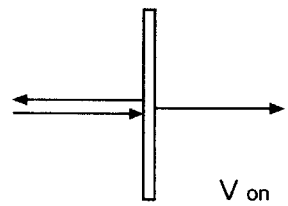
FIG. 26D shows the electro-optical light glazing structure of FIG. 26 operated in its partial-reflection/transmission mode, wherein an external voltage V (i.e. V=$V_{on}$) is applied to the π phase shifting panel disposed between the pair of broadband polarizing reflective panels thereof.
Figure 26B:
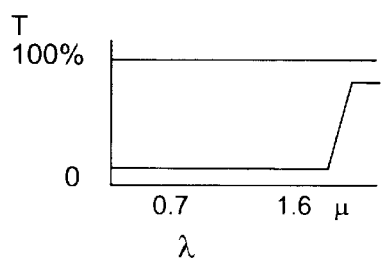
FIGS. 26B and 26C show transmission and reflection characteristics for the mode of operation shown in FIG. 26A.
Figure 26E:
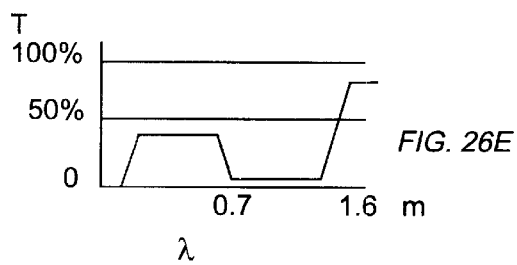
FIGS. 26E and 26F show the transmission and reflection characteristics for the mode of operation shown in FIG. 26D.
Figure 26C:
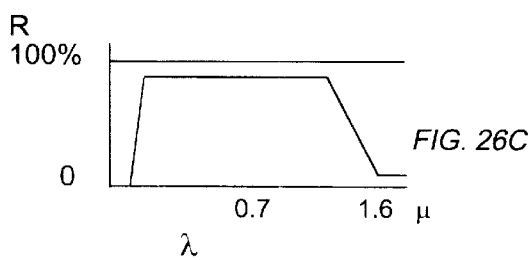
Figure 26F:
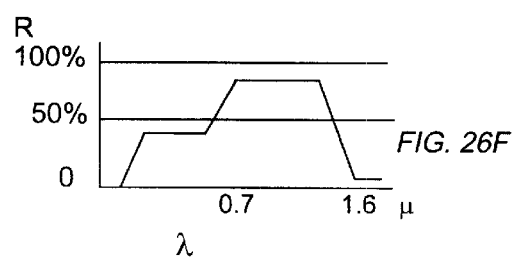
Figure 26:
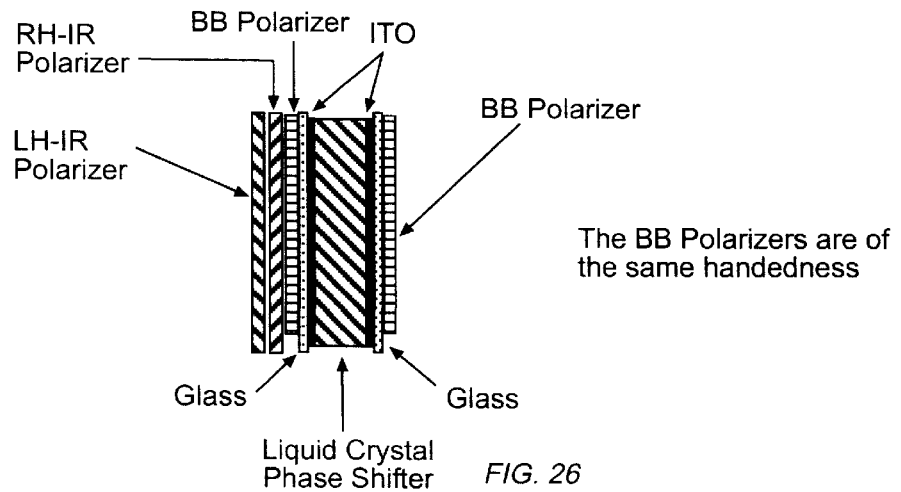
FIG. 26 shows another embodiment of the electro-optical glazing structure of the present invention constructed by adding the broad-band IR filter panel shown in FIGS. 24 and 25, to the electro-optical glazing structure shown in FIG. 22, wherein the broadband polarizing panels are each of the same handedness (e.g. RHCP/RHCP or LP1/LP1)

In FIG. 26, another embodiment of the electro-optical glazing structure of the present invention is disclosed. As shown, this electro-optical structure is constructed by adding the broad-band IR filter panel shown in FIGS. 24 and 25, to the electro-optical glazing structure shown in FIG. 22 wherein the broadband polarizing panels are each of the same handedness (e.g. RHCP/RHCP or LP1/LP1).

In FIG. 26A, the electro-optical glazing structure of FIG. 26 is shown operated in its total-transmission mode, wherein no external voltage (i.e. $V=V_{off}$) is applied to the π phase shifting panel disposed between the pair of broadband polarizing reflective panels thereof. In FIGS. 26B and 26C, transmission and reflection characteristics for this mode of operation are shown, respectively. During this state operation, the composite broadband IR filter structure totally reflects incident IR radation providing excellent thermal insulation to the glazing structure, while the electro-optical glazing substructure (shown individually in FIG. 22) totally-reflects over the visible band in order to render the glazing structure substantially transparent over the visible-band of the spectrum. In FIG. 26D, the electro-optical light glazing structure of FIG. 26 is shown operated in its partial-reflection/transmission mode, wherein an external voltage V (i.e. $V=V_{on}$) is applied to the π phase shifting panel disposed between the pair of broadband polarizing reflective panels thereof. In FIGS. 26E and 26F, transmission and reflection characteristics for this mode of operation are shown, respectively. During this state operation, the composite broad-band IR filter structure totally reflects incident IR radation providing excellent thermal insulation to the glazing structure, while the electro-optical glazing substructure (shown individually in FIG. 22) renders the glazing structure optically opaque over the visible-band of the spectrum preventing viewing through the glazing structure.

Figure 27A:
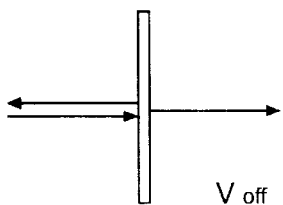
FIG. 27A shows the electro-optical glazing structure of FIG. 27 operated in its partial-reflection/transmission mode, wherein no external voltage (i.e. V=$V_{off}$) is applied to the π phase shifting panel disposed between the pair of broadband polarizing reflective panels thereof.
Figure 27D:
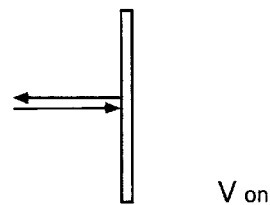
FIG. 27D shows the electro-optical light glazing structure of FIG. 27 operated in its total-reflection mode, wherein an external voltage V (i.e. V=$V_{on}$) is applied to the π phase shifting panel disposed between the pair of broadband polarizing reflective panels thereof.
Figure 27B:
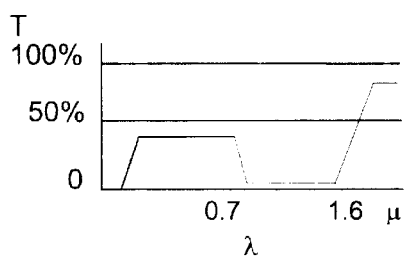
FIGS. 27B and 27C show transmission and reflection characteristics for the mode of operation shown in FIG. 27A.
Figure 27E:
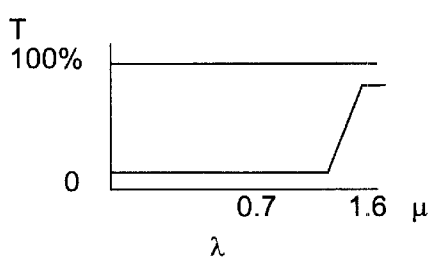
FIGS. 27E and 27F show transmission and reflection characteristics for the mode of operation shown in FIG. 27D.
Figure 27C:
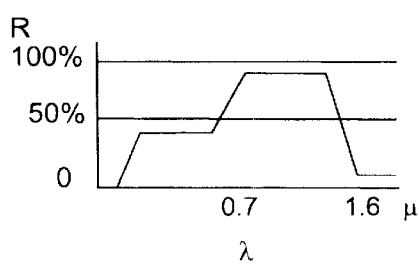
Figure 27F:
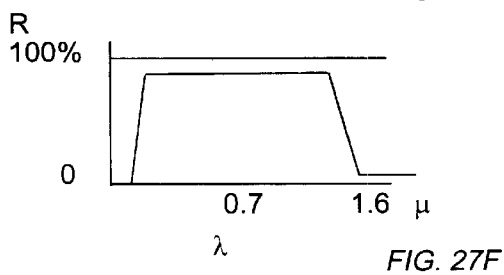
Figure 27:
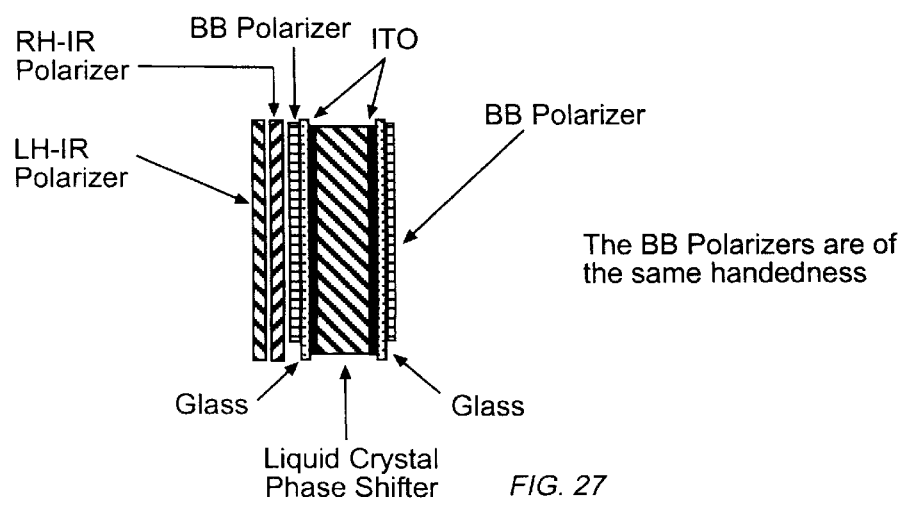
FIG. 27 shows another embodiment of the electro-optical glazing structure of the present invention which operates in the "reverse" mode of the glazing structure of FIG. 26, and is constructed by adding the broad-band IR filter panel shown in FIGS. 24 and 25, to the electro-optical glazing structure shown in FIG. 21, wherein the broadband polarizing panels are each of different handedness (e.g. RHCP/LHCP or LP1/LP2)

In FIG. 27, another embodiment of the electro-optical glazing structure of the present invention is disclosed which is operates in the "reverse" mode of the glazing structure of FIG. 26, described above. As shown in FIG. 27, this electro-optical structure is constructed by adding the broad-band IR filter panel shown in FIGS. 24 and 25, to the electro-optical glazing structure shown in FIG. 21 wherein the broadband polarizing panels are each of different handedness (e.g. RHCP/LHCP or LP1/LP2).

In FIG. 27A, the electro-optical glazing structure of FIG. 27 is shown operated in its partial-reflection/transmission mode, wherein no external voltage (i.e. $V=V_{off}$) is applied to the π phase shifting panel disposed between the pair of broadband polarizing reflective panels thereof. In FIGS. 27B and 27C, transmission and reflection characteristics for this mode of operation are shown, respectively. During this state operation, the composite broadband IR filter structure totally reflects incident IR radation providing excellent thermal insulation to the glazing structure, while the electro-optical glazing substructure (shown individually in FIG. 21) partially-reflects and partially-transmitts over the visible band in order to render the glazing structure semi-opaque over the visible-band of the spectrum. In FIG. 27D, the electro-optical light glazing structure of FIG. 27 is shown operated in its total-reflection mode, wherein an external voltage V (i.e. $V=V_{on}$) is applied to the π phase shifting panel disposed between the pair of broadband polarizing reflective panels thereof. In FIGS. 27E and 27F, transmission and reflection characteristics for this mode of operation are shown, respectively. During this state operation, the composite broad-band IR filter structure totally reflects incident IR radation providing excellent thermal insulation to the glazing structure, while the electro-optical glazing substructure (shown individually in FIG. 21) renders the glazing structure optically opaque over the visible-band of the spectrum preventing viewing through the glazing structure.

Figure 28A:
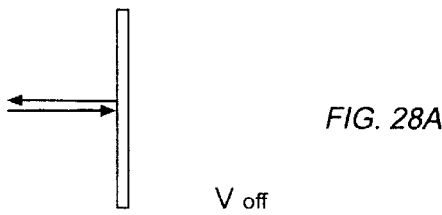
FIG. 28A shows the electro-optical glazing structure of FIG. 28 operated in its total-reflection mode, wherein no external voltage (i.e. V=$V_{off}$) is applied to the electrically-active circularly-polarizing reflective panels thereof.
Figure 28D:
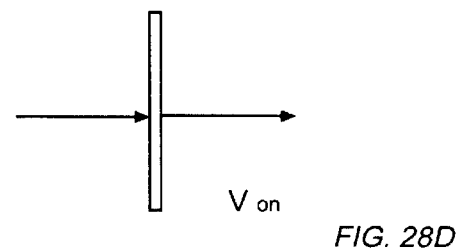
FIG. 28D shows the electro-optical light glazing structure of FIG. 26 operated in its total-transmission mode, wherein an external voltage V (i.e. V=$V_{on}$) is applied to the electrically-active circularly-polarizing reflective panels thereof.
Figure 28B:
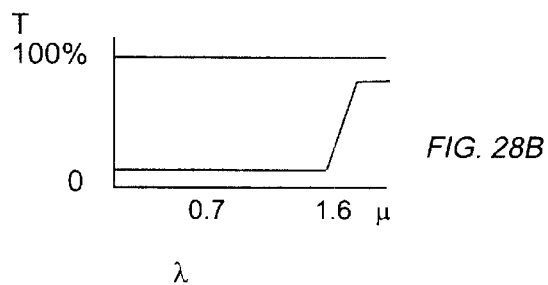
FIGS. 28B and 28C show transmission and reflection characteristics for the mode of operation shown in FIG. 28A.
Figure 28E:
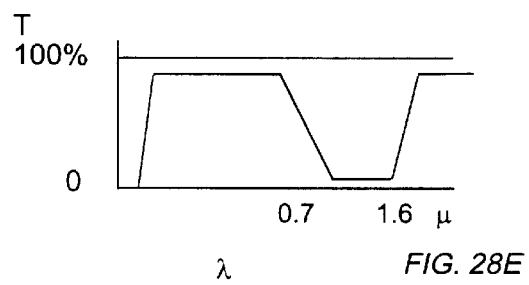
FIGS. 28E and 28F shows transmission and reflection characteristics for the mode of operation shown in FIG. 28D.
Figure 28C:
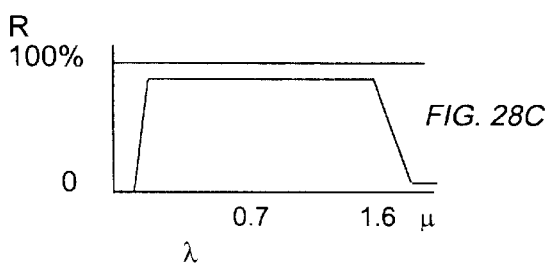
Figure 28F:
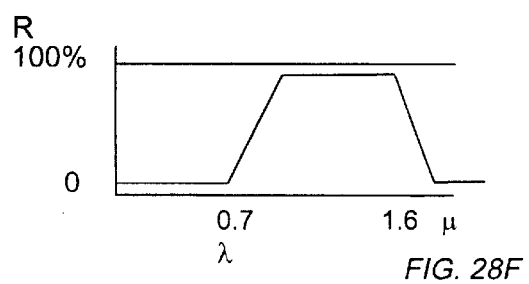
Figure 28:
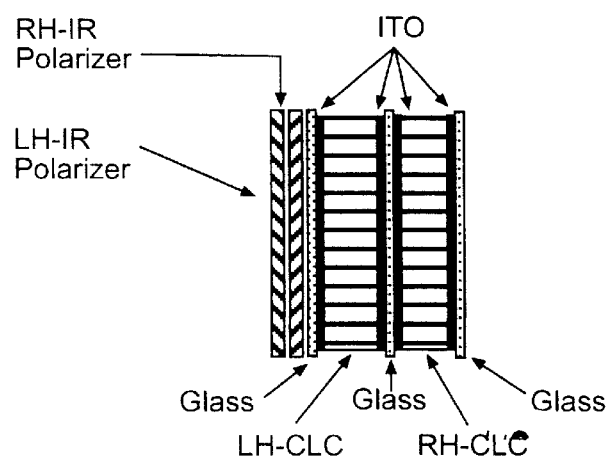
FIG. 28 shows another embodiment of the electro-optical glazing structure of the present invention constructed by adding the broad-band IR filter panel shown in FIGS. 24 and 25, to the electro-optical glazing structure shown in FIG. 23, wherein the electrically-active broadband polarizing panels thereof are each of different handedness (i.e. RHCP/LHCP)

In FIG. 28, another embodiment of the electro-optical glazing structure of the present invention is disclosed. As shown, this electro-optical structure is constructed by adding the broad-band IR filter panel shown in FIGS. 24 and 25, to the electro-optical glazing structure shown in FIG. 23, wherein the electrically-active broadband polarizing panels thereof are each of different handedness (i.e. RHCP/LHCP).

In FIG. 28A, the electro-optical glazing structure of FIG. 28 is shown operated in its total-reflection mode, wherein no external voltage (i.e. $V=V_{off}$) is applied to the electrically-active circularly-polarizing reflective panels thereof. In FIGS. 28B and 28C, transmission and reflection characteristics for this mode of operation are shown, respectively. During this state operation, the composite broadband IR filter structure totally reflects incident IR radation providing excellent thermal insulation to the glazing structure, while the electro-optical glazing substructure (shown individually in FIG. 21) totally-reflects over the visible band in order to render the glazing structure optically opaque over the visible-band of the spectrum. In FIG. 28D, the electro-optical light glazing structure of FIG. 26 is shown operated in its total-transmission mode, wherein an external voltage V (i.e. $V=V_{on}$) is applied to the electrically-active circularly-polarizing reflective panels thereof. In FIGS. 28E and 28F, transmission and reflection characteristics for this mode of operation are shown, respectively. During this state operation, the composite broad-band IR filter structure totally reflects incident IR radation providing excellent thermal insulation to the glazing structure, while the electro-optical glazing substructure (shown individually in FIG. 22) renders the glazing structure optically transparent over the visible-band of the spectrum.

Figure 29A:
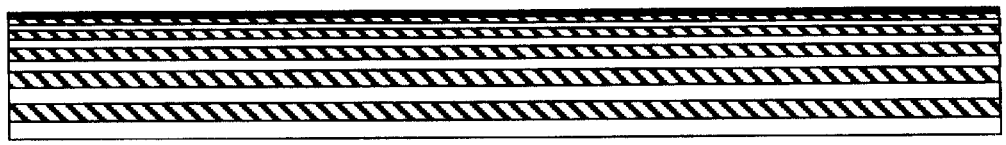
FIGS. 29A through 29C show a broad-band reflector for use in constructing broad-band circularly (and linearly) polarizing reflective panels employed in any one of embodiments of the electro-optical glazing panel hereof.
Figure 29B:
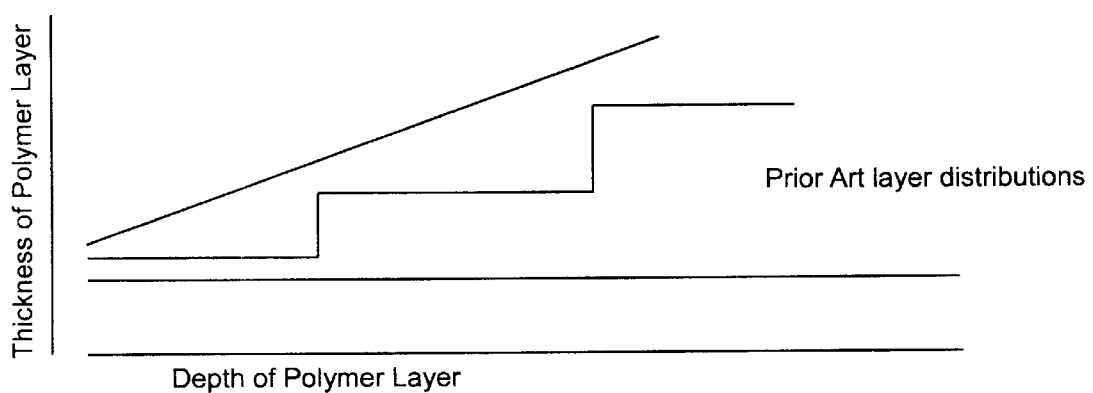
Figure 29C:
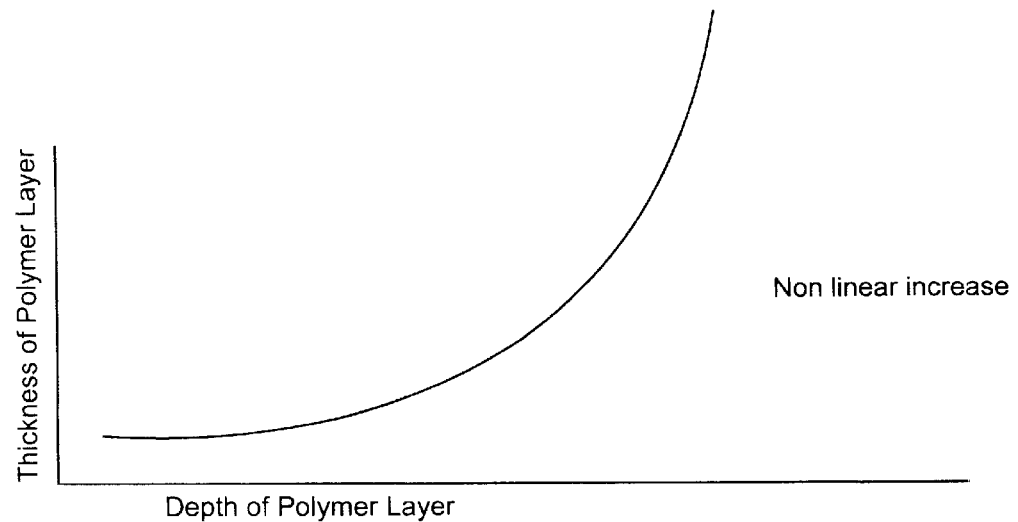

FIGS. 29A through 29C show a broad-band reflector for use in constructing broad-band circularly (and linearly) polarizing reflective panels employed in any one of embodiments of the electro-optical glazing panel hereof.

FIG. 29A shows a multilayer extruded polymer layer comprising a number of pairs of layers. Each layer of a pair has a different index of refraction from the other layer of the pair. The various layers are of the order of a quarter wavelength of light, so than the electric field of the light reflecting from the layer boundaries adds in phase with light reflecting from other boundaries to increase reflection in a well known manner.

FIG. 29B shows the prior art distribution of the layer thicknesses. The thickness of the layers does not change with depth, changes in stepwise fashion, or changes in a linear fashion. FIG. 29C shows a non-linear change in the thickness of the layers with depth. As taught in International Publication No. WO/97/16762 by Reveo, Inc., a non linearly varying pitch is necessary for efficient broad band reflection from cholesteric liquid crystal material. The non-linearly varying pitch shown in FIG. 29C allows much broader range of reflectivity than the prior art pitch variations of FIG. 29B for the multilayer reflectors. In the case that the two polymer layers shown in FIG. 29A are layers of at least one birefringent material where the index of refraction for a first linear polarization is changed from one material to the next, but where the index of refraction for a second linear polarization perpendicular to the first is the same from one material to the next, the structure shown in FIG. 29A will reflect light of the first polarization, and transmit light of the second polarization. The non-linearly varying pitch shown by FIG. 29C ensures broad band operation of the device without interference effects at shorter wavelengths which plague the step function distribution attempt at broadband operation of the prior art.

Broad band IR reflectors made from the multilayer extruded polymer material shown in FIG. 29A may be added to the panels of the invention to add IR reflectivity to the control of visible light. Multilayer linear polarizers may be used in the panels of the invention instead of CLC materials for controlling the light.

Additional Embodiments of the Electro-Optical Glazing Structure of the Present Invention Each of illustrative embodiments of electro-optical glazing panel hereof described hereinabove can be combined in various ways in order to provide intelligent glazing structures capable of controlling light transmission therethrough in any number of radiation bands. For example, transmission in the IR band may be allowed in the winter in the daylight, and at night the IR light may be reflected to save heating energy. In summer, however, IR light may be allowed to escape from the window structure, while visible radiation is reflected to insure privacy.

While the intelligent glazing structures of the invention taught hereinabove allow a very large part of the visible spectrum to be substantially totally reflected, some of these embodiments may, in practice, transmit some radiation, especially at large angles measured with respect to a projection axis normal to the glazing structure, or allow a very small amount of light to leak from a brightly lit room at night, to the dark outside. Consequently, such undesired light transmission in such instances may compromise the level of privacy demanded by particular users in diverse lighting environments. Therefore, there is a great need for a way to further improve the above-described electro-optical glazing structures of the present invention in a simple yet effective manner.

In accordance with another aspect of the present invention, this problem of undesired, partial light transmission can be solved, in instances where it arises, by embodying each electro-optical glazing structure of the present invention with an additional structure that is capable of controlling (e.g. reflecting or scattering) light incident thereon so as to either block the transmission of such light by reflection, or obscure it by scattering. In principle, such objectives can be achieved using a variety of different types of electro-optical structures well known in the art for different purposes, unrelated to the above-described problem at hand. The improved electro-optical glazing structures can be formed by mounting or incorporating such electrically-controllable structures to any of the above-described electro-optical glazing structures. In principle, such alternative embodiments of the present invention should solve the problems associated with partial light transmission during reflection modes of operation of the panel, thereby ensuring the desired level of privacy demanded by its user in diverse environments. Several different embodiments of the light controlling (reflecting or scattering) structure are described hereinbelow.

In FIGS. 17A and 17B, a first illustrative embodiment of the electrically-controllable light scattering structure is shown in the form of an ultra-thin panel comprising a polymer dispersed liquid crystal (PDLC) material 173 contained between a pair of spaced-apart transparent electrically conducting layers 174 and 175 (e.g. ITO). The PDLC material comprises a polymer material with regions 176 of liquid crystal material formed into small spheres of micron or submicron dimension. As illustrated in FIG. 17A, the molecules of the liquid crystal material (depicted as short lines) are correlated by the internal forces in the liquid crystal to have internal order, which may random in a predetermined state of the panel.

In FIG. 17A, PDLC panel 172 is shown operated in its scattering state, wherein light rays 171 incident on a layer 172 are scattered by the liquid crystal molecules ordered therein. During this state, light propagating through the polymer material 173 strikes the sphere of liquid crystal material 176, and will in general refract at the polymer liquid crystal interface because there will generally be a change in the index of refraction of the (randomly ordered) liquid crystal material and the polymer material. The layer 172 will then scatter light passing through. The light rays traced in FIG. 17A are shown transmitted through the layer 172, which would be the case for very light loading of liquid crystal material in the polymer. In the more general case, light incident on the panel would be as likely scattered backward as forward, and would likely be scattered isotropically in all directions.

In FIG. 17B, the PDLC panel 172 is shown operated in its transmission state, wherein an electric field is applied across the layer 172 by applying voltage across the conducting layers 174 and 175. In this state of operation, the electric field forces the liquid crystal molecules in each sphere to line up parallel with the field, causing the index of refraction of the liquid crystal material to match the index of the polymer material, thereby enabling the light rays pass through the layer 172 without deviation or scattering.

Figure 18A:
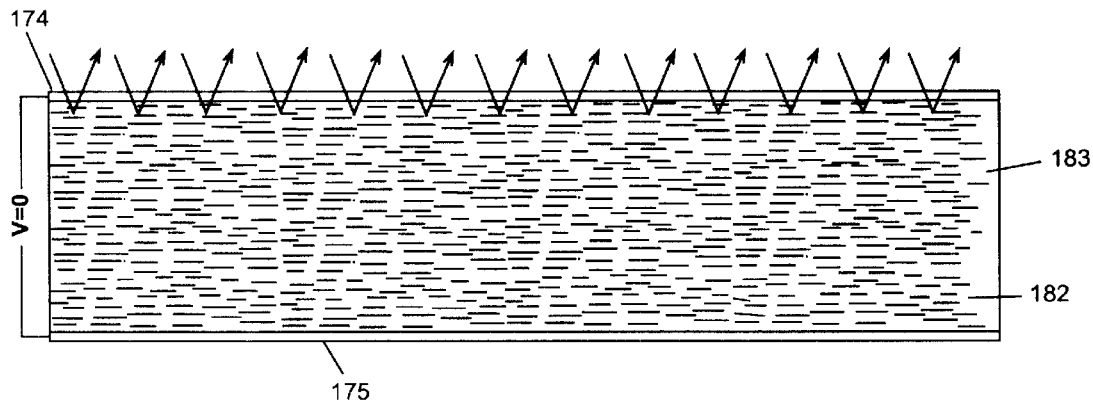
FIGS. 18A and 18B show a second illustrative embodiment of an electrically-controllable light scattering structure mountable to any embodiment of the electro-optical glazing structure of the invention disclosed or taught herein in order to reflect that portion of incident light which is not reflected during its reflection-mode of operation, thereby improving the privacy function of the glazing structure in the reflection mode.
Figure 18B:
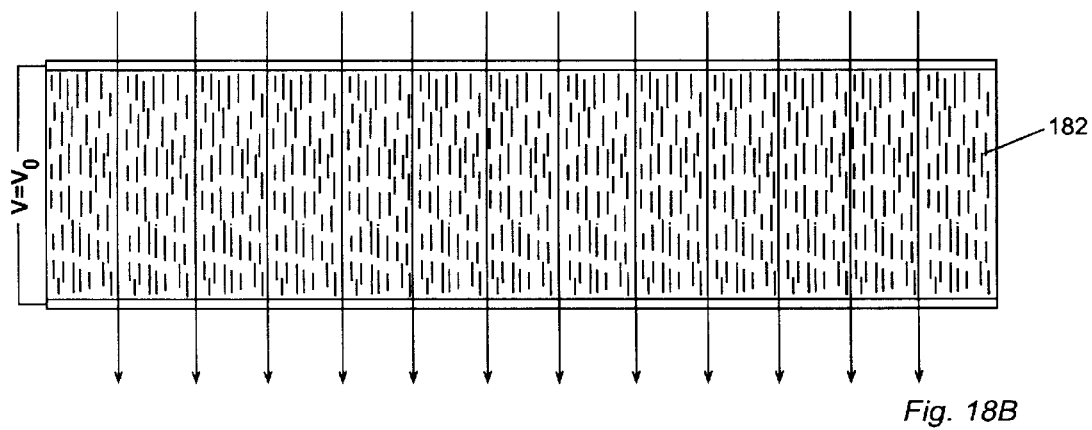
Figure 18C:
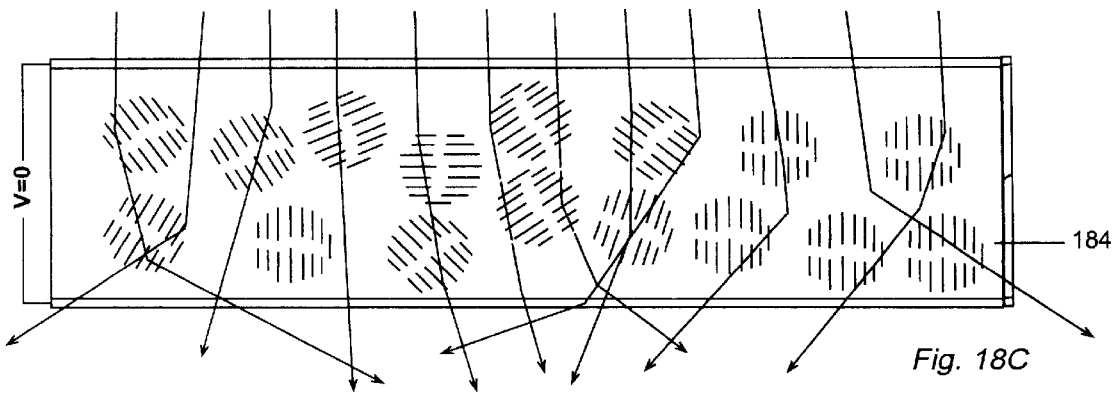
FIG. 18C shows a third illustrative embodiment of an electrically-controllable light scattering structure mountable to any embodiment of the electro-optical glazing structure of the invention disclosed or taught herein in order to scatter that portion of incident light which is not reflected during its reflection-mode of operation, thereby improving the privacy function of the glazing structure in the reflection mode.

In FIGS. 18A and 18C, a second illustrative embodiment of the electrically-controllable light scattering structure 182 is shown in the form of a thin panel comprising a liquid crystal polymer material 183 contained between a pair of spaced-apart transparent electrically conducting layers 174 and 175 (e.g. ITO) having surfaces that have been either rubbed or coated with a molecular aligning layer such as polyamide, well known in the CLC art. In this embodiment, the liquid crystal material 183 is admixed with a polymer material, but unlike the embodiment shown in FIGS. 17A and 17B, the resultant material does not phase segregate. Instead, the linear liquid crystal molecules remain entangled in the polymer material.

In FIG. 18A, the electro-optical light scattering structure 182 is shown operated in its reflection mode, wherein the crystal molecules (depicted as short lines) are lined up parallel with the conducting plates 174 and 175 because, for example, the surfaces of the plates have been rubbed, causing the molecules to become internally ordered (e.g. aligned) such that incident light on the layer 183 is reflected as shown. This molecular ordering can be thought of as a "relaxed ordering" when no external electrical force field is applied thereto.

In FIG. 18B, the electro-optical light scattering structure 182 is shown operated in its reflection mode, wherein an electric field is impressed across the layer 183 by applyin a voltage across layers 174 and 175. In this state of operation, the molecules rotate to line up parallel to the field and light, propagating parallel to the field, is transmitted through the layer 183 without scattering, reflection, or absorption. When the electric field is removed by disruption the applied voltage source, the polymer acts as restoring force to rotate the molecules back to their starting relaxed ordering as shown in FIG. 18A.

In FIG. 18C, a third illustrative embodiment of the electrically-controllable light scattering structure 182 is shown comprising liquid crystal polymer material 183 contained between a pair of spaced-apart transparent electrically conducting layers 174 and 175 (e.g. ITO) having surfaces that have not been rubbed or coated with a molecular aligning layer such as polyamide, as in the embodiment of FIGS. 18A and 18B. Thus there is no internal order imposed on the liquid crystal material by rubbed bounding surfaces or layers, as in the structure of FIGS. 18A and 18B. In FIG. 18C, the electro-optical light scattering structure 182 is shown operated in its scattering mode, wherein there is no internal ordering created by rubbed surfaces or polyamide layers, or an electric field created by an externally applied voltage. In this mode of operation, the liquid crystal material naturally tends towards lowering its internal energy by having near neighbor molecules align with one another, but there is no long range order. Thus the regions of material now scatter light randomly and, without the application an electric field, the light incident on the layer 184 is scattered. When an electric field is impressed across the panel of FIG. 18C, the molecules therebetween swing around to line up with the applied electric field, enabling incident light to be transmitted through the panel 182 without scattering in a manner similar to that shown in FIG. 18B. This is the transmission mode of operation of the electrically-controllable light scattering device.

In FIG. 19, fourth illustrative embodiment for an electro-optical light scattering structure (i.e. panel) is shown comprising an isotropic scattering material, such as a liquid crystal polymer, contained between a pair of transparent glass panels. Each of these plates has an ITO coating upon the glass plate surface, electrical terminals connected thereto, and a polyamide layer applied upon the ITO layer. Alternatively, the ITO surfaces can be rubbed for intiating molecular alignment in lieu of the ITO layers.

In FIG. 19A, the electro-optical light scattering structure of FIG. 19 is shown operated in its transmission mode, wherein no external voltage is applied (i.e. $V=V_{off}$). In FIGS. 19B and 19C, transmission and reflection characteristics for this mode of operation are shown, respectively. In FIG. 19D, the electro-optical light scattering structure of FIG. 19 is shown operated in its light scattering mode, wherein an external voltage V is applied across the ITO surfaces (i.e. $V=V_{on}$). In FIGS. 19E and 19F, transmission and reflection characteristics for this mode of operation are shown, respectively. As light is transmitted when no external voltage is applied, and scatters when a voltage is applied, this structure is said to operate in the "reverse mode".

Figure 20A:
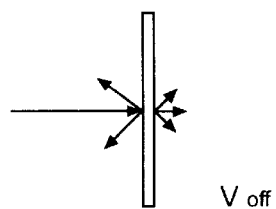
FIG. 20A shows the electro-optical light scattering structure of FIG. 20 operated in its light scattering mode, wherein no external voltage is applied (i.e. $V=V_{off}$)
Figure 20D:
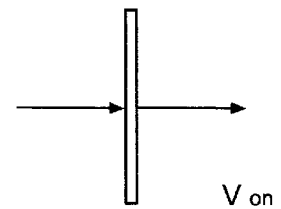
FIG. 20D shows the electro-optical light scattering structure of FIG. 20 operated in its light transmission mode, wherein an external voltage V is applied across the ITO surfaces (i.e. $V=V_{on}$)
Figure 20B:
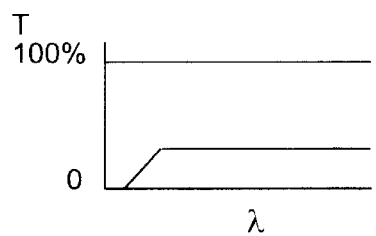
FIGS. 20B and 20C show transmission and reflection characteristics for the mode of operation indicated in FIG. 20A.
Figure 20E:
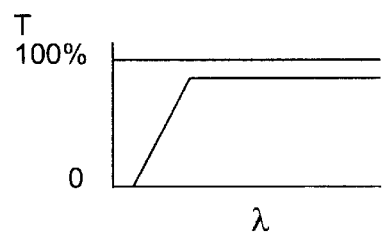
FIGS. 20E and 20F show transmission and reflection characteristics for the mode of operation indicated in FIG. 20D.
Figure 20C:
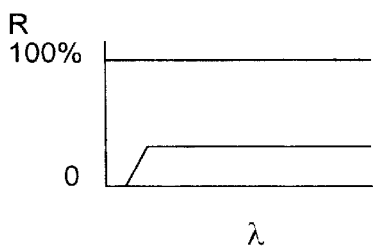
Figure 20F:
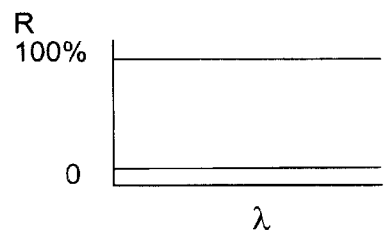
Figure 20:
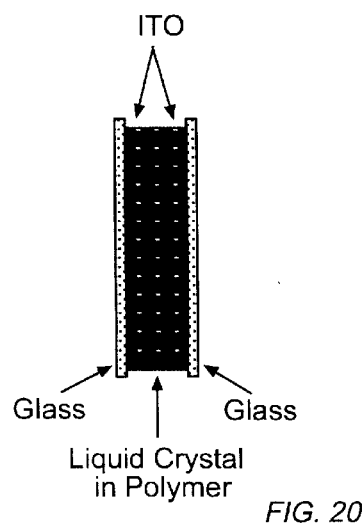
FIG. 20 shows a fifth illustrative embodiment of an electrically-controllable light scattering structure mountable to any embodiment of the electro-optical glazing structure of the invention disclosed or taught herein in order to scatter that portion of incident light which is not reflected during its reflection-mode of operation, thereby improving the privacy function of the glazing structure in the reflection mode.

In FIG. 20, a fifth illustrative embodiment for an electrically-controllable light scattering structure is shown comprising an isotropic scattering material, such as a liquid crystal polymer (made using a different polymer mixing ratio than used in FIG. 19), contained between a pair of transparent glass panels. Each of the plates has an ITO coating upon the glass plate surface and an electrical terminal connected thereto, but is not rubbed or coated with a polyamide or like layer to ensure that there is no high order molecular alignment when no external field is applied.

In FIG. 20A, the electro-optical light scattering structure of FIG. 20 is shown operated in its scattering mode, wherein no external voltage is applied (i.e. $V=V_{off}$). In FIGS. 20B and 20C, transmission and reflection characteristics for this mode of operation are shown, respectively. In FIG. 20D, the electro-optical light scattering structure of FIG. 20 is shown operated in its light transmission mode, wherein an external voltage V is applied across the ITO surfaces (i.e. $V=V_{on}$). In FIGS. 20E and 20F, transmission and reflection characteristics for this mode of operation are shown, respectively. As light is transmitted when an external voltage is applied, and scatters when a voltage is no applied, this structure is said to operate in the "normal mode".

Such alternative embodiments of the present invention will be particularly useful when a room is brightly lit at night, and a very small amount of light leaking from the inside to the dark outside may compromise privacy.

Having described such alternative embodiments of the present invention, further modifications thereto readily come to mind.

For example, the electro-optical glazing structures described above can be stacked and laminated together, in virtually any number or ordering, so as form composite electro-optical glazing structures having more than two optical states (e.g. four or more). Such electro-optical glazing structures can be used to construct sophisticated window systems capable of providing complex levels of solar and/or visible radiation control.

Electrically controlled CLC-based smart windows of the present invention can be used in homes, schools, offices, factories, as well as in automobiles and airplanes to provide privacy, brightness control, and reduce thermal loading on heating and cooling systems employed therein.

The electro-optical glazings of the present invention can be used to make intelligent sunglasses and sun visors for use in a variety of applications. In such embodiments of the present invention, the electro-optical glazing of the present invention is realized in the form of a pair of lenses which are mounted within a frame supportable upon the head of its user, as in conventional eyeglasses or sun-visors. The programmed microcontroller, battery, electromagnetic detector, battery recharging circuitry and optical state switching circuitry embodied within the window frame shown in FIGS. 1A and 12B can be reduced in size and embodied within the ultra-compact sunglasses frame of this illustrative embodiment of the present invention.

In yet another alternative embodiment of the present invention, the electro-optical glazing structures of the present invention can be mounted before each LCD viewing panel within the shutter-type stereoscopic 3-D viewing glasses taught in International Publication No. WO 97/43681 by VRex, Inc., a wholly owned subsidary of Reveo, Inc., which is incorporated herein by reference in its entirety. Advantageously, the application of the present invention thereto would provide stereoscopic 3-D viewing glasses having several additional modes of operation, wherein the user could simply control electromagnetic radiation in either a manual or automatic manner during stereoscopic 3-D viewing or monoscopic 2-D viewing of displayed images (i.e. virtual world viewing), or stereoscopic viewing of real world objects while walking, bicycling, jogging, sailing, or just lounging about in the rays of the Sun.

The electro-optical glazings of the present invention can be used in automotive vehicles, maritime vessels, aircrafts and spacecrafts.

The modifications described above are merely exemplary. It is understood that other modifications to the illustrative embodiments will readily occur to persons with ordinary skill in the art. All such modifications and variations are deemed to be within the scope and spirit of the present invention as defined by the accompanying Claims to Invention.

What is claimed is:

1. An electro-optical glazing structure having reflection and transparent modes of operation for selectively reflecting and transmitting electromagnetic radiation without absorption, respectively, said electro-optical glazing structure comprising:

an electro-optical panel having first and second optical states of operation;

a composite infrared (IR) reflective polarizing filter structure of electrically-passive construction, mounted to said electro-optical panel; and an optical state switching mechanism for switching said electro-optical panel to said first optical state of operation in order to induce said electro-optical glazing structure into said reflection mode of operation, and for switching said electro-optical panel to said second optical state of operation in order to induce said electro-optical glazing structure into said transparent mode of operation, wherein electromagnetic radiation within a first prespecified bandwidth falling incident upon said electro-optical panel is reflected from said electro-optical panel without absorption when said electro-optical panel is switched to said first optical state of operation, and wherein electromagnetic radiation within a second prespecified bandwidth falling incident upon said electro-optical panel is transmitted through said electro-optical panel without absorption when said electro-optical panel is switched to said second optical state of operation.

2. The electro-optical glazing structure of claim 1, wherein said composite IR reflective polarizing filter structure comprises: a left-hand circularly polarizing (LHCP) IR reflective polarizing panel of electrically-passive construction, and a right-hand circularly polarizing (RHCP) IR reflective polarizing panel of electrically-passive construction.

3. The electro-optical glazing structure of claim 1, wherein said electro-optical panel comprises:

a first electrically-passive cholesteric liquid crystal (CLC) electromagnetic radiation polarizing panel;

a second electrically-passive CLC electromagnetic radiation polarizing panel; and an electrically-active π-phase retardation panel interposed between said first and second electrically-passive CLC electromagnetic radiation polarizing panels.

4. The electro-optical glazing structure of claim 3, wherein said first and second electrically-passive CLC electromagnetic radiation polarizing panels totally reflect without absorption electromagnetic radiation having a left hand circularly polarized (LHCP) state and a wavelength within said first prespecified bandwidth when said electro-optical panel is switched to said first optical state of operation, wherein said first and second electrically-passive CLC electromagnetic radiation polarizing panels transmit without absorption electromagnetic radiation having either a right hand circularly polarized (RHCP) state and/or a wavelength outside said first prespecified bandwidth when said electro-optical panel is switched to said first optical state of operation; and wherein said first and second electrically-passive CLC electromagnetic radiation polarizing panels transmit without absorption electromagnetic radiation having either said LHCP state or said RHCP state and a wavelength within said second prespecified bandwidth when said electro-optical panel is switched to said second optical state of operation.

5. The electro-optical glazing structure of claim 1, wherein said electro-optical panel comprises:

a first electrically-active cholesteric liquid crystal (CLC) electromagnetic radiation polarizing panel;

a second electrically-active CLC electromagnetic radiation polarizing panel; and an electrically-passive π-phase retardation panel interposed between said first and second electrically-active CLC electromagnetic radiation polarizing panels.

6. The electro-optical glazing structure of claim 5, wherein said first and second electrically-active CLC electromagnetic radiation polarizing panels totally reflect without absorption electromagnetic radiation having a left hand circularly polarized (LHCP) state and a wavelength within said first prespecified bandwidth when said electro-optical panel is switched to said first optical state of operation, wherein said first and second electrically-active CLC electromagnetic radiation polarizing panels transmit without absorption electromagnetic radiation having either a right hand circularly polarized (RHCP) state and/or a wavelength outside said first prespecified bandwidth when said electro-optical panel is switched to said first optical state of operation; and wherein said first and second electrically-active CLC electromagnetic radiation polarizing panels transmit without absorption electromagnetic radiation having either said LHCP state or said RHCP state and a wavelength within said second prespecified bandwidth when said electro-optical panel is switched to said second optical state of operation.

7. The electro-optical glazing structure of claim 5, wherein said first and second electrically-active CLC electromagnetic radiation polarizing panels totally reflect without absorption electromagnetic radiation having a right hand circularly polarized (RHCP) state and a wavelength within said first prespecified bandwidth when said electro-optical panel is switched to said first optical state of operation, wherein said first and second electrically-active CLC electromagnetic radiation polarizing panels transmit without absorption electromagnetic radiation having either a left hand circularly polarized (LHCP) state and/or a wavelength outside said first prespecified bandwidth when said electro-optical panel is switched to said first optical state of operation; and wherein said first and second electrically-active CLC electromagnetic radiation polarizing panels transmit without absorption electromagnetic radiation having either said LHCP state or said RHCP state and a wavelength within said second prespecified bandwidth when said electro-optical panel is switched to said second optical state of operation.

8. The electro-optical glazing structure of claim 1, wherein said electro-optical panel comprises:

a first electrically-active cholesteric liquid crystal (CLC) electromagnetic radiation polarizing panel; and a second electrically-active CLC electromagnetic radiation polarizing panel adjacent said first electrically-active CLC electromagnetic radiation polarizing panel.

9. The electro-optical glazing structure of claim 8, wherein said first electrically-active CLC electromagnetic radiation polarizing panel totally reflects without absorption electromagnetic radiation having a left hand circularly polarized (LHCP) state and a wavelength within said first prespecified bandwidth when said electro-optical panel is switched to said first optical state of operation, and wherein said first electrically-active CLC electromagnetic radiation polarizing panels transmits without absorption electromagnetic radiation having either a right hand circularly polarized (RHCP) state and/or a wavelength outside said first prespecified bandwidth when said electro-optical panel is switched to said first optical state of operation;

wherein said second electrically-active CLC electromagnetic radiation polarizing panel totally reflects without absorption electromagnetic radiation having said RHCP state and a wavelength within said first prespecified bandwidth when said electro-optical panel is switched to said first optical state of operation, and wherein said second electrically-active CLC electromagnetic radiation polarizing panels transmits without absorption electromagnetic radiation having either said LHCP state and/or a wavelength outside said first prespecified bandwidth when said electro-optical panel is switched to said first optical state of operation; and wherein said first and second electrically-active CLC electromagnetic radiation polarizing panels transmit without absorption electromagnetic radiation having either said LHCP state or said RHCP state and a wavelength within said second prespecified bandwidth when said electro-optical panel is switched to said second optical state of operation.

10. The electro-optical glazing structure of claim 9, which further comprises:

a electromagnetic-sensor mounted on said window frame, for sensing electromagnetic conditions;

a battery supply mounted within said window frame, for providing electrical power;

a electromagnetic-powered battery recharger mounted within said window frame, for recharging the battery supply;

electrical circuitry mounted within said window frame, for producing glazing control voltages for switching said first and second optical states of operation; and a programmable micro-computer chip mounted within said window frame, for controlling the operation of said battery recharger and said electrical circuitry, and the production of said glazing control voltages as required by a radiation flow control program stored within said programmable microcontroller.

11. The electro-optical glazing structure of claim 1, which further comprises:

a window frame for mounting said electro-optical panel within a house or office building, or aboard a transportation vehicle.

12. An composite electro-optical glazing structure which comprises:

a plurality of said electro-optical glazing structures of claim 1, stacked together as a composite electro-optical structure, and wherein said composite electro-optical structure has more than two said optical states of operation which permit complex levels of electromagnetic radiation control.

* * * * *